United States Patent [19]
Hioki et al.

[11] Patent Number: 5,166,047
[45] Date of Patent: Nov. 24, 1992

[54] METHINE COMPOUNDS

[75] Inventors: Takanori Hioki; Tadashi Ikeda, both of Kanagawa, Japan

[73] Assignee: Fuji Photo Film Co. Ltd., Kanagawa, Japan

[21] Appl. No.: 656,524

[22] Filed: Feb. 19, 1991

[30] Foreign Application Priority Data

Feb. 23, 1990 [JP] Japan .................. 2-43789

[51] Int. Cl.[5] .............................. G03C 1/20
[52] U.S. Cl. .................... 430/573; 430/574; 430/576; 430/584; 430/944
[58] Field of Search ............. 430/573, 574, 576, 581, 430/584, 944

[56] References Cited
U.S. PATENT DOCUMENTS

| | | | |
|---|---|---|---|
| 2,734,900 | 2/1956 | Heseltine ........................... | 430/584 |
| 4,596,767 | 6/1986 | Mihara et al. ..................... | 430/576 |
| 4,933,269 | 6/1990 | Parton et al. ...................... | 430/522 |
| 5,013,642 | 5/1991 | Muenter et al. ................... | 430/574 |
| 5,061,618 | 10/1991 | Parton et al. ..................... | 430/584 |

Primary Examiner—Charles L. Bowers, Jr.
Assistant Examiner—Janet C. Baxter
Attorney, Agent, or Firm—Sughrue, Mion, Zinn Macpeak & Seas

[57] ABSTRACT

Silver halide photographic materials containing methine compounds of general formulas Ia, Ib, Ic, IIa, and IIb are disclosed. The variables are as defined in the present specification.

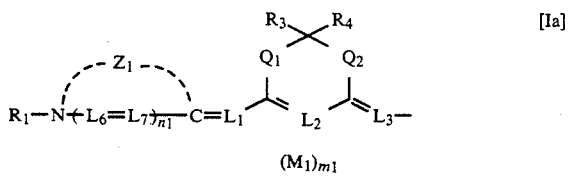

(M1)m1

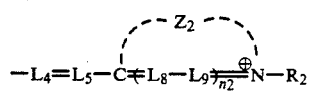

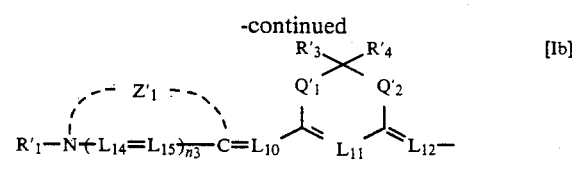

(M2)m2

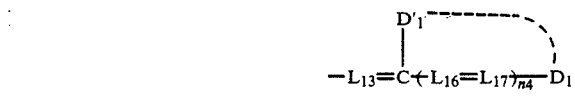

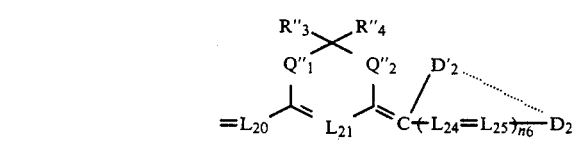

(M3)m3

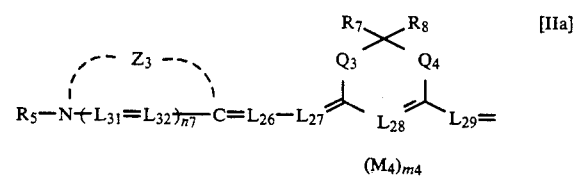

(M4)m4

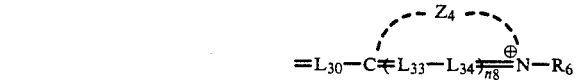

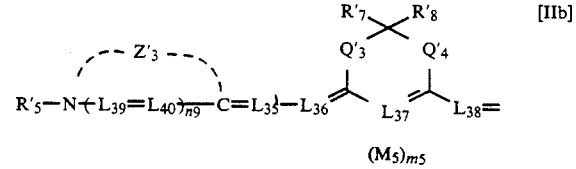

(M5)m5

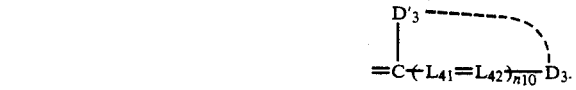

11 Claims, No Drawings

METHINE COMPOUNDS

FIELD OF THE INVENTION

The present invention concerns novel methine compounds. Furthermore, this invention also concerns silver halide emulsions which contain novel methine compounds.

The novel methine compounds of the present invention can be used effectively as drugs, dyes and in optical information recording media such as optical disks as well as in silver halide emulsions for photographic purposes.

BACKGROUND OF THE INVENTION

Crosslinking of the methine chains in methine compounds is a well known technique for increasing solution stability.

A detailed description of the conventional technique of crosslinked methine compounds is given in comparison with the technique of the present invention hereinafter in the "Detailed Description of the Invention" section.

Furthermore, the technique of adding sensitizing dyes to silver halide emulsions when manufacturing silver halide light-sensitive materials to extend the light-sensitive wavelength of the silver halide emulsion and to provide optical sensitization has long been known.

Many compounds have long been known as spectrally sensitizing dyes which can be used for this purpose, and examples of such compounds include the cyanine dyes, merocyanine dyes and xanthene dyes etc. disclosed on pages 198–228 of *The Theory of the Photographic Process* (third edition) by T. H. James (1966, Macmillan, New York).

These sensitizing dyes must not only extend the light-sensitive wavelength region of the silver halide emulsions but must also satisfy the various conditions indicated below if they are to be used generally in silver halide emulsions.

(1) They must have an appropriate spectral sensitization region.

(2) They must have a good sensitizing efficiency and enable sufficiently high sensitivities to be obtained.

(3) They must not give rise to fogging.

(4) The variation in sensitivity due to fluctuations in temperature at the time of exposure must be small.

(5) There must be no adverse interaction with the various additives, such as stabilizers, anti-fogging agents, coating aids and color formers which are being used.

(6) There must be no change in sensitivity on storing a silver halide emulsion which contains the sensitizing dye. In particular, there must be no change in sensitivity on storage under conditions of high temperature and high humidity.

(7) There must be no diffusion of the sensitizing dye which has been added to other light-sensitive layers and no color turbidity (color mixing) after development processing.

The conditions outlined above are of great significance when preparing silver halide emulsions for silver halide color photographic materials.

However, although various attempts have been made to prevent it, the fall in sensitivity on storing raw sample has not been prevented to a satisfactory degree.

In particular, an adequate performance in respect of the loss of sensitivity on storing raw sample cannot be obtained when polymethine dyes which have an oxidation potential of 0.60 (V vs SCE) or lower are used as sensitizing dyes.

SUMMARY OF THE INVENTION

The object of the present invention is to provide novel methine compounds and also to provide silver halide photographic materials which contain novel methine compounds, which have a high sensitivity, with which fogging is unlikely to increase on storage under conditions of high temperature and/or high humidity and with which there is little change in sensitivity (which is to say, which have excellent raw storage properties).

The aforementioned objects of the present invention have been realized by means methine compounds which can be represented by the general formula [Ia], [Ib], [Ic], [IIa] or [IIb], and by means of a silver halide emulsion which contains at least one type of methine compound represented by the general formula [Ia], [Ib], [Ic], [IIa] or [IIb]. Compounds which can be represented by the general formula [Ia], [Ib] or [Ic] are shown below.

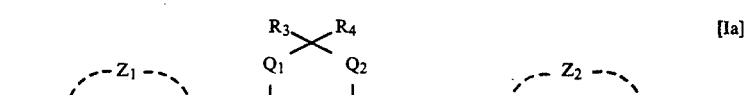

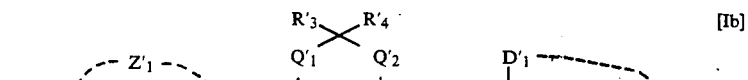

-continued

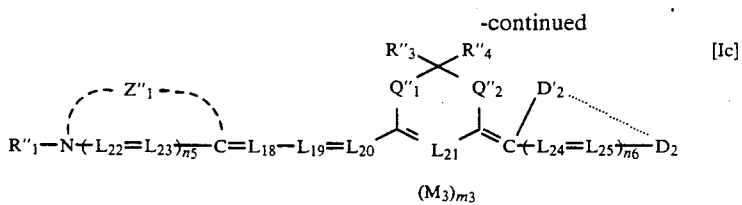

In formula [Ia], $Z_1$ and $Z_2$ represent atomic groups which are required to form a five or six membered nitrogen containing heterocyclic ring.

$R_1$ and $R_2$ represent alkyl groups.

$L_1$, $L_2$, $L_3$, $L_4$, $L_5$, $L_6$, $L_7$, $L_8$ and $L_9$ represent methine groups or substituted methine groups. Furthermore, rings may be formed with other methine groups, or rings may be formed with auxochromes.

Moreover, $n_1$ and $n_2$ represent 0 or 1.

$M_1$ represents a charge neutralizing counter ion, and $m_1$ is zero or a number greater than zero required to neutralize the charge on the molecule.

$Q_1$ and $Q_2$ represent methylene groups or substituted methylene groups.

$R_3$ and $R_4$ represent hydrogen atoms or monovalent organic residual groups. However, at least one of $R_3$ and $R_4$ represents an aryl group or a heterocyclic group.

In formula [Ib], $Z'_1$ is the same as $Z_1$ and $Z_2$.

$D_1$ and $D'_1$ represent atomic groups which are required to form non-cyclic or cyclic acidic nuclei.

$R'_1$ is the same as $R_1$ and $R_2$.

$L_{10}$, $L_{11}$, $L_{12}$, $L_{13}$, $L_{14}$, $L_{15}$, $L_{16}$ and $L_{17}$ are the same as $L_1$, $L_2$, $L_3$, $L_4$, $L_5$, $L_6$, $L_7$, $L_8$ and $L_9$.

Moreover, $n_3$ and $n_4$ represent 0 or 1.

$M_2$ and $m_2$ are the same as $M_1$ and $m_1$ respectively.

$Q'_1$ and $Q'_2$ are the same as $Q_1$ and $Q_2$.

$R'_3$ and $R'_4$ are the same as $R_3$ and $R_4$.

In formula [Ic], $Z''_1$ is the same as $Z_1$ and $Z_2$.

$D_2$ and $D'_2$ are the same as $D_1$ and $D'_1$.

$R''_1$ is the same as $R_1$ and $R_2$.

$L_{18}$, $L_{19}$, $L_{20}$, $L_{21}$, $L_{22}$, $L_{23}$, $L_{24}$ and $L_{25}$ are the same as $L_1$, $L_2$, $L_3$, $L_4$, $L_5$, $L_6$, $L_7$, $L_8$ and $L_9$.

Moreover, $n_5$ and $n_6$ represent 0 or 1.

$M_3$ and $m_3$ are the same as $M_1$ and $m_1$ respectively.

$Q''_1$ and $Q''_2$ are the same as $Q_1$ and $Q_2$.

$R''_3$ and $R''_4$ are the same as $R_3$ and $R_4$.

Methine compounds which can be represented by general formula [IIa] or [IIb] are shown below.

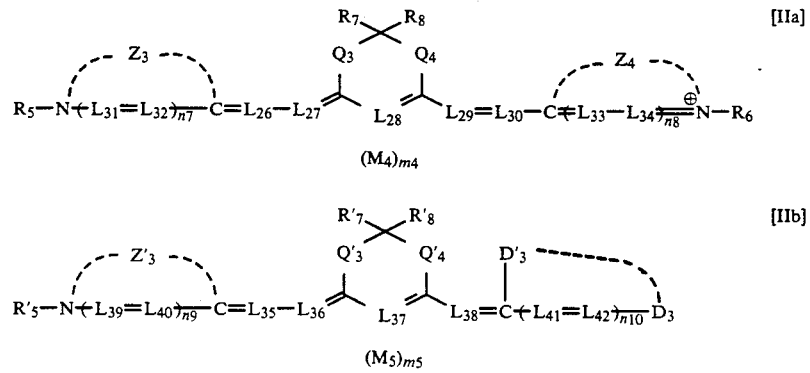

In formula [IIa], $Z_3$ and $Z_4$ are the same as $Z_1$ and $Z_2$ in formula [Ia].

$R_5$ and $R_6$ are the same as $R_1$ and $R_2$ in formula [Ia].

$L_{26}$, $L_{27}$, $L_{28}$, $L_{29}$, $L_{30}$, $L_{31}$, $L_{32}$, $L_{33}$ and $L_{34}$ are the same as $L_1$, $L_2$, $L_3$, $L_4$, $L_5$, $L_6$, $L_7$, $L_8$ and $L_9$ in formula [Ia].

Moreover, $n_7$ and $n_8$ represent 0 or 1.

$M_4$ and $m_4$ are the same as $M_1$ and $m_1$ in formula [Ia].

$Q_3$ and $Q_4$ are the same as $Q_1$ and $Q_2$ in formula [Ia].

$R_7$ and $R_8$ represent hydrogen atoms or monovalent organic residual groups. However, at least one of $R_7$ and $R_8$ represents an alkyl group, an aryl group or a heterocyclic group.

In formula [IIb], $Z'_3$ is the same as $Z_1$ and $Z_2$ in formula [Ia].

$D_3$ and $D'_3$ are the same as $D_1$ and $D'_1$ in formula [Ib].

$R'_5$ is the same as $R_1$ and $R_2$ in formula [Ia].

$L_{35}$, $L_{36}$, $L_{37}$, $L_{38}$, $L_{39}$, $L_{40}$, $L_{41}$ and $L_{42}$ are the same as $L_1$, $L_2$, $L_3$, $L_4$, $L_5$, $L_6$, $L_7$, $L_8$ and $L_9$ in formula [Ia].

Moreover, $n_9$ and $n_{10}$ represent 0 or 1.

$M_5$ and $m_5$ are the same as $M_1$ and $m_1$ in formula [Ia].

$Q'_3$ and $Q'_4$ are the same as $Q_1$ and $Q_2$ in formula [Ia].

$R'_7$ and $R'_8$ are the same as $R_7$ an $R_8$.

DETAILED DESCRIPTION OF THE INVENTION

The conventional technique of crosslinked methine compounds is described here for comparison with the present invention.

Cases in which $R_3$ and $R_4$, $R'_3$ and $R'_4$, $R''_3$ and $R''_4$, in the methine dyes represented by general formulae [Ia], [Ib] and [Ic] are hydrogen atoms or alkyl groups are known from literature citations 1 and 2. Actual examples are indicated below.

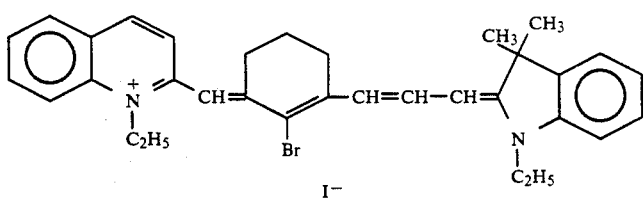
(a)

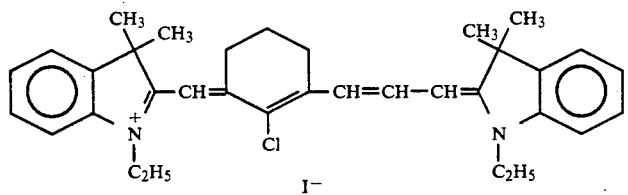
(b)

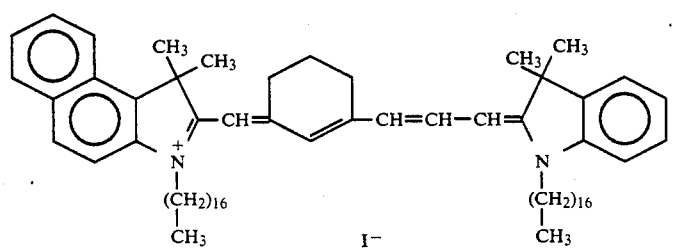
(c)

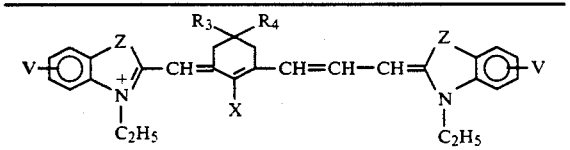

| Compound No. | R3 | R4 | X | Z | V |
|---|---|---|---|---|---|
| (d) | H | H | Cl | S | H |
| (e) | H | H | H | S | 5-OCH3 |
| (f) | C2H5 | H | H | Se | 5-OCH3 |
| (g) | C2H5 | H | H | Se | H |
| (h) | C2H5 | H | H | S | 5-OCH3 |
| (i) | C2H5 | H | H | S | H |
| (j) | CH3 | H | H | Se | 5-OCH3 |
| (k) | CH3 | H | H | Se | H |
| (l) | CH3 | H | H | S | 5-OCH3 |
| (m) | H | H | H | Se | 5-OCH3 |
| (n) | H | H | H | Se | H |
| (o) | H | H | H | S | H |
| (p) | CH3 | H | H | S | H |
| (q) | CH3 | CH3 | H | S | H |

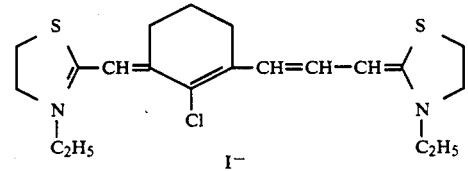
(r)

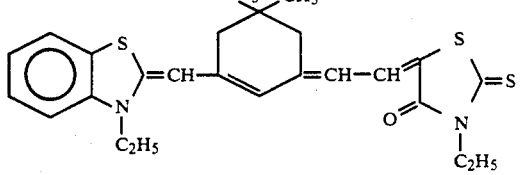
(s)

-continued

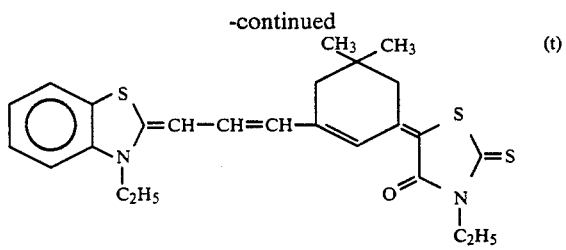
(t)

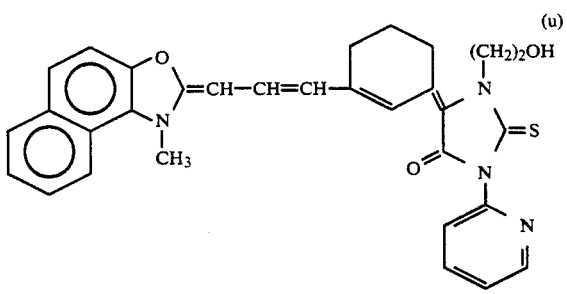
(u)

Literature Citations 1

A) F. M. Hamer ed. *Heterocyclic Compounds—Cyanine Dyes and Related Compounds*, (published by John Wiley & Sons, New York, London, 1964)

B) D. M. Sturmer ed. *Heterocyclic Compounds—Special Topics in Heterocyclic Chemistry*, Chapter 8, Section 4, pages 482–515 (published by John Wiley & Sons, New York, London, 1977)

C) D. J. Fry ed. *Rodd's Chemistry of Carbon Compounds* (2nd Ed., Vol. IV, part B, published 1977) Chapter 15, pages 369–422, (2nd Ed., Vol. IV, Part B, published 1985) Chapter 15, pages 267–296 (Published by Elsvier Science Publishing Company Inc., New York)

Literature Citations 2

(A) JP-A-63-247930 (the term "JP-A" as used herein signifies an "unexamined published Japanese patent application".)
(B) DE 3,521,915
(C) JP-A-58-194595
(D) JP-A-59-67092
(E) JP-A-58-194595
(F) Izv. Akad. Nauk. SSSR. Ser. Fiz, Vol. 39, No. 11, pages 2275-2279 (1975)
(G) Kvantovaya Elektron. (Kiev), No. 6, pages 48-71 (1972)
(H) Hau-tung Hua Kung Hsueh Yuan Hsheh Pao, No. 1, pages 33-44 (1981)

However, no example in which at least one of $R_3$ and $R_4$, $R'_3$ and $R'_4$, or $R''_3$ and $R''_4$, is an aryl group or a heterocyclic group, as in the case of the present invention, has been disclosed up to the present time.

Cases in which $R_7$ and $R_8$, and $R'_7$ and $R'_8$, are hydrogen atoms in the compounds represented by general formulae [IIa] and [IIb] are known from literature citations 3. Actual examples are indicated below.

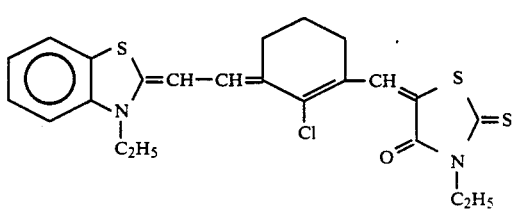
(v)

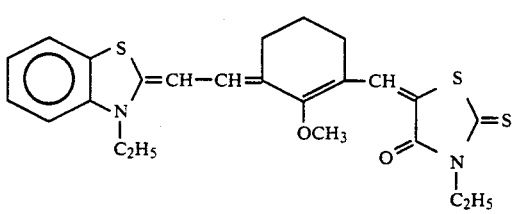
(w)

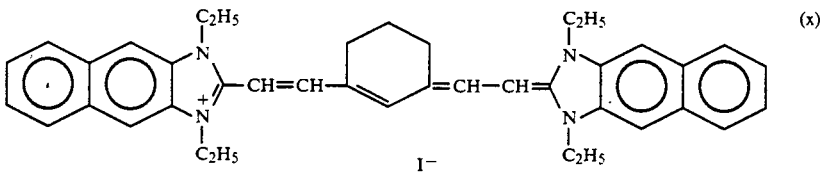
(x)

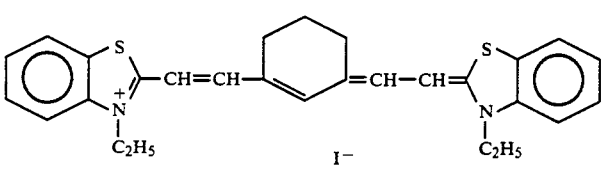
(y)

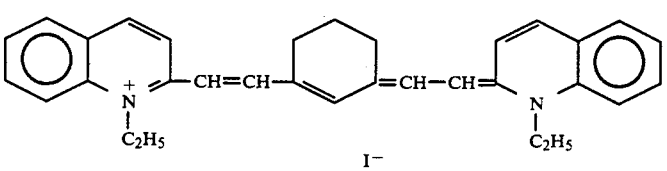
(z)

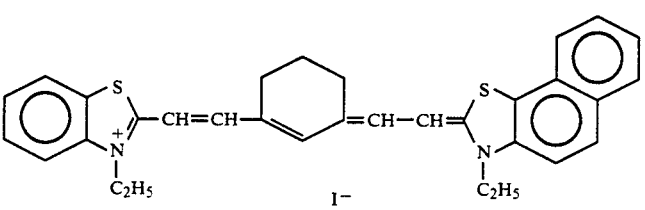
(aa)

(bb)
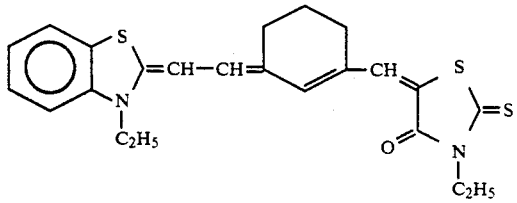

(cc)
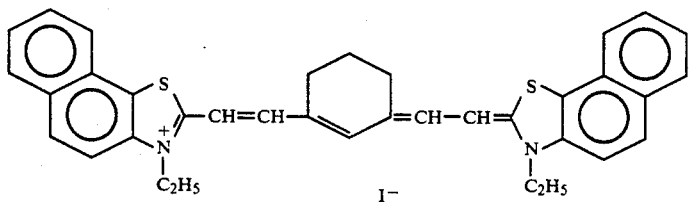

(dd)
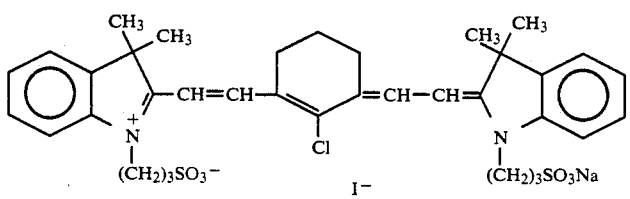

(ee)
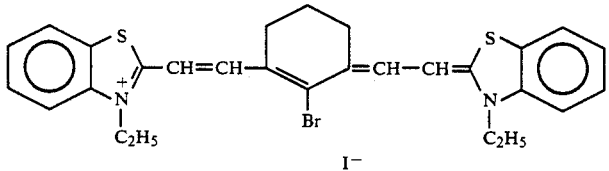

Literature Citations 3

Zh. Org. Khim, Vol 17, No. 1, pages 167–169 (1981), Vol. 15, No. 2, pages 400–407 (1979), Vol. 14, No. 10, pages 2214–2221 (1978), Vol. 13, No. 11, pages 2440–2443 (1977), Vol. 19, No. 10, pages 2134–2142 (1983), Ukr. Khim. Zh. Vol. 40, No. 6, pages 625–629 (1974), Khim. Geterotsikl. Soedin., No. 2, pages 175–178 (1976), Russian Patents 420,643 and 341,823, JP-A-59-217761, U.S. Pat. Nos. 4,334,000, 3,671,648, 3,623,881 and 3,573,921, EP-A-288261 and EP-A-102781, and JP-B-49-46930. (The term "JP-B" as used herein signifies an "examined Japanese patent publication".)

However, no example of compounds in which at least one of $R_7$ and $R_8$, or $R'_7$ and $R'_8$, is an alkyl group, an aryl group or a heterocyclic group, as in the case of the present invention, has been disclosed up to the present time.

The methine compounds of the present invention are described in detail below.

The nucleus formed by $Z_1$, $Z'_1$, $Z''_1$, $Z'_2$, $Z_3$, $Z'_3$ and $Z_4$ may be a thiazole nucleus {thiazole nucleus (for example, thiazole, 4-methylthiazole, 4-phenylthiazole, 4,5-dimethylthiazole, 4,5-diphenylthiazole), benzothiazole nucleus (for example, benzothiazole, 4-chlorobenzothiazole, 5-chlorobenzothiazole, 6-chlorobenzothiazole, 5-nitrobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-ethoxycarbonylbenzothiazole, 5-carboxybenzothiazole, 5-phenethylbenzothiazole, 5-fluorobenzothiazole, 5-chloro-6-methylbenzothiazole, 5,6-dimethylbenzothiazole, 5,6-dimethoxybenzothiazole, 5-hydroxy-6-methylbenzothiazole, tetrahydrobenzothiazole, 4-phenylbenzothiazole), naphthothiazole nucleus (for example, naphtho[2,1-d]thiazole, naphtho[1,2-d]thiazole, naphtho-[2,3-d]thiazole, 5-methoxynaphtho[1,2-d]thiazole, 7-ethoxynaphtho[2,1-d]thiazole, 8-methoxynaphtho[2,1-d]thiazole, 5-methoxynaphtho[2,3-d]thiazole)}, a thiazoline nucleus (for example, thiazoline, 4-methylthiazoline, 4-nitrothiazoline), an oxazole nucleus {oxazole nucleus (for example, oxazole, 4-methyloxazole, 4-nitrooxazole, 5-methyloxazole, 4-phenyloxazole, 4,5-diphenyloxazole, 4-ethyloxazole), benzoxazole nucleus (for example, benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-nitrobenzoxazole, 5-trifluoromethylbenzoxazole, 5-hydroxybenzoxazole, 5-carboxybenzoxazole, 6-methylbenzoxzole, 6-chlorobenzoxazole, 6-nitrobenzoxazole, 6-methoxybenzoxazole, 6-hydroxybenzoxazole, 5,6-dimethylbenzoxazole, 4,6-dimethylbenzoxazole, 5-ethoxybenzoxazole), naphthoxazole nucleus (for example, naphtho[2,1-d]oxazole, naphtho[1,2-d]-oxazole, naphtho[2,3-d]oxazole, 5-nitronaphtho[2,1-d]-oxazole)}, an oxazoline nucleus (for example, 4,4-dimethyloxazoline), a selenazole nucleus {selenazole nucleus (for example, 4-methylselenazole, 4-nitroselenazole, 4-phenylselenazole), benzoselenazole nucleus (for example, benzoselenazole, 5-chlorobenzoselenazole, 5-nitrobenzoselenazole, 5-methoxybenzoselenazole, 5-hydroxybenzoselenazole, 6-nitrobenzoselenazole, 5-chloro-6-nitrobenzoselenazole, 5,6-dimethylbenzoselenazole), naphthoselenazole nucleus (for example, naphtho[2,1-d]selenazole, naphtho[1,2-d]selenazole)}, a selenazoline nucleus (for example, selenazoline, 4-methylselenazoline), a tellurazole nucleus {tellurazole nucleus (for example, tellurazole, 4-methyltellurazole, 4-phenyltellurazole), benzotellurazole nucleus (for example, benzotellurazole, 5-chlorobenzotellurazole, 5-methylbenzotellurazole), 5,6-dimethylbenzotellurazole, 6-methoxybenzotellurazole), naphthotellurazole nucleus (for example, naphtho[2,1-d]tellurazole, naphtho[1,2-d]tellurazole)}, a tellurazoline nucleus (for example, tellurazoline, 4-methyltellurazoline), a 3,3-dialkylindolenine nucleus (for example, 3,3-dimethylindolenine, 3,3-diethylindolenine, 3,3-dimethyl-5-cyanoindolenine, 3,3-dimethyl-6-nitroindolenine, 3,3-dimethyl-5-nitroindolenine, 3,3-dimethyl-5-methoxyindolenine, 3,3,5-trimethylindolenine, 3,3-dimethyl-5-chloroindolenine), an imidazole nucleus {imidazole nucleus (for example, 1-alkylimidazole, 1-alkyl-4-phenylimidazole, 1-arylimidazole), benzimidazole nucleus (for example, 1-alkylbenzimidazole, 1-alkyl-5-chlorobenzimidazole, 1-alkyl-5,6-dichlorobenzimidazole, 1-alkyl-5-methoxybenzimidazole, 1-alkyl-5-cyanobenzimidazole, 1-alkyl-5-fluorobenzimidazole, 1-alkyl-5-trifluoromethylbenzimidazole, 1-alkyl-6-chloro-5-cyanobenzimidazole, 1-alkyl-6-chloro-5-trifluoromethylbenzimidazole, 1-allyl-5,6-dichlorobenzimidazole, 1-allyl-5-chlorobenzimidazole, 1-arylbenzimidazole, 1-aryl-5-chlorobenzimidazole, 1-aryl-5,6-dichlorobenzimidazole, 1-aryl-5-methoxybenzimidazole, 1-aryl-5-cyanobenzimidazole), naphthimidazole nucleus (for example, 1-alkylnaphtho[1,2-d]imidazole, 1-arylnaphtho[1,2-d]imidazole): (the alkyl groups referred to above have from 1 to 8 carbon atoms, being preferably unsubstituted alkyl groups (for example, methyl, ethyl, propyl, iso-propyl, butyl) or hydroxyalkyl groups (for example, 2-hydroxyethyl, 3-hydroxypropyl), and of these the methyl group and the ethyl group are especially preferred, and the aforementioned aryl groups are phenyl groups, halogen (for example, chloro) substituted phenyl groups, alkyl (for example, methyl) substituted phenyl groups or alkoxy (for example, methoxy) substituted phenyl groups)}, a pyridine nucleus (for example, 2-pyridine, 4-pyridine, 5-methyl-2-pyridine, 3-methyl-4-pyridine), a quinoline nucleus {quinoline nucleus (for example, 2-quinoline, 3-methyl-2-quinoline, 5-ethyl-2-quinoline, 6-methyl-2-quinoline, 6-nitro-2-quinoline, 8-fluoro-2-quinoline, 6-methoxy-2-quinoline, 6-hydroxy-2-quinoline, 8-chloro-2-quinoline, 4-quinoline, 6-ethoxy-4-quinoline, 6-nitro-4-quinoline, 8-chloro-4-quinoline, 8-fluoro-4-quinoline, 8-methyl-4-quinoline, 8-methoxy-4-quinoline, 6-methyl-4-quinoline, 6-methoxy-4-quinoline, 6-chloro-4-quinoline), isoquinoline nucleus (for example, 6-nitroisoquinoline, 3,4-dihydroisoquinoline, 6-nitro-3-isoquinoline)}, an imidazo[4,5-b]quinoxaline nucleus (for example, 1,3-diethylimidazo-[4,5-b]quinoxaline, 6-chloro-1,3-diallylimidazo[4,5-b]-quinoxaline), an oxadiazole nucleus, a thiadiazole nucleus, a tetrazole nucleus or a pyrimidine nucleus.

The benzothiazole nucleus, the naphthothiazole nucleus, the benzoxazole nucleus, the naphthoxazole nucleus and the benzimidazole nucleus are preferred.

$D_1$ and $D'_1$, $D_2$ and $D'_2$, or $D_3$ and $D'_3$ represents atomic groups which are required to form acidic nuclei, and these may take the form of any of the acidic nuclei generally found in merocyanine dyes. In the preferred form, $D_1$, $D_2$ or $D_3$ is a cyano group, a sulfo group or a carbonyl group, and $D'_1$, $D'_2$ or $D'_3$ is the remainder of the atomic group required to form the acidic nucleus.

In those cases where the acidic nucleus is non-cyclic, which is to say when $D_1$ and $D'_1$, $D_2$ and $D'_2$, and $D_3$ and $D'_3$ are individual groups, the termination of the methine bond is a group such as malononitrile, alkylsulfonylacetonitrile, cyanomethylbenzofuranyl ketone or cyanomethylphenyl ketone.

$D_1$ and $D'_1$, $D_2$ and $D'_2$, and $D_3$ and $D'_3$ together form a five or six membered heterocyclic ring comprised of carbon, nitrogen and chalcogen (typically oxygen, sulfur, selenium and tellurium) atoms. $D_1$ and $D'_1$, $D_2$ and $D'_2$, and $D_3$ and $D'_3$ together preferably form a nucleus such as 2-pyrazolin-5-one, pyrazolidin-3,5-dione, imidazolin-5-one, hydantoin, 2- or 4-thiohydantoin, 2-iminooxazolidin-4-one, 2-oxazolin-5-one, 2-thiooxazolidin-2,4-dione, iso-oxazolin-5-one, 2-thiazolin-4-one, thiazolidin-4-one, thiazolidin-2,4-dione, rhodanine, thiazolidin-2,4-dione, iso-rhodanine, indan-1,3-dione, thiophen-3-one, thiophen-3-one-1,1-dioxide, indolin-2-one, indolin-3-one, indalin-3-one, 2-oxoindazolinium, 3-oxoindazolinium, 5,7-dioxo-6,7-dihydrothiazolo[3,2-a]pyrimidine, cyclohexan-1,3-dione, 3,4-dihydroisoquinolin-4-one, 1,3-dioxan-4,6-dione, barbituric acid, 2-thiobarbituric acid, chroman-2,4-dione, indazolin-2-one or pyrido[1,2-a]pyrimidin-1,3-dione nuclei.

Rhodanine, 2-thiohydantoin and 2-thiooxazolidin-2,4-dione are especially desirable.

The substituent group which is bonded to the nitrogen atom which is included in the nucleus is preferably a hydrogen atom, an alkyl group which has from 1 to 18, preferably from 1 to 7, and most preferably from 1 to 4, carbon atoms (for example, methyl, ethyl, propyl, isopropyl, butyl, isobutyl, hexyl, octyl, dodecyl, octadecyl), a substituted alkyl group {for example, an aralkyl group (for example, benzyl, 2-phenylethyl), a hydroxyalkyl group (for example, 2-hydroxyethyl, 3-hydroxypropyl), a carboxyalkyl group (for example, 2-carboxyethyl, 3-carboxypropyl, 4-carboxybutyl, carboxymethyl), an alkoxyalkyl group (for example, 2-methoxyethyl, 2-(2-methoxyethoxy)ethyl), a sulfoalkyl group (for example, 2-sulfoethyl, 3-sulfopropyl, 3-sulfobutyl, 4-sulfobutyl, 2-(3-sulfopropoxy)ethyl, 2-hydroxy-3-sulfopropyl, 3-sulfopropoxyethyl), a sulfatoalkyl group (for example, 3-sulfatopropyl, 4-sulfatobutyl), a heterocyclic group substituted alkyl group (for example, 2-(pyrrolidin-2-one-1-yl)ethyl, tetrahydrofurfuryl, 2-morpholinoethyl), a 2-acetoxyethyl group, a carbomethoxymethyl group, a 2-methanesulfonylaminoethyl group}, an allyl group, an aryl group (for example, phenyl, 2-naphthyl), a substituted aryl group (for example, 4-carboxyphenyl, 4-sulfophenyl, 3-chlorophenyl, methylphenyl), or a heterocyclic group (for example, 2-pyridyl, 2-thiazolyl).

$R_1$, $R'_1$, $R''_1$, $R_2$, $R_5$, $R'_5$ and $R_6$ are preferably unsubstituted alkyl groups which have not more than 18 carbon atoms (for example, methyl, ethyl, propyl, butyl, pentyl, octyl, decyl, dodecyl, octadecyl) or substituted alkyl groups which have not more than 18 carbon atoms {which are substituted with, for example, carboxyl groups, sulfo groups, cyano groups, halogen atoms (for example, fluorine, chlorine, bromine), hydroxyl groups, alkoxycarbonyl groups which have not more than 8 carbon atoms (for example, methoxycarbonyl, ethoxycarbonyl, benzyloxycarbonyl), aryloxycarbonyl groups which have not more than 8 carbon atoms (for example, phenoxycarbonyl), alkoxy groups which have not more than 8 carbon atoms (for example, methoxy, ethoxy, benzyloxy, phenethyloxy), monocyclic aryloxy groups which have not more than 10 carbon atoms (for example, phenoxy, p-tolyloxy), acyloxy groups which have not more than 3 carbon atoms (for example, acetoxy, propionyloxy), acyl groups which have not more than 8 carbon atoms (for example, acetyl, propionyl, benzoyl, mesyl), carbamoyl groups (for example, carbamoyl, N,N-dimethylcarbamoyl, morpholinocarbonyl, piperidinocarbonyl), sulfamoyl groups (for example, sulfamoyl, N,N-dimethylsulfamoyl, morpholinosulfonyl, piperidinosulfonyl), and aryl groups which have not more than 10 carbon atoms (for example, phenyl, 4-chlorophenyl, 4-methylphenyl, α-naphthyl)}.

Unsubstituted alkyl groups (for example, ethyl, propyl), carboxyalkyl groups (for example, carboxyethyl), and sulfoalkyl groups (for example, 3-sulfopropyl, 4-sulfobutyl, 2-sulfoethyl) are especially preferred.

The alkali metals are especially preferred as metal atoms which can form salts with $R_1$, $R'_1$, $R''_1$, $R_2$, $R_5$, $R'_5$ and $R_6$, and pyridines, amines, etc. are preferred as organic compounds which can form salts with $R_1$, $R'_1$, $R''_1$, $R_2$, $R_5$, $R'_5$ and $R_6$.

$L_1$ to $L_{42}$ represent methine groups or substituted methine groups {for example, methine groups substituted with substituted or unsubstituted alkyl groups (for example, methyl, ethyl, 2-carboxyethyl), substituted or unsubstituted aryl groups (for example, phenyl, o-carboxyphenyl), heterocyclic groups (for example, barbituric acid), halogen atoms (for example, chlorine, bromine), alkoxy groups (for example, methoxy, ethoxy), amino groups (for example, N,N-diphenylamino, N-methyl-N-phenylamino, N-methylpiperazino), alkylthio groups (for example, methylthio, ethylthio), etc.}, and they may form rings with other methine groups or they may form rings with auxochromes. Unsubstituted methine groups are preferred.

$Q_1$ and $Q_2$, $Q'_1$ and $Q'_2$, $Q''_1$ and $Q''_2$, $Q_3$ and $Q_4$, and $Q'_3$ and $Q'_4$ represent methylene groups or substituted methylene groups {for example, methylene groups which are substituted with substituted or unsubstituted alkyl groups (for example, methyl, 2-carboxyethyl), substituted or unsubstituted aryl groups (for example, phenyl, o-carboxyphenyl), carboxyl groups, halogen atom (for example, chlorine) or alkoxy groups (for example, methoxy), etc.}. Unsubstituted methylene groups are preferred.

$(M_1)_{m_1}$, $(M_2)_{m_2}$, $(M_3)_{m_3}$, $(M_4)_{m_4}$ and $(M_5)_{m_5}$ are included in the formulae in order to indicate the presence or absence of cations or anions when it is necessary to neutralize the ionic charge of the methine compound. Whether a certain methine compound is a cation or an anion, and whether it has a net ionic charge, is determined by the auxochrome and substituent groups.

The ammonium ion and alkali metal ions are typical cations, and in practice the anions may be inorganic anions or organic anions, and examples include halogen anions (for example, fluorine ion, chlorine ion, bromine ion, iodine ion), substituted arylsulfonate ions (for example, p-toluenesulfonate ion, p-chlorobenzenesulfonate ion), aryldisulfonate ions (for example, 1,3-benzenedisulfonate ion, 1,5-naphthalenedisulfonate ion, 2,6-naphthalenedisulfonate ion), alkylsulfate ions (for example, methylsulfate ion), sulfate ion, thiocyanate ion, perchlorate ion, tetrafluoroborate ion, picrate ion, acetate ion, and the trifluoromethanesulfonate ion.

$R_3$ and $R_4$, $R'_3$ and $R'_4$, and $R''_3$ and $R''_4$ are preferably hydrogen atoms, halogen atoms (for example, chlorine, fluorine, bromine), unsubstituted alkyl groups which preferably have not more than 6 carbon atoms (for example, methyl, ethyl), substituted alkyl groups which preferably have not more than 10 carbon atoms (for example, benzyl, α-naphthylmethyl, 2-phenylethyl, trifluoromethyl), acyl groups which preferably have not more than 10 carbon atoms (for example, acetyl, benzoyl, mesyl), acyloxy groups which preferably have not more than 10 carbon atoms (for example, acetoxy), alkoxycarbonyl groups which preferably have not more than 10 carbon atoms (for example, methoxycarbonyl, ethoxycarbonyl, benzyloxycarbonyl), substituted or unsubstituted carbamoyl groups (for example, carbamoyl, N,N-dimethylcarbamoyl, morpholinocarbonyl, piperidinocarbonyl), substituted or unsubstituted sulfamoyl groups (for example, sulfamoyl, N,N-dimethylsulfamoyl, morpholinosulfonyl, piperidinosulfonyl), carboxyl groups, cyano groups, hydroxyl groups, amino groups, acylamino groups which preferably have not more than 8 carbon atoms (for example, acylamino), alkoxy groups which preferably have not more than 10 carbon atoms (for example, methoxy, ethoxy, benzyloxy), aryl groups (for example, phenyl, tolyl) or heterocyclic groups (for example, 2-pyridyl, 2-thiazolyl).

However, at least one of each of $R_3$ and $R_4$, $R'_3$ and $R'_4$, and $R''_3$ and $R''_4$ represents an aryl group or a heterocyclic group.

$R_7$, $R_8$, $R'_7$ and $R'_8$, are preferably hydrogen atoms, halogen atoms (for example, chlorine, fluorine, bromine), unsubstituted alkyl groups which preferably have not more than 6 carbon atoms (for example, methyl, ethyl), substituted alkyl groups which preferably have not more than 10 carbon atoms (for example, benzyl, α-naphthyl, 2-phenylethyl, trifluoromethyl), acyl groups which preferably have not more than 10 carbon atoms (for example, acetyl, benzoyl, mesyl), acyloxy groups which preferably have not more than 10 carbon atoms (for example, acetoxy), alkoxycarbonyl groups which preferably have not more than 10 carbon atoms (for example, methoxycarbonyl, ethoxycarbonyl, benzyloxycarbonyl), substituted or unsubstituted carbamoyl groups (for example, carbamoyl, N,N-dimethylcarbamoyl, morpholinocarbonyl, piperidinocarbonyl), substituted or unsubstituted sulfamoyl groups (for example, sulfamoyl, N,N-dimethylsulfamoyl, morpholinosulfonyl, piperidinosulfonyl), carboxyl groups, cyano groups, hydroxyl groups, amino groups, acylamino groups which preferably have not more than 8 carbon atoms (for example, acetylamino), alkoxy groups which preferably have not more than 10 carbon atoms (for example, methoxy, ethoxy, benzyloxy), aryl groups (for example, phenyl, tolyl) or heterocyclic groups (for example, 2-pyridyl, 2-thiazolyl).

However, at least one of $R_7$ and $R_8$, and of $R'_7$ and $R'_8$, represents an alkyl group, an aryl group or a heterocyclic group, and of these the aryl groups are preferred.

Actual examples of methine compounds of the present invention are indicated below, but the scope of the invention is not limited to just these compounds.

Methine Dyes Represented by General Formula [Ia]

-continued
(1)
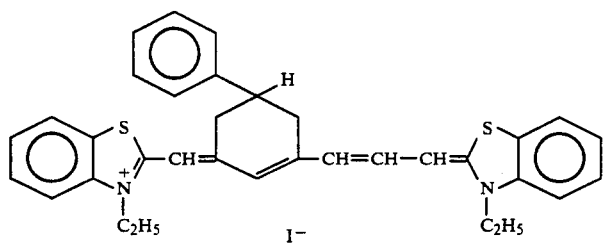
(2)
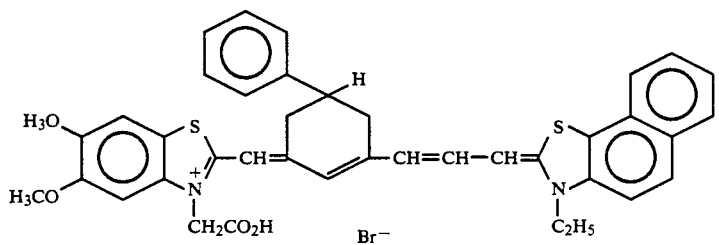
(3)
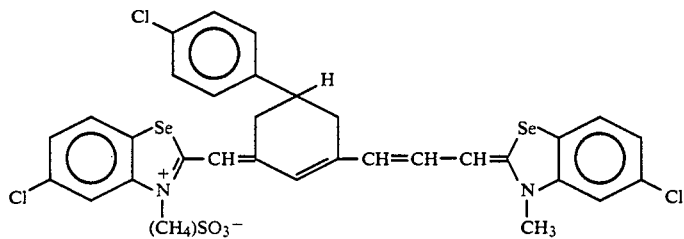
(4)
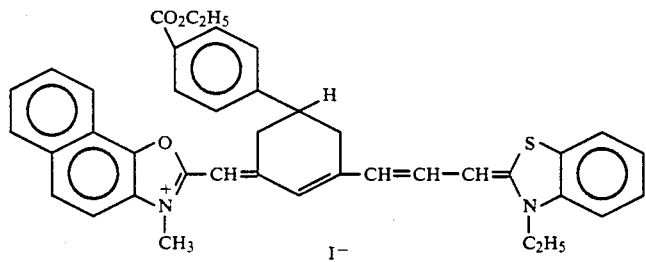
(5)
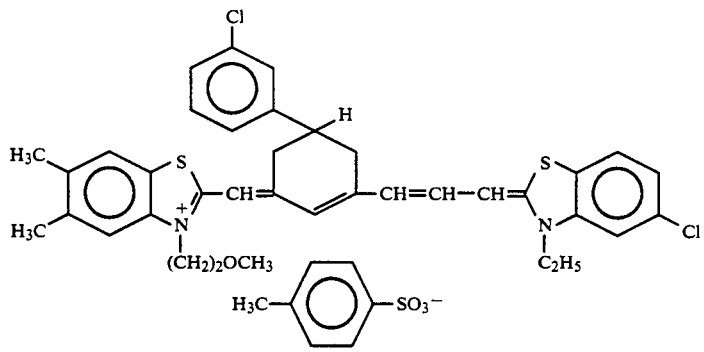
(6)
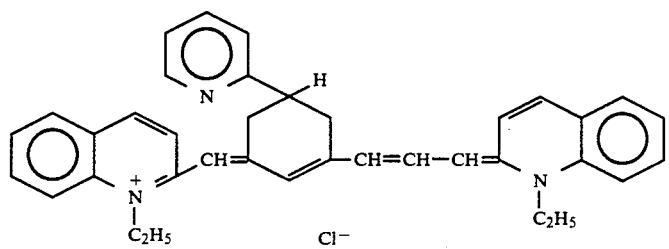

(7)
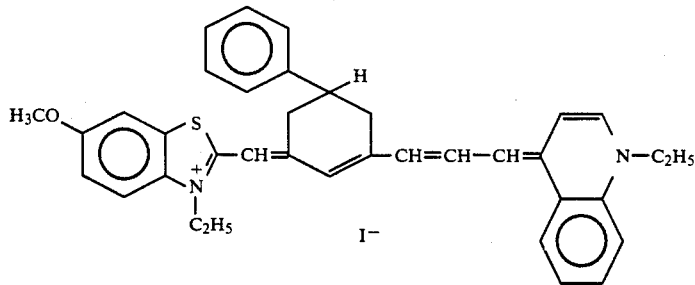
Methine Compounds Represented by General Formula [Ib]
(8)
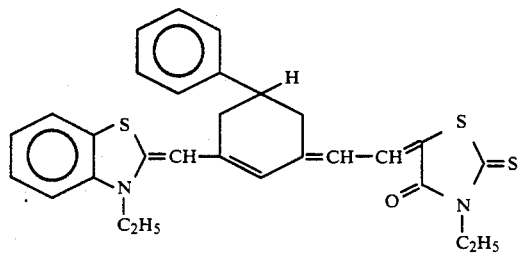
(9)
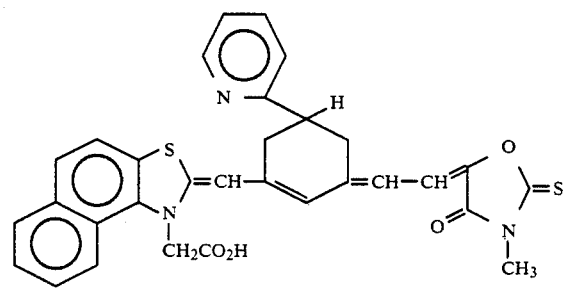
(10)
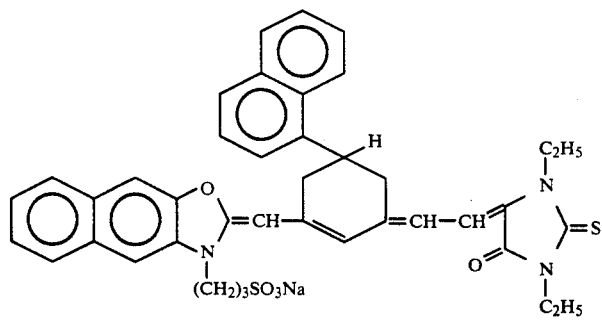
(11)
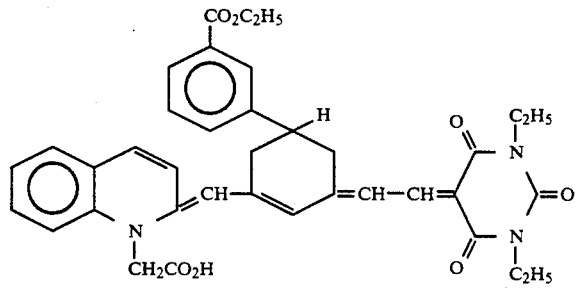
Methine Compounds Represented by General Formula [Ic]

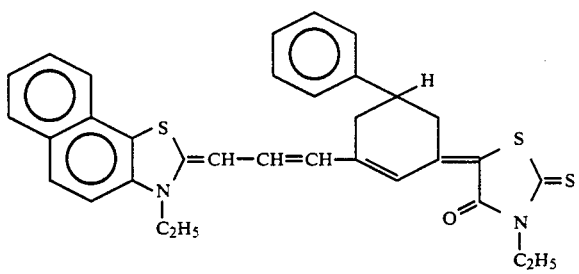
(12)
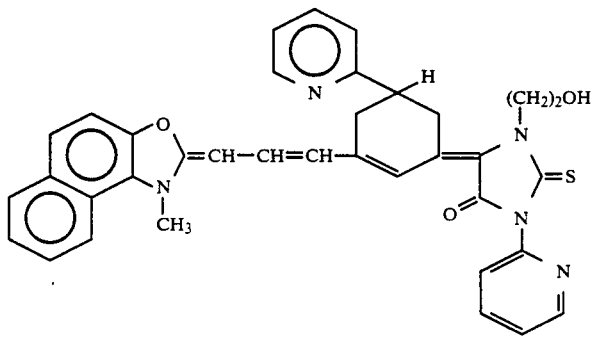
(13)
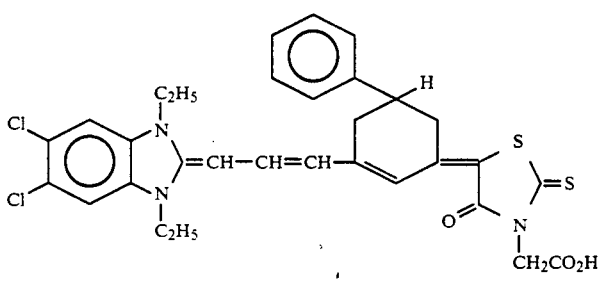
(14)
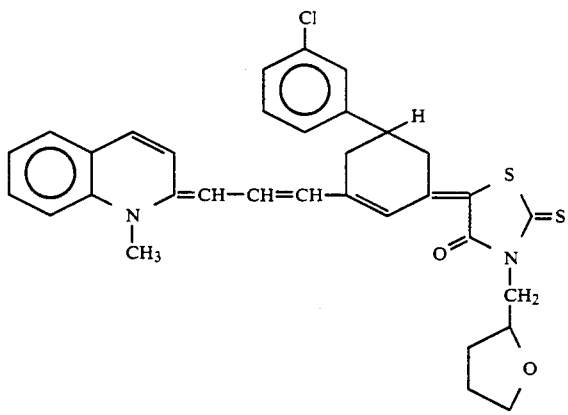
(15)
Methine Compounds Represented by General Formula [IIa]
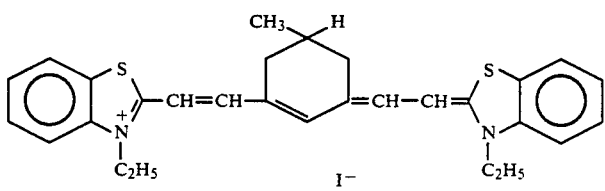
(16)

-continued
(17)
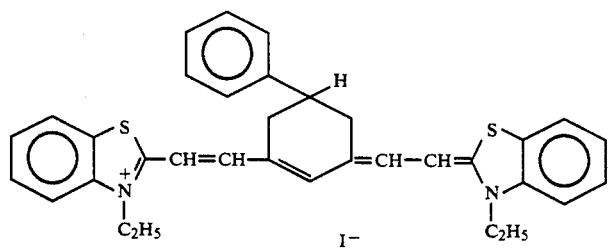
(18)
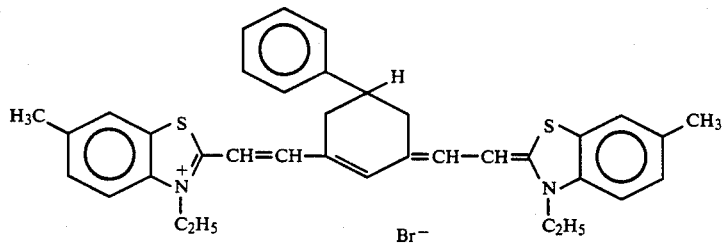
(19)
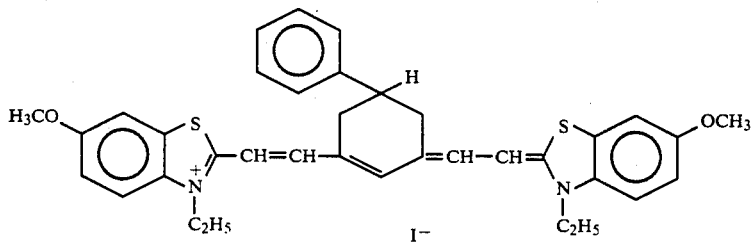
(20)
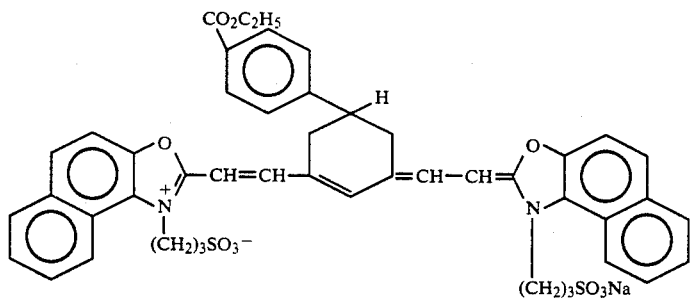
(21)
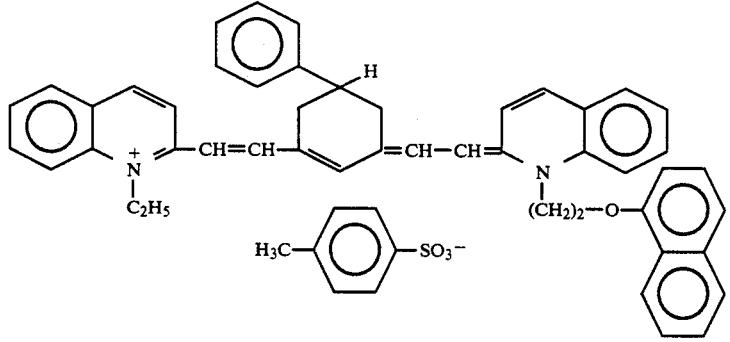
(22)
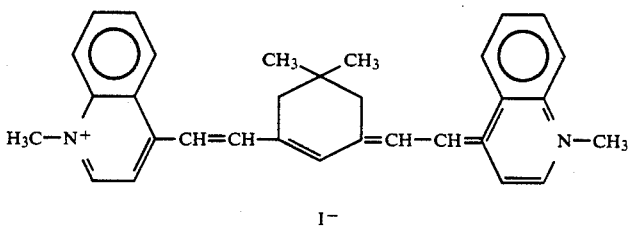

(23)

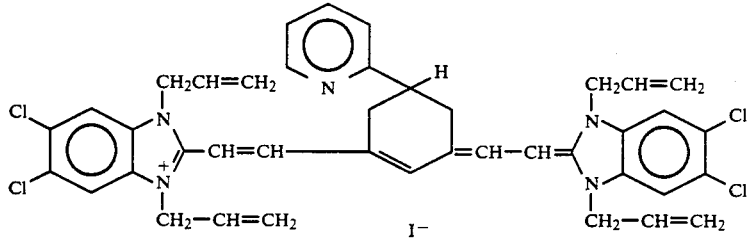

Methine Compounds Represented by General Formula [IIb]

(24)

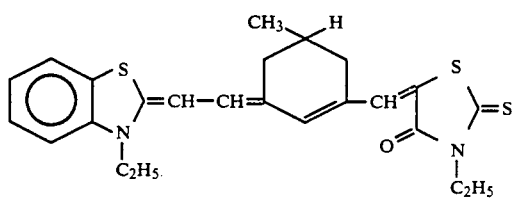

(25)

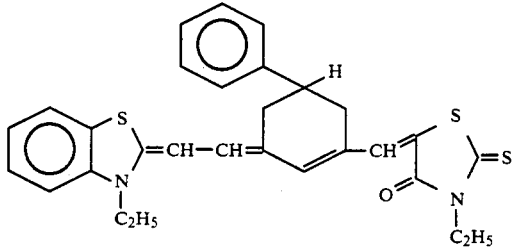

(26)

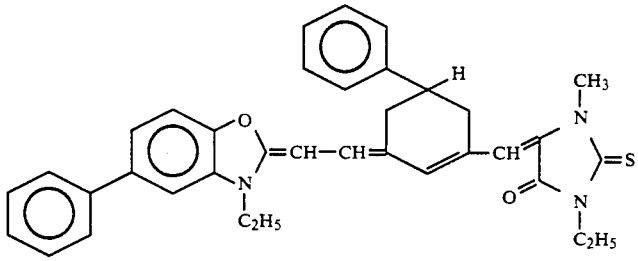

(27)

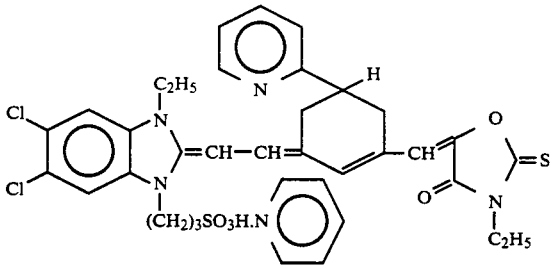

The methine compounds represented by general formulae [Ia], [Ib] and [Ic] of the present invention can be prepared from the compounds represented by general formula [Id] with reference to the aforementioned literature citations 1.

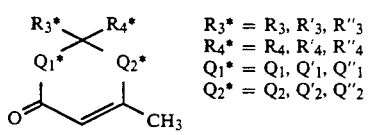

R3* = R3, R'3, R''3
R4* = R4, R'4, R''4
Q1* = Q1, Q'1, Q''1
Q2* = Q2, Q'2, Q''2

(Id)

The compounds represented by general formula [Id] can be prepared using the method disclosed in European patent 233,177, etc.

The methine compounds represented by general formulae [IIa] and [IIb] of the present invention can be prepared from the ketone represented by general formula (IIc) which is readily obtained (as a reagent, or by synthesis) using the methods described in examples 4, 5 and 6 or with reference to the aforementioned literature citation 3.

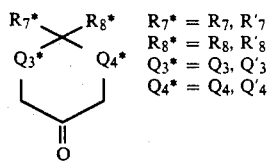

The methine compounds (sensitizing dyes) which are used in the present invention are included in the silver halide photographic emulsion in amounts of from $5\times10^{-7}$ to $5\times10^{-3}$ mol, preferably in amounts of from $1\times10^{-6}$ to $1\times10^{-3}$ mol, and most desirably in amounts of from $2\times10^{-6}$ mol to $5\times10^{-4}$ mol, per mol of silver halide.

The sensitizing dyes for use in the present invention can be directly dispersed in the emulsions. For example, the sensitizing dyes are dissolved in an appropriate solvent such as methyl alcohol, ethyl alcohol, methyl cellosolve, acetone, water, pyridine or a mixed solvent thereof and the resulting solutions are added to the emulsions. The dyes can be dissolved by using ultrasonic wave. Further, the infrared sensitizing dyes can be added by a method wherein the dyes are dissolved in volatile organic solvents, the resulting solutions are dispersed in hydrophilic colloid and the resulting dispersions are added to the emulsions as described in U.S. Pat. No. 3,469,987; a method wherein water-insoluble dyes are dispersed in water-soluble solvents without dissolving said dyes, and the resulting dispersions are added to the emulsions as described in JP-B-46-24185; a method wherein the dyes are dissolved in surfactants and the resulting solutions are added to the emulsions as described in U.S. Pat. No. 3,822,135; a method wherein the dyes are dissolved by using compounds causing red shift and the resulting solutions are added to the emulsions as described in JP-A-51-74624; a method wherein the dyes are dissolved in an acid substantially free from water and the resulting solutions are added to the emulsions as described in JP-A-50-80826; etc. In addition thereto, the dyes can be added to the emulsions by using methods described in U.S. Pat. Nos. 2,912,343, 3,342,605, 2,996,287, 3,429,835, etc. Further, the infrared sensitizing dyes may be uniformly dispersed in silver halide emulsions before coating on a support. It is preferred that the dyes are added before chemical sensitization or at the stage of the latter half of the formation of silver halide grains.

Among the polymethine compounds of the present invention, supersensitization with compounds represented by the following general formula [IV], [V], [VI], [VII], [VIIIa], [VIIIb] or [VIIIc] in particular is useful for M band type sensitization.

When the supersensitizing agents represented by the following general formula [IV] are used in combination with the supersensitizing agents represented by the following general formula [V], [VI], [VII], [VIIIa], [VIIIb] or [VIIIc], the supersensitization effect thereof can be greatly enhanced.

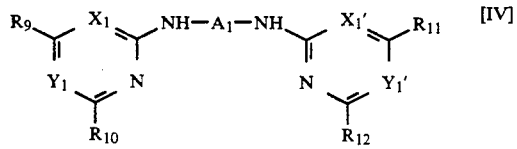

In the above formula, $A_1$ represents a bivalent aromatic residue; $R_9$, $R_{10}$, $R_{11}$ and $R_{12}$ represent each hydrogen atom, hydroxyl group, an alkyl group, an alkoxy group, an aryloxy group, a halogen atom, a heterocyclic nucleus, a heterocyclic thio group, an arylthio group, an amino group, an alkylamino group, an arylamino group, an aralkylamino group, an aryl group or a mercapto group, each of which may optionally have one or more substituent groups, with the proviso that at least one of $A_1$, $R_9$, $R_{10}$, $R_{11}$ and $R_{12}$ is a group having sulfo group; $X_1$, $Y_1$, $X_1'$, and $Y_1'$ represent each —CH= or —N= and at least one of $X_1$ and $Y_1$ and at least one of $X_1'$ and $Y_1'$ are —N=.

In general formula [IV], more specifically —$A_1$— represents a bivalent aromatic residue which may be substituted by —$SO_3M$ group [wherein M is hydrogen atom or a cation which impart water-solubility (e.g., sodium, potassium)].

Useful —$A_1$— group is chosen from among the following —$A_2$— and —$A_3$— groups, and when $R_9$, $R_{10}$, $R_{11}$ or $R_{12}$ does not have —$SO_3M$ group, —$A_1$— group is chosen from among the —$A_2$— group.

—$A_2$—;

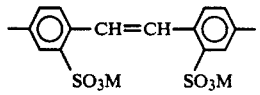

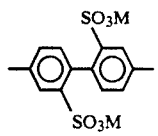

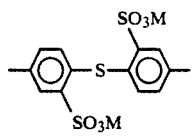

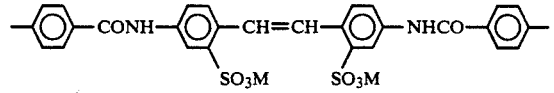

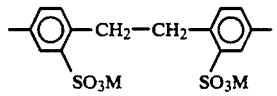

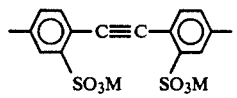

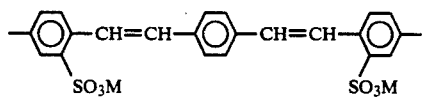

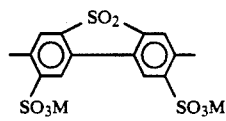

-continued

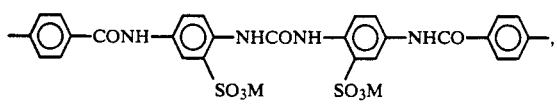

etc.

In the above formulae, M is hydrogen atom or a cation which imparts water-solubility.

—$A_3$—;

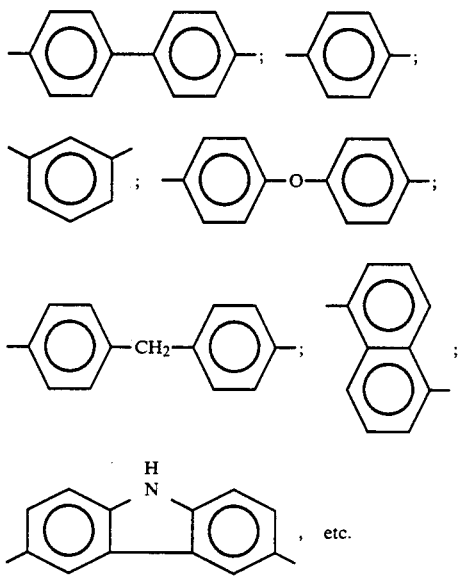

, etc.

$R_9$, $R_{10}$, $R_{11}$ and $R_{12}$ represents each hydrogen atom, hydroxyl group, an alkyl group (having preferably 1 to 8 carbon atoms, such as methyl, ethyl, n-propyl, n-butyl), an alkoxy group (having preferably 1 to 8 carbon atoms, such as methoxy, ethoxy, propoxy, butoxy), an aryloxy group (e.g., phenoxy, naphthoxy, o-tolyloxy, p-sulfophenoxy), a halogen atom (e.g., chlorine, bromine), a heterocyclic nucleus (e.g., morpholinyl, piperidyl), an alkylthio group (e.g., methylthio, ethylthio), a heterocyclic thio group (e.g., benzthiazolylthio, benzimidazolylthio, phenyltetrazolylthio), an arylthio group (e.g., phenylthio, tolylthio), an amino group, an alkylamino group or a substituted alkylamino group (e.g., methylamino, ethylamino, propylamino, dimethylamino, diethylamino, dodecylamino, cyclohexylamino, β-hydroxyethylamino, di-(β-hydroxyethyl)amino, β-sulfoethylamino), an arylamino group or a substituted arylamino group (e.g., anilino, o-sulfoanilino, m-sulfoanilino, p-sulfoanilino, o-toluidino, m-toluidino, p-toluidino, o-carboxyanilino, m-carboxyanilino, p-carboxyanilino, o-chloroanilino, m-chloroanilino, p-chloroanilino, p-aminoanilino, o-anisidino, m-anisidino, p-anisidino, o-acetaminoanilino, hydroxyanilino, disulfophenylamino, naphthylamino, sulfonaphthylamino), a heterocyclic amino group (e.g., 2-benzthiazolylamino, 2-pyridylamino), a substituted or unsubstituted aralkylamino group (e.g., benzylamino, o-anisylamino, m-anisylamino, p-anisylamino), an aryl group (e.g., phenyl) or a mercapto group.

$R_9$, $R_{10}$, $R_{11}$ and $R_{12}$ may be the same or different groups. When the —$A_1$— group is a member selected from the —$A_2$— group, at least one of $R_9$, $R_{10}$, $R_{11}$ and $R_{12}$ must be a group having sulfo group (in the free form or in the form of a salt). $X_1$, $Y_1$, $X_1'$ and $Y_1'$ are each —CH= or —N=, and it is preferred that $X_1$ and $X_1'$ are —CH= and $Y_1$ and $Y_1'$ are —N=.

Examples of the compounds of general formula [IV] which can be used in the present invention include, but are not limited to, the following compounds.

(IV-1) Disodium salt of 4,4'-bis[2,6-di(2-naphthoxy)-pyrimidine-4-ylamino]stilbene-2,2'-disulfonic acid (IV-2) Disodium salt of 4,4'-bis[2,6-di(2-naphthylamino)pyrimidine-4-ylamino stilbene-2,2'-disulfonic acid (IV-3) Disodium salt of 4,4'-bis[2,6-dianilinopyrimidine-4-ylamino]stilbene-2,2'-disulfonic acid (IV-4) Disodium salt of 4,4'-bis[2-(2-naphthylamino)-6-anilinopyrimidine-4-ylamino]stilbene-2,2'-disulfonic acid (IV-5) 4,4'-Bis[2,6-diphenoxypyrimidine-4-ylamino]stilbene-2,2'-disulfonic acid ditriethylammonium salt (IV-6) Disodium salt of 4,4'-bis[2,6-di(benzimidazolyl-2-thio)pyrimidine-4-ylamino]stilbene-2,2'-disulfonic acid (IV-7) Disodium salt of 4,4'-bis[4,6-di(benzthiazolyl-2-thio)pyrimidine-2-ylamino]stilbene-2,2'-disulfonic acid (IV-8) Disodium salt of 4,4'-bis[4,6-di(benzthiazolyl-2-amino)pyrimidine-2-ylamino]stilbene-2,2'-disulfonic acid (IV-9) Disodium salt of 4,4'-bis[4,5-di(naphthyl-2-oxy)-pyrimidine-2-ylamino]stilbene-2,2'-disulfonic acid (IV-10) Disodium salt of 4,4'-bis(4,6-diphenoxypyrimidine-2-ylamino)stilbene-2,2'-disulfonic acid (IV-11) Disodium salt of 4,4'-bis(4,6-diphenylthiopyrimidine-2-ylamino)stilbene-2,2'-disulfonic acid (IV-12) Disodium salt of 4,4'-bis(4,6-dimercaptopyrimidine-2-ylamino)biphenyl-2,2'-disulfonic acid (IV-13) Disodium salt of 4,4'-bis(4,6-dianilinotriazine-2-ylamino]stilbene-2,2'-disulfonic acid (IV-14) Disodium salt of 4,4'-bis(4-anilino-6-hydroxytriazine-2-ylamino)stilbene-2,2'-disulfonic acid (IV-15) Disodium salt of 4,4'-bis[4,6-di(naphthyl-2-oxy)pyrimidine-2-ylamino]bibenzyl-2,2'-disulfonic acid (IV-16) Disodium salt of 4,4'-bis(4,6-dianilinopyrimidine-2-ylamino)stilbene-2,2'-disulfonic acid (IV-17) Disodium salt of 4,4'-bis[4-chloro-6-(2-naphthyloxy)pyrimidine-2-ylamino]biphenyl-2,2'-disulfonic acid (IV-18) Disodium salt of 4,4'-bis[4,6-di(1-phenyltetrazolyl-5-thio)pyrimidine-2-ylamino]stilbene-2,2'-disulfonic acid (IV-19) Disodium salt of 4,4'-bis[4,6-di(benzimidazolyl-2-thio)pyrimidine-2-ylamino]stilbene-2,2'-disulfonic acid (IV-20) Disodium salt of 4,4'-bis(4-naphthylamino-6-anilinotriazine-2-ylamino)stilbene-2,2'-disulfonic acid Among them, the compounds of formulae (IV-1) to (IV-6) are preferred. The compounds of (IV-1), (IV-2), (IV-4), (IV-5), (IV-9), (IV-15) and (IV-20) are particularly preferred.

The compounds represented by general formula [IV] are used in an amount of 0.01 to 5 g per mol of silver halide and advantageously in a ratio by weight of said compound to the sensitizing dye of from 1/1 to 100/1, preferably from 2/1 to 50/1. It is preferred that said compounds of general formula [IV] are used in combination with the compounds of the following general formula [V].

The compounds represented by the following general formula [V] are illustrated below.

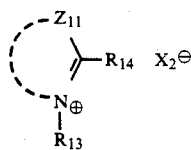

In the above formula, $Z_{11}$ represents a non-metallic atomic group required for forming a 5-membered or 6-membered nitrogen-containing heterocyclic ring. The ring may be condensed with benzene ring or naphthalene ring. Examples of the ring include thiazoliums (e.g., thiazolium, 4-methylthiazolium, benzthiazolium, 5-methylbenzthiazolium, 5-chlorobenzthiazolium, 5-methoxybenzthiazolium, 6-methylbenzthiazolium, 6-methoxybenzthiazolium, naphtho[1,2-d]thiazolium, naphtho[2,1-d]thiazolium), oxazoliums (e.g., oxazolium, 4-methyloxazolium, benzoxazolium, 5-chlorobenzoxazolium, 5-phenylbenzoxazolium, 5-methylbenzoxazolium, naphtho[1,2-d]oxazolium), imidazoliums (e.g., 1-methylbenzimidazolium, 1-propyl-5-chlorobenzimidazolium, 1-ethyl-5,6-dichlorobenzimidazolium, 1-allyl-5-trifluoromethyl-6-chlorobenzimidazolium) and selenazoliums (e.g., benzoselenazolium, 5-chlorobenzoselenazolium, 5-methylbenzoselenazolium, 5-methoxybenzoselenazolium, naphtho[1,2-d]selenazolium).

$R_{13}$ represents hydrogen atom, an alkyl group (having preferably not more than 8 carbon atoms, e.g., methyl, ethyl, propyl, butyl, pentyl) or an alkenyl group (e.g., allyl group). $R_{14}$ represents hydrogen atom or a lower alkyl group e.g., methyl, ethyl). $R_{13}$ and $R_{14}$ each may be a substituted alkyl group. $X_2^{\ominus}$ represents an acid anion (e.g., $Cl^-$, $Br^-$, $I^-$, $ClO_4^-$). Among the groups represented by $Z_{11}$, thiazoliums are preferred. Substituted or unsubstituted benzthiazoliums or naphthothiazoliums are more preferred. These groups may be optionally substituted.

Examples of the compounds represented by general formula [V] include, but are not limited to, the following compounds.

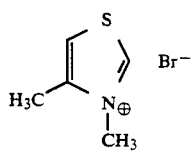
[V-1]

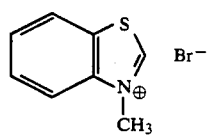
[V-2]

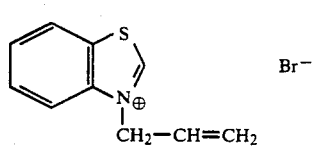
[V-3]

[V-4]

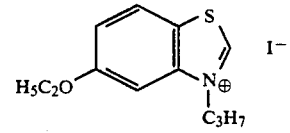
[V-5]

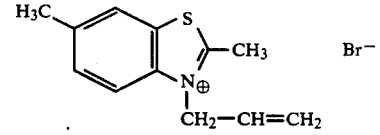
[V-6]

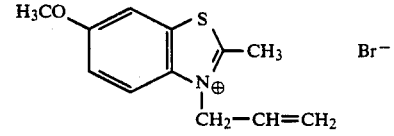
[V-7]

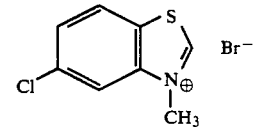
[V-8]

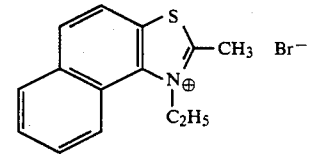
[V-9]

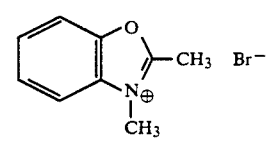
[V-10]

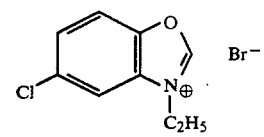
[V-11]

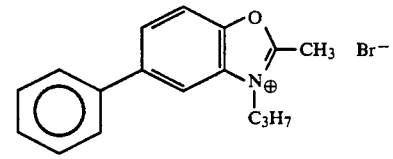
[V-12]

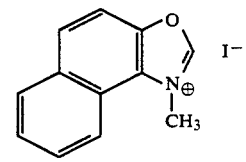
[V-13]

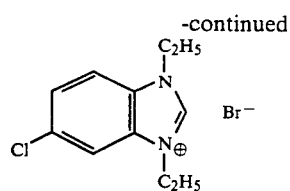 [V-14]

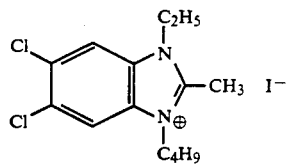 [V-15]

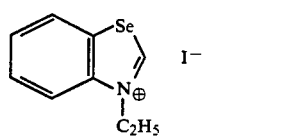 [V-16]

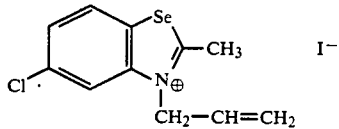 [V-17]

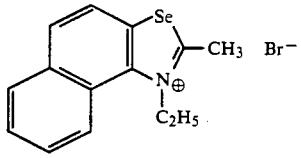 [V-18]

The compounds represented by general formula [V] according to the present invention are used in an amount of preferably about 0.01 to 5 g per mol of silver halide in the emulsion.

The polymethine dyes of general formula [Ia], [Ib], [Ic], [IIa] or [IIb] and the compound of general formula [V] are used in a ratio by weight of the dyes of general formula [Ia], [Ib], [Ic], [IIa] or [IIb] to the compound of general formula [V] of preferably from 1/1 to 1/300, particularly preferably from ½ to 1/50.

The compounds represented by general formula [V] according to the present invention can be directly dispersed in the emulsions. The compounds may be dissolved in an appropriate solvent (e.g., water, methyl alcohol, ethyl alcohol, propanol, methyl cellosolve, acetone) or a solvent mixture of two or more of them, and the resulting solution may be added to the emulsions. Alternatively, the compounds in the form of a dispersion in a solution or colloid can be added to the emulsions according to the methods for the addition of sensitizing dyes.

The compounds of general formula [V] may be added to the emulsions before or after the sensitizing dyes of general formula [Ia], [Ib], [Ic], [IIa] or [IIb] are added. The compounds of general formula [V] and the sensitizing dyes of general formula [Ia], [Ib], [Ic], [IIa] or [IIb] may be separately dissolved and the resulting solutions may be simultaneously added to the emulsions. Alternatively, after the solutions were mixed, the mixture may be added to the emulsions.

It is preferred that a combination of the infrared sensitizing dyes of general formula [Ia], [Ib], [Ic], [IIa] or [IIb] and the compound of general formula [V] according to the present invention is used together with the compound of general formula [IV].

When the supersensitizing agent of general formula [IV] or [V] together with a heterocyclic mercapto compound is used in the infrared-sensitized high silver chloride emulsion of the present invention, latent image is stabilized and the linear development dependence of gradation is remarkably improved in addition to high sensitization and the inhibition of fogging.

Examples of the heterocyclic mercapto compound include heterocyclic compounds which have thiazole ring, oxazole ring, oxazine ring, thiazole ring, thiazoline ring, selenazole ring, imidazole ring, indoline ring, pyrrolidine ring, tetrazole ring, thiadiazole ring, quinoline ring or oxadiazole ring and is substituted by mercapto group. Compounds into which further carboxyl group, sulfo group, a carbamoyl group, a sulfamoyl group or hydroxyl group is introduced, are particularly preferred. The specification of JP-B-43-22883 discloses that heterocyclic mercapto compounds are used as supersensitizing agents. When the heterocyclic mercapto compound is used together with the compound of general formula [V] in the present invention, remarkable fog-inhibiting effect and supersensitization effect can be obtained. Mercapto compounds represented by the following general formulae [VI] and [VII] are particularly preferred.

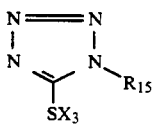 [VI]

In the above formula, $R_{15}$ represents an alkyl group, an alkenyl group or an aryl group; and $X_3$ represents hydrogen atom, an alkali metal atom, ammonium group or a precursor. Examples of the alkali metal atom include sodium atom and potassium atom. Examples of the ammonium group include tetramethylammonium group and trimethylbenzylammonium group. The term "precursor" as used herein refers to a group which forms $X_3$=H or an alkali metal under alkaline conditions. Examples thereof include acetyl group, cyanoethyl group and methanesulfonylethyl group.

The alkyl group and the alkenyl group represented by $R_{15}$ may be unsubstituted or substituted and in the form of an alicyclic group. Examples of substituent groups for the substituted alkyl group include a halogen atom, nitro group, cyano group, hydroxyl group, an alkoxy group, an aryl group, an acylamino group, an alkoxycarbonylamino group, a ureido group, an amino group, a heterocyclic group, an acyl group, a sulfamoyl group, a sulfonamido group, a thioureido group, a carbamoyl group, an alkylthio group, an arylthio group, a heterocyclic thio group, carboxyl group (or a salt) or sulfo group (or a salt). Each of the ureido group, the thioureido group, the sulfamoyl group, the carbamoyl group and the amino group may be unsubstituted, N-alkyl-substituted or N-aryl-substituted. Examples of the aryl group include phenyl group and substituted phenyl group. Examples of substituent groups for phenyl group include an alkyl group and those already described above in the definition of the substituent groups for the alkyl group.

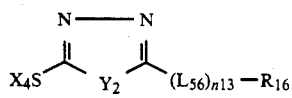 [VII]

In the above formula, $Y_2$ represents oxygen atom, sulfur atom, =NH or =N—$(L_{57})_{n14}$—$R_{17}$; $L_{56}$ and $L_{57}$ represent each a bivalent bonding group; $R_{16}$ and $R_{17}$ represent each hydrogen atom, an alkyl group, an alkenyl group or an aryl group; the alkyl group, the alkenyl group and the aryl group represented by $R_{16}$ and $R_{17}$ have the same meaning as $R_{15}$ in general formula [VI]; and $X_4$ has the same meaning as $X_3$ in general formula [VI].

Examples of the bivalent bonding group represented by $L_{56}$ and $L_{57}$ include

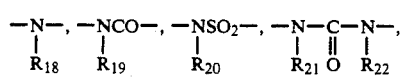

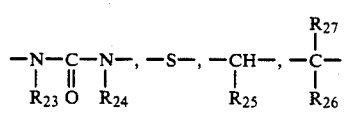

or a combination thereof.

In the above formula, $n_{13}$ and $n_{14}$ represent each 0 or 1. $R_{18}$, $R_{19}$, $R_{20}$, $R_{21}$, $R_{22}$, $R_{23}$, $R_{24}$, $R_{25}$ and $R_{26}$ represent each hydrogen atom, an alkyl group or an aralkyl group.

The compounds are incorporated in a layer or layers of the light-sensitive and light-insensitive hydrophilic colloid layers of a silver halide photographic material.

The compounds of general formula [VI] or [VII] are used in an amount of preferably $1 \times 10^{-5}$ to $5 \times 10^{-2}$ mol, more preferably $1 \times 10^{-4}$ to $1 \times 10^{-2}$ mol per mol of silver halide when the compounds are incorporated in the silver halide photographic material. The compounds in an amount of $1 \times 10^{-6}$ to $1 \times 10^{-3}$ mol/l, preferably $5 \times 10^{-6}$ to $5 \times 10^{-4}$ mol/l may be added as anti-fogging agents to color developing solutions.

Examples of the compounds represented by general formulae [VI] and [VII] include, but are not limited to, the following compounds. The compounds described in JP-A-62-269957, pages 4 to 8 can be mentioned, and the following compounds are particularly preferred.

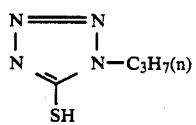 [VI-1]

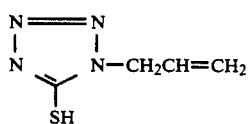 [VI-2]

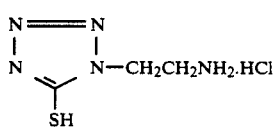 [VI-3]

-continued

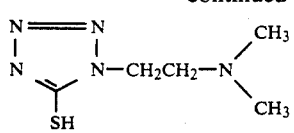 [VI-4]

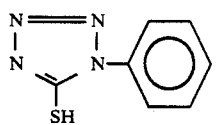 [VI-5]

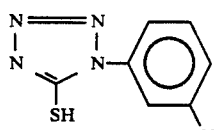 [VI-6]

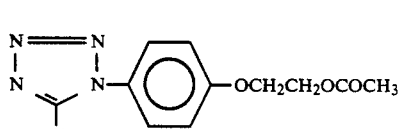 [VI-7]

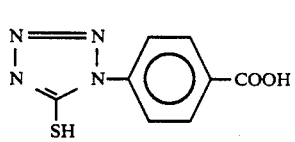 [VI-8]

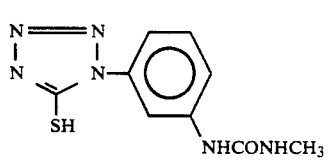 [VI-9]

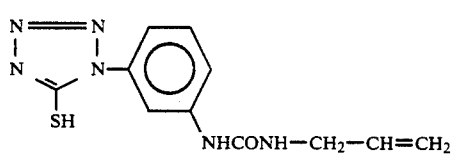 [VI-10]

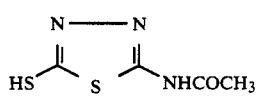 [VII-1]

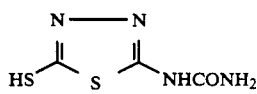 [VII-2]

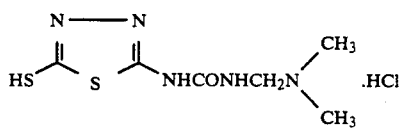 [VII-3]

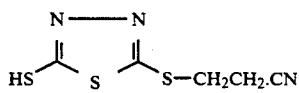 [VII-4]

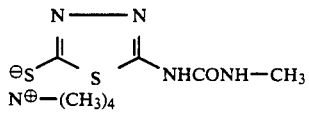 [VII-5]

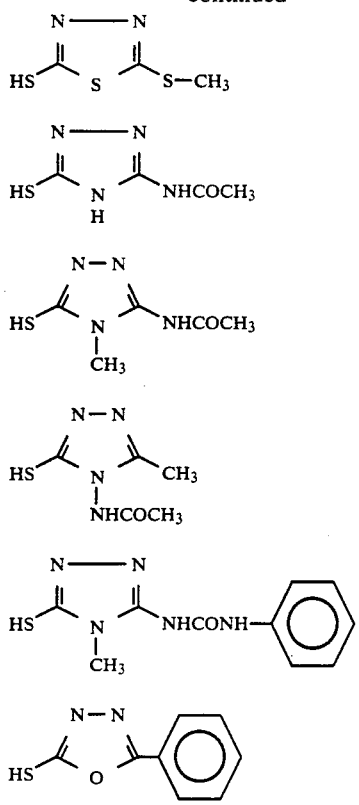

Further, condensates composed of 2 to 10 condensation units of a substituted or unsubstituted polyhydroxybenzene represented by the following general formula [VIIIa], [VIIIb] or [VIIIc] with formaldehyde are useful as supersensitizing agents for the polymethine dyes of the present invention. The condensates have an effect of preventing latent image from being faded with the passage of time and preventing gradation from being lowered.

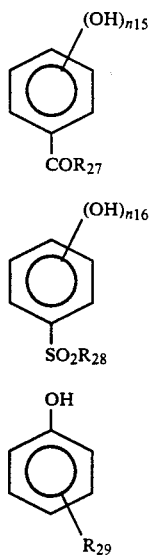

In the above formulas $R_{27}$ and $R_{28}$ represent each OH, OM', $OR_{30}$, $NH_2$, $NHR_{30}$, $-N(R_{30})_2$, $-NHNH_2$ or $-NHNHR_{30}$; $R_{30}$ represents an alkyl group having 1 to 8 carbon atoms, an allyl group or an aralkyl group; M' represents an alkali metal or an alkaline earth metal; $R_{29}$ represents OH or a halogen atom; $n_{15}$ and $n_{16}$ represent each 1, 2 or 3.

Examples of the substituted or unsubstituted polyhydroxybenzene as the component of the aldehyde condensate used in the present invention include, but are not limited to, the following compounds.

(VIII-1) β-Resorcylic acid
(VIII-2) γ-Resorcylic acid
(VIII-3) 4-Hydroxybenzoic acid hydrazide
(VIII-4) 3,5-Hydroxybenzoic acid hydrazide
(VIII-5) p-Chlorophenol
(VIII-6) Sodium hydroxybenzenesulfonate
(VIII-7) p-Hydroxybenzoic acid
(VIII-8) o-Hydroxybenzoic acid
(VIII-9) m-Hydroxybenzoic acid
(VIII-10) p-Dioxybenzene
(VIII-11) Gallic acid
(VIII-12) Methyl p-hydroxybenzoate
(VIII-13) o-Hydroxybenzenesulfonamide (VIII-14) N-Ethyl-o-hydroxybenzoic acid amide

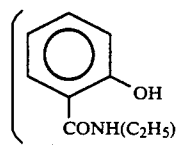

(VIII-15) N-Diethyl-o-hydroxybenzoic acid amide

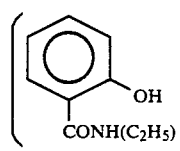

(VIII-16) o-Hydroxybenzoic acid 2-methylhydrazide

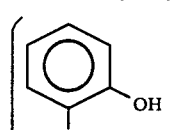

More concretely, the polyhydroxy compounds can be chosen from among the derivatives of compounds represented by general formulae [IIa], [IIb] and [IIc] described in the specification of JP-B-49-49504.

Silver Halide Emulsion

Silver halide emulsions which can be used in the present invention may contain any of silver bromide, silver iodobromide, silver iodochlorobromide, silver chlorobromide and silver chloride.

The silver halide grains of the present invention may have regular crystal form such as cube, octahedron, tetradecahedron or rhombic dodecahedron, irregular crystal form such as sphere or plate form or a composite form of these crystal forms. A mixture of grains having various crystal forms may be used.

As the above-described plate-form grains, there are preferred tabular grains having a thickness of 0.5 μm, preferably not larger than 0.3 μm, a diameter of preferably not smaller than 0.6 μm and such a grain size distribution that grains having an average aspect ratio of not lower than 5 account for at least 50% of the entire projected area of the entire grains.

The interior and surface layer of the silver halide grain may be composed of different phases or a uniform phase. There may be used any of grain wherein a latent image is predominantly formed on the surface thereof (e.g., negative type emulsion) and grain wherein a latent image is predominantly formed in the interior thereof (e.g., internal latent image type emulsion).

Silver halide emulsions which can be preferably used in the present invention are illustrated in detail below.

The silver halide emulsions of the present invention, particularly silver halide grains have such a structure that localized phases are provided on the surfaces of the grains, whereby infrared wavelength region is spectral-sensitized, and high sensitivity and stability can be obtained, particularly the excellent stability of latent image can be obtained. Particularly, there can be obtained the stability of the latent image in combination with supersensitization, said stability being acceptable even when high silver chloride emulsion is used. This is a surprising characteristic.

Preferably, the silver halide grains of the present invention have such a halogen composition that at least 95 mol % of the entire silver halide constituting silver halide grains is composed of silver chloride and silver halide is composed of silver chlorobromide containing substantially no silver iodide. The term "containing substantially no silver iodide" as used herein means that the content of silver iodide is not higher than 1.0 mol %. It is particularly preferred that the silver halide grains have such a halogen composition that 95 to 99.9 mol % of the entire silver halide constituting silver halide grains is composed of silver chloride and silver halide is composed of silver chlorobromide containing substantially no silver iodide.

It is also preferred that the silver halide grains of the present invention have localized phases on the surfaces of grains and/or in the interiors thereof, said localized phase being different in the silver bromide content from the substrate grain.

Further, it is preferred that the silver halide grains of the present invention have localized phases having a silver bromide content of more than 15 mol %. The localized phases whose silver bromide content is higher than that of the area surrounding them may be arbitrarily arranged according to purpose. The phases may exist in the interiors of the silver halide grains, on the surfaces thereof or on the sub-surfaces thereof or may exist partly in the interiors thereof and partly on the surfaces or sub-surfaces thereof. The localized phases may have a layer structure surrounding the silver halide grain in the interior thereof or on the surface thereof. Alternatively, the localized phases may have a discontinuously isolated structure. In a preferred embodiment of the arrangement of the localized phases, the localized phases having a silver bromide content of more than 15 mol % are formed by locally epitaxial growth on the surfaces of silver halide grains.

It is preferred that the silver bromide content of the localized phase exceeds 15 mol %. However, when the silver bromide content is too high, there is a possibility that when pressure is applied to the light-sensitive material, desensitization is caused and sensitivity and gradation are greatly varied by change in the composition of the processing solution. As a result, the photographic material is deteriorated. When this is taken into consideration, the silver bromide content is in the range of preferably 20 to 60 mol %, most preferably 30 to 50 mol %. Silver chloride is preferred as other silver halide which constitutes the localized phase. The silver bromide content of the localized phase can be analyzed by X-ray diffractometry (e.g., described in New Experimental Chemical Lecture 6, Structure Analysis, edited by Japanese Chemical Society, published by Maruzen) or XPS method (e.g., "Surface Analysis, -IMA, Application of O.J. electron, photoelectron spectroscopy"). The localized phase comprises preferably 0.1 to 20%, more preferably 0.5 to 7% of the total amount of silver of silver halide grain.

The interface between the localized phase having a high silver bromide content and other phase may be a clear phase boundary or may have a short transition zone where the halogen composition is gradually changed.

The localized phases having such a high silver bromide content can be formed by various methods. For example, the localized phases can be formed by reacting a soluble silver salt with a soluble halide salt according to a single jet process or a double jet process, or by a conversion method including a stage where an already formed silver halide is converted to silver halide having a smaller solubility product. Alternatively, the localized phases can be formed by adding fine silver bromide grains to silver chloride grains to recrystallize fine silver bromide grains on the surfaces of the silver chloride grains.

When silver halide grains have the discontinuously isolated localized phases on the surfaces of the grains, the grain substrate and the localized phase exist on the same surface and hence they function simultaneously in each process of exposure and development. Accordingly, such grains have advantages in high sensitization, the formation of latent image, rapid processing, particularly the balance of gradation, in the effective utilization of silver halide, etc. High sensitization, the stabilization of sensitivity, the stability of the latent image, etc. which cannot be achieved by conventional infrared sensitized high silver chloride emulsions can be remarkably improved on the whole by providing the localized phase, while retaining rapid processability which silver chloride emulsions have is kept.

Rapid development can be easily facilitated by adsorbing anti-fogging agents, sensitizing dyes, etc. on the grain substrates and the localized phases so as to allow them to function separately or by chemically sensitizing them to inhibit the formation of fog.

The silver halide grains of the present invention are a hexahedron, tetradecahedron, etc. having (100) face. It is preferred that the localized phases exist on the corners of the hexahedrons or in the vicinity thereof, or on the surface site of (111) face. Such discontinuously isolated localized phases existing on the surfaces of the silver halide grains can be formed by halogen conversion wherein bromine ion is fed to an emulsion comprising substrate grains while pAg, pH, temperature and time are controlled. Preferably, halogen ion at a low concentration is fed. For example, halogen compounds having a capsule film covered with a semi-penetration film or organic halogen compounds can be used. Further, the localized phases can be formed by a method wherein silver halide is grown on localized sites by feeding silver ion and halogen ion to an emulsion comprising the substrate grains while controlling pAg, etc. or a method wherein silver halide grains such as fine grains of silver iodobromide, silver bromide, silver chlorobromide or silver iodochlorobromide which have a smaller grain size than that of the substrate grains are mixed with an emulsion comprising the substrate grain to recrystallize fine grains. If desired, a small amount of a solvent for silver halide is allowed to coexist. Further, CR-compounds described in European Patents 273430 and 273429, Japanese Patent Application Nos. 62-86163, 62-86165 and 62-152330 and Japanese Patent Application No. 62-86252 (corresponding to JP-A-1-6941) can be used. The end point of the formation of the localized phases can be judged by observing the form of silver halide during the course of ripening while comparing the form of the grains during ripening with the form of the silver halide grains of the substrate. The silver halide composition of the localized phases can be measured by XPS (X-ray photoelection spectroscopy using, for example, ESCA 750 type spectrograph (manufactured by Shimazu-du Pont). More concretely, the measurement is described in *Surface Analysis*, written by Someno and Yasumorii (published by Kodansha, 1977). Of course, the silver halide composition can be calculated from manufacturing formulation. The silver halide composition such as silver bromide content of the localized phases on the surface of silver halide can be measured by EDX (Energy Dispersive X-ray Analysis) using EDX spectrometer equipped with a transmission type electron microscope. The measurement can be made with an accuracy of about 5 mol % by using an aperture having a diameter of about 0.1 to 0.2 $\mu$m. More concretely, the measurement is described in Electron Beam Microanalysis, written by Hiroyoshi Soejima (published by Nikkan Kogyo Shinbunsha, 1987).

The silver halide emulsions of the present invention comprise grains having a mean grain size (an average of the diameters of spheres having a volume equal to grain) of preferably not larger than 2 $\mu$m, but not smaller than 0.1 $\mu$m, more preferably not larger than 0.4 $\mu$m, but not smaller than 0.15 $\mu$m.

A narrower grain size distribution is preferred and monodisperse emulsions are preferred. Monodisperse emulsions having a regular form are particularly preferred. It is preferred that emulsions comprise grains having such a grain size distribution that at least 85%, particularly at least 90% (in terms of the number of grains or the weight of grains) of the entire grains is composed of grains having a grain size of within the mean grain size ±20%.

The silver chlorobromide emulsions of the present invention can be prepared according to the methods described in P. Glafkides, *Chimie et Physique Photographique* (Paul Montel, 1967), G. F. Duffin, *Photographic Emuslion Chemistry* (Focal Press, 1966), V. L. Zelikman et al., *Making and Coating Photographic Emulsion* (Focal Press, 1964), etc. Namely, any of the acid process, the neutral process and the ammonia process can be used, but the acid process is particularly preferred. A soluble silver salt and a soluble halide salt can be reacted in accordance with a single jet process, a double jet process or a combination thereof. The double jet process is preferred to obtain monodisperse grains which can be preferably used in the present invention. There can be used a reverse mixing method in which grains are formed in the presence of excess silver ion. There can also be used a controlled double jet process in which the concentration of silver ion in a liquid phase, in which silver halide is formed, is kept constant. According to this process, there can be obtained a monodisperse silver halide emulsion which comprises grains having a regular crystal form and a narrow grain size distribution and is suitable for use in the present invention. It is desirable that the above-described grains suitable for use in the present invention are prepared on the basis of the double jet process.

It is preferred that physical ripening is carried out in the presence of conventional solvents for silver halide (e.g., ammonia, potassium thiocyanate or thioethers and thione compounds described in U.S. Pat. No. 3,271,157, JP-A-51-12360, JP-A-53-82408, JP-A-53-144319, JP-A-54-100717, JP-A-54-155828, etc.), because there can be obtained a monodisperse silver halide emulsion which comprises grains having a regular crystal form and a narrow grain size distribution.

After physical ripening, soluble silver salts can be removed from the emulsion by noodle washing, flocculation precipitation method, ultrafiltration, etc.

Silver halide emulsions which are used in the present invention can be chemical-sensitized by sulfur sensitization, selenium sensitization, reduction sensitization, noble metal sensitization, etc. singly or in combination. Namely, there can be used sulfur sensitization method using active gelatin or sulfur-containing compounds capable of reacting with silver ion (e.g., thiosulfates, thiourea compounds, mercapto compounds, rhodanine compounds); reduction sensitization methods using reducing materials (e.g., stannous salts, amine salts, hydrazine derivatives, formamidinesulfinic acid, silane compounds); and noble metal sensitization method using metallic compounds (e.g., gold complex salts and complex salts of Group VIII metals in the periodic table such as Pt, Ir, Pd, Rh and Fe). These methods may be used alone or in combination. Complex salts of Group VIII metals such as Ir, Rh and Fe may be separately used in the substrate and the localized phase, or may be distributed between the substrate and the localized phase. Sulfur sensitization or selenium sensitization is particularly preferred for the monodisperse silver chlorobromide emulsion which can be preferably used in the present invention. It is also preferred that sensitization is carried out in the presence of a hydroxyazaindene compound.

Light Source

Exposure for obtaining a photographic image may be carried out by conventional methods. Any of conventional light sources such as natural light (sunlight), tungsten light, fluorescent lamp, mercury vapor lamp, xenon arc lamp, carbon arc lamp, xenon flash lamp and cathode ray tube flying spot can be used. Exposure time is generally from 1/1000 second to 1 second when a camera is used. However, exposure time of shorter than 1/1000 second may be used. For example, when xenon flash lamp or cathode ray tube is used, exposure time may be as short as $1/10^4$ to $1/10^6$ second. If desired, exposure time of longer than 1 second may be used. If desired, the spectral composition of light for use in exposure can be controlled through color filters. Laser beam can be used for exposure. Exposure may be carried out by light radiated from phosphors excited by electron beam, X-rays, gamma rays, alpha rays, etc.

When laser beam is used, semiconductor laser is preferred. Examples of the semiconductor laser include those using materials such as $In_{1-x}Ga_xP$ ($\sim$700 nm), $GaAs_{1-x}P_x$ (610~900 nm), $Ga_{1-x}Al_xAs$ (690~900 nm), InGaAsP (1100~1670 nm) and AlGaAsSb (1250~1400 nm). In addition to the above-described semiconductor laser, there may be used YAG laser (1064 nm) wherein Nb: YAG crystal is excited with $GaAs_xP_{(1-x)}$ light-emitting diode. It is preferred that laser beam is chosen from among semiconductor laser beams of 670, 680, 750, 780, 810, 830 and 880 nm.

Further, non-linear optical effect may be used. Secondly higher frequency forming element (SHG element) refers to that the wavelength of laser beam is transduced into ½ by utilizing non-linear optical effect. For example, there can be used an element using CD*A and KD*P as non-linear optical crystals (see, Laser Handbook, pages 122-139, edited by Laser Society, Dec. 15, 1982). Further, there can be used $LiNbO_3$ light waveguide path element wherein a light waveguide path is formed with $LiNbO_3$ crystal by ion-exchanging $Li^+$ with $H^+$ (NIKKEI ELECTRONICS, 1986,7,14 (No. 399) pages 89-90).

An output device described in Japanese Patent Application No. 63-226552 (corresponding to JP-A-2-74942) can be used in the present invention.

Processing

Light-sensitive materials prepared by the present invention can be processed by conventional photographic processing methods (color photographic processing) and processing solutions for forming dye images as described in *Research Disclosure*, No. 176, pages 28-30(RD-17643) (December 1978).

Preferred embodiments of color development stage and processing solutions which can be applied to the light-sensitive materials of the present invention are illustrated below.

It is preferred that the color photographic materials of the present invention are subjected to color development, bleaching-fixing and rinsing (or stabilization treatment). Bleaching and fixing may be carried out by one bath as described above or may be separately carried out.

Color developing solutions which are used in the present invention contains aromatic primary amine color developing agents. Preferred developing agents are p-phenylenediamine derivatives. Typical examples of the p-phenylenediamine derivatives include, but are not limited to, the following compounds.

D-1: N,N-Diethyl-p-phenylenediamine
D-2: 2-Amino-5-diethylaminotoluene
D-3: 2-Amino-5-(N-ethyl-N-laurylamino)toluene
D-4: 4-[N-Ethyl-N-(8-hydroxyethyl)amino]aniline
D-5: 2-Methyl-4-[N-ethyl-N-(8-hydroxyethyl)amino]aniline
D-6: 4-Amino-3-methyl-N-ethyl-N-[β-(methanesulfonamido)ethyl]aniline
D-7: N-(2-Amino-5-diethylaminophenylethyl)methanesulfonamide
D-8: N,N-Dimethyl-p-phenylenediamine
D-9: 4-Amino-3-methyl-N-ethyl-N-methoxyethylaniline
D-10: 4-Amino-3-methyl-N-ethyl-N-8-ethoxyethylaniline
D-11: 4-Amino-3-methyl-N-ethyl-N-8-butoxyethylaniline Among the above-described p-phenylenediemine derivatives, 4-amino-3-methyl-N-ethyl-N-[β-(methanesulfonamido)ethyl]aniline (Compound D-6) is particularly preferred.

These p-phenylenediamine derivatives may be used in the form of a salt such as sulfate, hydrochloride, sulfite or p-toluenesulfonate. The aromatic primary amine developing agents are used at a concentration of preferably about 0.1 to about 20 g, more preferably about 0.5 to about 10 g per liter of developing solution.

In the practice of the present invention, it is preferred that developing solutions containing substantially no benzyl alcohol are used. The term "containing substantially no benzyl alcohol" as used herein means that the concentration of benzyl alcohol is preferably not higher than 2 ml/l, more preferably not higher than 0.5 ml/l. It is most preferred that the developing solutions are completely free from benzyl alcohol.

It is also preferred that the developing solutions of the present invention contain substantially no sulfite ion. Sulfite ion functions as a preservative for the developing agents and at the same time, sulfite ion has an effect of dissolving silver halide and is reacted with the oxidation products of the developing agents to thereby reduce a dye-forming efficiency. It is believed that such effects cause an increase in the fluctuation of photographic characteristics in continuous processing. The term "containing substantially no sulfite ion" as used herein means that the concentration of sulfite ion is preferably not higher than $3.0\times10^{-3}$ mol/l. It is most preferred that the developing solutions are completely free from sulfite ion. In the present invention, however, a very small amount of sulfite ion is excluded, said sulfite ion being used to prevent processed kit containing a concentrated developing agent before the preparation of a working solution from being oxidized.

It is preferred that the developing solutions of the present invention contain substantially no sulfite ion as mentioned above. It is more preferred that the developing solutions contain substantially no hydroxylamine. This is because it is believed that hydroxylamine functions as a preservative and at the same time, hydroxylamine itself has a silver development activity and photographic characteristics are greatly affected by a change in the concentration of hydroxylamine. The term "containing substantially no hydroxylamine" as used herein means that the concentration of hydroxylamine is preferably not more than $5.0\times10^{-3}$ mol/l. It is most preferred that the developing solutions are completely free from hydroxylamine.

It is preferred that the developing solutions of the present invention contain organic preservatives in place of hydroxylamine and sulfite ion.

The term "organic preservative" as used herein refers to the whole of organic compounds having an effect of retarding the deterioration rate of aromatic primary amine color developing agents when added to processing solutions for color photographic materials. Namely, the organic preservatives are organic compounds which have a function capable of preventing the color developing agents from being oxidized by air, etc. Among them, particularly effective organic preservatives are hydroxylamine derivatives (excluding hydroxylamine, the same applies hereinafter), hydroxamic acids, hydrazines, hydrazides, phenols, α-hydroxyketones, α-aminoketones, saccharide, monoamines, diamines, polyamines, quaternary ammonium salts, nitroxyl radicals, alcohols, oximes, diamide compounds and condensed ring amines. These compounds are described in JP-A-63-4235, JP-A-63-30845, JP-A-63-21647, JP-A-3-44655, JP-A-63-53551, JP-A-63-43140, JP-A-63-56654, JP-A-63-58346, JP-A-63-43138, JP-A-63-146041, JP-A-63-44657, JP-A-63-44656, U.S. Pat. Nos. 3,615,503 and 2,494,903, JP-A-52-143020, JP-B-48-30496, etc.

Other preservatives such as various metals described in JP-A-57-44148 and JP-A-57-53749; salicylic acids described in JP-A-59-180588; alkanolamines described in JP-A-54-3532; polyethyleneimines described in JP-A-56-94349; and aromatic polyhydroxy compounds described in U.S. Pat. No. 3,746,544 may be optionally contained. Particularly, the addition of alkanolamines such as triethanolamine, dialkylhydroxylamines such as diethylhydroxylamine, hydrazine derivatives or aromatic polyhydroxy compounds is preferred.

Among the organic preservatives, hydroxylamine derivatiaves and hydrazine derivatives (hydrazines and hydrazides) are particularly preferred. The details thereof are described in Japanese Patent Application Nos. 62-255270, 63-9713, 63-9714 and 63-11300 (corresponding to JP-A-1-97953, JP-A-1-186939, JP-A-1-186940 and JP-A-1-187557, respectively), etc.

It is more preferred from the viewpoint of improving the stability of the color developing solutions, that is, improving stability during continuous processing that the hydroxylamine derivatives or the hydrazine derivatives are used in combination with the amines.

The amines include cyclic amines described in JP-A-63-239477, amines described in JP-A-63-128340 and amines described in Japanese Patent Application Nos. 63-9713 and 63-11300 (corresponding to JP-A-1-186939 and JP-A-1-187557, respectively).

It is preferred that the color developing solutions of the present invention contain chlorine ion in an amount of $3.5 \times 10^{-2}$ to $1.5 \times 10^{-1}$ mol/l, particularly preferably $4 \times 10^{-2}$ to $1 \times 10^{-1}$ mol/l. When the concentration of chlorine ion is higher than $1.5 \times 10^{-1}$ mol/l, there is a disadvantage that development is retarded. Accordingly, such an amount is not preferred for purposes of rapid processing and providing high maximum density. On the other hand, when the concentration is lower than $3.5 \times 10^{-2}$ mol/l, fogging cannot be sufficient prevented from being caused.

It is also preferred that the color developing solutions of the present invention contain bromine ion in an amount of $3.0 \times 10^{-5}$ to $1.0 \times 10^{-3}$ mol/l, more preferably $5.0 \times 10^{-5}$ to $5 \times 10^{-4}$ mol/l. When the concentration of bromine ion is higher than $1 \times 10^{-3}$ mol/l, development is retarded and maximum density and sensitivity are lowered, while when the concentration is lower than $3.0 \times 10^{-5}$ mol/l, fogging cannot be sufficient prevented from being caused.

Chlorine ion and bromine ion may be added directly to the developing solution or may be dissolved out from the light-sensitive material into the developing solution during development.

When chlorine ion is directly added to the color developing solution, examples of chlorine ion supply materials include sodium chloride, potassium chloride, ammonium chloride, lithium chloride, nickel chloride, magnesium chloride, manganese chloride, calcium chloride and cadmium chloride. Among them, sodium chloride and potassium chloride are preferred.

Alternatively, chlorine ion may be supplied from brightening agent contained in the developing solution.

Examples of bromine ion supply materials include sodium bromide, potassium bromide, ammonium bromide, lithium bromide, calcium bromide, magnesium bromide, manganese bromide, nickel bromide, cadmium bromide, cerium bromide and thallium bromide. Among them, potassium bromide and sodium bromide are preferred.

When chlorine ion or bromine ion is to be dissolved out from the light-sensitive material during development, chlorine ion or bromine ion is supplied from emulsions or other sources.

The color developing solutions of the present invention have a pH of preferably 9 to 12, more preferably 9 to 11.0. The color developing solutions may contain conventional additive compounds for developing solutions.

It is preferred that buffering agents are used to keep the pH. Examples of the buffering agents include carbonates, phosphates, borates, tetraborates, hydroxybenzoates, glycyl salts, N,N-dimethylglycine salts, leucine salts, norleucine salts, guanine salts, 3,4-dihydroxyphenylalanine salts, alanine salts, aminobutyrates, 2-amino-2-methyl-1,3-propanediol salts, valine salts, proline salts, trishydroxyaminomethane salts and lysine salts. Particularly, carbonates, phosphates, tetraborates and hydroxybenzoates have advantages in that they are excellent in buffer capacity in the high pH zone of pH=9.0 or higher and do not have an adverse influence (e.g., fogging) on photographic characteristics when added to the color developing solutions. Further, they are inexpensive. Accordingly, it is particularly preferred that these buffering agents are used.

Concrete examples of these buffering agents include sodium carbonate, potassium carbonate, sodium bicarbonate, potassium bicarbonate, sodium phosphate, potassium phosphate, disodium hydrogenphosphate, dipotassium hydrogenphoaphate, sodium borate, potassium borate, sodium tetraborate (borax), potassium tetraborate, sodium o-hydroxybenzoate (sodium salicylate), potassium o-hydroxybenzoate, sodium 5-sulfo-2-hydroxybenzoate (sodium 5-sulfosalicylate) and potassium 5-sulfo-2-hydroxybenzoate (potassium 5-sulfosalicylate). However, the buffering agents which can be used in the present invention are not limited to the above-described compounds.

The amounts of the buffering agents to be added to the color developing solutions are preferably not less than 0.1 mol/l, particularly preferably 0.1 to 0.4 mol/l.

The color developing solutions may contain various chelating agents as suspending agents for calcium or magnesium ion or to improve the stability of the color developing solutions.

Examples of the chelating agents include nitrilotriacetic acid, diethylenetriaminepentaacetic acid, ethylene diaminetetraacetic acid, N,N,N-trimethylenephosphonic acid, ethylenediamine-N,N,N',N'-tetramethylensulfonic acid, trans-cyclohexanediaminetetraacetic acid, 1,2-diaminopropanetetraacetic acid, glycol ether diaminetetraacetic acid, ethylenediamine-o-hydroxyphenylacetic acid, 2-phosphonobutane-1,2,4-tricarboxylic acid, 1-hydroxyethylidene-1,1-diphosphonic acid and N,N'-bis(2-hydroxybenzyl)ethylenediamine-N,N'-diacetic acid.

These chelating agents may be used either alone or in combination of two or more of them.

The amounts of these chelating agents to be added may be a sufficient amount to sequester metal ions in the color developing solutions and are generally 0.1 to 10 g per one liter.

The color developing solutions may optionally contain development accelerators.

Examples of the development accelerators include thioether compounds described in JP-B-37-16088, JP-B-37-5987, JP-B-38-7826, JP-B-44-12380, JP-B-45-9019, U.S. Pat. No. 3,813,247, etc.; p-phenylenediamine compounds described in JP-A-52-49829 and JP-A-50-15554; quaternary ammonium salts described in JP-A-50-137726, JP-B-44-30074, JP-A-56-156826, JP-A-52-43429, etc., amine compounds described in U.S. Pat. Nos. 2,494,903, 3,128,182, 4,230,796 and 3,253,919, JP-B-41-11431, U.S. Pat. Nos. 2,482,546, 2,596,926 and 3,582,346, etc.; polyalkylene oxides described in JP-B-37-16088, JP-B-42-25201, U.S. Pat. No. 3,128,183, JP-B-41-11431, JP-B-42-23883, U.S. Pat. No. 3,532,501, etc.; 1-phenyl-3-pyrazolidones and imidazoles.

If desired, anti-fogging agents may be added in the present invention. The anti-fogging agents include alkali metal halides such as sodium chloride, potassium bromide and potassium iodide and organic anti-fogging agents. Typical examples of the organic anti-fogging agents include nitrogen-containing heterocyclic compounds such as benztriazole, 6-nitrobenzimidazole, 5-nitroisoindazole, 5-methylbenztriazole, 5-nitrobenztriazole, 5-chlorobenztriazole, 2-thiazolyl-benzimidazole, 2-thiazolylmethyl-benzimidazole, indazole, hydroxyazaindolizine and adenine.

It is preferred that the color developing solutions of the present invention contain brightening agents. As the brightening agents, 4,4'-diamino-2,2'-disulfostilbene compounds are preferred. The brightening agents are used in an amount of 0 to 5 g/l, preferably 0.1 to 4 g/l.

If desired, various surfactants such as alkylsulfonic acids, arylsulfonic acids, aliphatic carboxylic acids and aromatic carboxylic acids may be added.

The processing temperature of the color developing solutions of the present invention is from 20° to 50° C., preferably from 30° to 40° C. Processing time is from 20 seconds to 5 minutes, preferably from 30 seconds to 2 minutes. A less replenishment rate is preferred, but the replenishment rate is generally 20 to 600 ml, preferably 50 to 300 ml, more preferably 60 to 200 ml, most preferably 60 to 150 ml per m² of light-sensitive material.

The desilverization stage of the present invention is illustrated below.

As the desilverization stage, any of bleaching stage-fixing stage, fixing stage-bleaching and fixing stage, bleaching stage-bleaching and fixing stage, and bleaching-fixing stage may be used.

The bleaching solution, bleaching-fixing solution and the fixing solution of the present invention are illustrated below.

Any of bleaching agents can be used as bleaching agents used in the bleaching solution and the bleaching-fixing solution. Preferred examples of the bleaching agents include organic complex salts of iron(III) (e.g., complex salts of aminopolycarboxylic acids such as ethylenediaminetetraacetic acid and diethylenetriaminepentaacetic acid, aminopolyphosphonic acids, phosphonocarboxylic acids and organic phosphonic acids) and organic acids such as citric acid, tartaric acid and malic acid; persulfates; and hydrogen peroxide.

Among them, the organic complex salts of iron(III) are preferred from the viewpoint of rapid processing and the prevention of environmental pollution. Examples of aminopolycarboxylic acids, aminopolyphosphonic acids, organic phosphonic acids and salts thereof which are useful in the formation the organic complex salts of iron(III) include ethylenediaminetetraacetic acid, diethylenetriaminepentaacetic acid, 1,3-diaminopropanetetraacetic acid, propylenediaminetetraacetic acid, nitrilotriacetic acid, cyclohexanediaminetetraacetic acid, methyliminodiacetic acid, iminodiacetic acid, glycol ether diaminetetraacetic acid and salts thereof such as sodium, potassium, lithium and ammonium slats. Among these compounds, iron(III) complex salts of ethylenediaminetetraacetic acid, diethylenetriaminepentaacetic acid, cyclohexanediaminetetraacetic acid, 1,3-diaminopropanetetraacetic acid and methyliminodiacetic acid are preferred, because they have high bleaching power. These ferric ion complex salts may be used in the form of a complex salt or may be formed in solutions by using a ferric salt such as ferric sulfate, ferric chloride, ferric nitrate, ammonium ferric sulfate or ferric phosphate with a chelating agent such as an aminopolycarboxylic acid, an aminopolyphosphonic acid or a phosphonocarboxylic acid. The chelating agent may be used in an amount of more than that required for forming the ferric ion complex salt. Among the iron complexes, there are preferred the iron complexes of the aminopolycarboxylic acids. The iron complexes are used in an amount of 0.01 to 1.0 mol/l, preferably 0.05 to 0.50 mol/l.

The bleaching solutions, the bleaching-fixing solutions and/or prebath thereof may contain various compounds as bleaching accelerators. Examples of such compounds include compounds having mercapto group or disulfide bond described in U.S. Pat. No. 3,893,858, German Patent 1,290,812, JP-A-53-95630, *Research Disclosure*, 17129 (July, 1978); thiourea compounds described in JP-B-45-8506, JP-A-52-20832, JP-A-53-32735, U.S. Pat. No. 3,706,561, etc.; and halides such as iodine and bromine ions. These compounds are excellent in bleaching power. Further, the bleaching solutions or the bleaching-fixing solutions of the present invention may contain re-halogenating agents such as bromides (e.g., potassium bromide, sodium bromide, ammonium bromide), chlorides (e.g., potassium chloride, sodium chloride, ammonium chloride) or iodides (e.g., ammonium iodide). If desired, one or more of inorganic acids, organic acids or their alkali metal or ammonium salts which have a pH buffer capacity, such as borax, sodium metaborate, acetic acid, sodium acetate, sodium carbonate, potassium carbonate, phosphorous acid, phosphoric acid, sodium phosphate, citric acid, sodium citrate and tartaric acid and corrosion inhibitors such as ammonium nitrate and guanidine may be added.

Conventional fixing agents can be used as fixing agents used in the bleaching-fixing solutions or the fixing solutions. The fixing agents include water-soluble solvents for silver halide, such as thiosulfates (e.g., sodium thiosulfate, ammonium thiosulfate), thiocyanates (e.g., sodium thiocyanate, ammonium thiocyanate), thioether compounds (e.g., ethylenebisthioglycolic acid, 3,6-dithia-1,8-octanediol) and thioureas. These compounds may be used either alone or as a mixture of two or more of them. Further, there can be used a specific bleching-fixing solution comprising a combination of a large amount of a halide such as potassium iodide and a fixing agent as described in JP-A-55-155354. Among these compounds, thiosulfates, particularly ammonium thiosulfate are preferred. The fixing agents are used in an amount of preferably 0.3 to 2 mol, more preferably 0.5 to 1.0 mol per liter. The pH of the bleaching-fixing solution or the fixing solution is in the range of preferably 3 to 10, more preferably 5 to 9.

The bleching-fixing solutions may contain other additives such as brightening agent, anti-foaming agent, surfactant, organic solvent such as polyvinyl pyrrolidone and methanol, etc.

It is preferred that the bleching-fixing solutions or the fixing solutions contain, as preservatives, sulfite ion-releasing compounds such as sulfites (e.g., sodium sulfite, potassium sulfite, ammonium sulfite, etc.), bisulfites (e.g., ammonium bisulfite, sodium bisulfite, potassium bisulfite, etc.) and metabisulfites (e.g., potassium metabisulfite, sodium metabisulfite, ammonium metabisulfite, etc.). These compounds are used in an amount of preferably about 0.02 to 0.05 mol/l, more preferably 0.04 to 0.40 mol/l in terms of sulfite ion.

Generally, sulfites are used as preservatives. In addition thereto, ascorbic acid, carbonyl bisulfite adducts, carbonyl compounds, etc. may be used.

Further, buffering agent, brightening agent, chelating agent, anti-foaming agent, mildewcide, etc. may be added, if necessary.

Usually, washing and/or stabilization treatment are/is carried out after desilverization treatment such as fixing or bleaching-fixing treatment.

The amount of washing water in the washing stage widely varies depending on the characteristics (e.g., depending on materials used such as couplers) of the light-sensitive materials, use, the temperature of washing water, the number of washing tanks (the number of stages), replenishing system (countercurrent, concurrent) and other conditions. The relationship between the amount of water and the number of washing tanks in the multi-stage countercurrent system can be determined by the method described in *Journal of the Society of Motion Picture and Television Engineers*, Vol. 64, p. 248–253 (May 1955). Usually, the number of stages in the multi-stage countercurrent system is preferably 2 to 6, particularly preferably 2 to 4.

According to the multi-stage countercurrent system, the amount of washing water can be greatly reduced. For example, the amount of washing water can be reduced to 0.5 to 1 liter per m² of light-sensitive material, and an effect obtained by the present invention is remarkable. However, there is caused a problem that the residence time of water in the tanks is prolonged and as a result, bacteria are grown and the resulting suspended matter is deposited on the light-sensitive material. A method for reducing calcium ion and magnesium ion described in JP-A-62-288838 can be effectively used to solve the above-mentioned problem. Further, there can be used isothiazolone compounds and thiabenzazole compounds described in JP-A-57-8542, chlorine-containing germicides such as sodium chlorinated isocyanurate described in JP-A-61-120145, benztriazole and copper ion described in JP-A-61-267761 and germicides described in *Chemistry of Germicidal Antifungal Agent*, (Sankyo Shuppan, 1986) written by Hiroshi Horiguchi, *Sterilization, Disinfection, Antifungal Technique* (Industrial Technique Society, 1982), edited by Sanitary Technique Society and Antibacterial and Antifungal Cyclopedie, (1986) edited by Nippon Antibacterial Antifungal Society.

Further, washing water may contain surfactants as wetting agent and chelating agents such as typically EDTA as water softener.

The light-sensitive material may be treated with a stabilizing solution after the washing stage or may be treated directly with a stabilizing solution without via the washing stage. Compounds having a function capable of stabilizing image are added to the stabilizing solution. For example, aldehyde compounds such as typically formalin, buffering agents for adjusting pH of film to a value suitable for stabilizing image and ammonium compounds are added. Further, the aforesaid germicides or mildewproofing agents may be added to inhibit the growth of bacteria or to impart mildew-proofness to the processed light-sensitive materials.

Further, surfactants, brightening agents and hardening agents can be added. When stabilization is directly carried out without via the washing stage in the processing of the light-sensitive materials of the present invention, all of known methods described in JP-A-57-8543, JP-A-58-14834, JP-A-60-220345, etc. can be used. In other preferred embodiment, chelating agents such as 1-hydroxyethylidene-1,1-diphosphonic acid and ethylenediaminetetramethylenephosphonic acid, magnesium compounds and bismuth compounds are used.

Rinse solution can be equally used as washing solution or stabilizing solution used after desilverization.

The pH in the washing stage or the stabilizing stage is preferably 4 to 10, more preferably 5 to 8. Temperature widely varies depending on the use, characteristics, etc. of the light-sensitive materials, but is generally 15° to 45° C., preferably 20° to 40° C. Time can be arbitrarily set, but shorter time is preferred from the viewpoint of shortening processing time. Time is preferably from 15 seconds to 105 seconds, more preferably from 30 seconds to 90 seconds. Less replenishment rate is preferred from the viewpoints of running cost, the reduction of discharged solution, handling, etc.

Concretely, replenishment rate per the unit area of the light-sensitive material is preferably 0.5 to 50 times, more preferably 3 to 40 times the amount brought over from the prebath. Alternatively, the replenishment rate is not more than 1 liter, preferably not more than 500 ml per m² of light-sensitive material. Replenishment may be carried out continuously or intermittently.

The solution used in the washing and/or stabilizing stages can be further used in the pre-stage. For example, in the multi-stage countercurrent system, the overflow solution of washing water is allowed to flow into the bleaching-fixing bath which is a prebath, and the bleaching-fixing bath is replenished with a concentrated solution to thereby reduce the amount of waste solution.

Other Constituents

Cyan couplers, magenta couplers and yellow couplers which can be preferably used in the present invention are compounds represented by the following general formula ]C-I], [C-II], [M-I], ]M-II] and [Y].

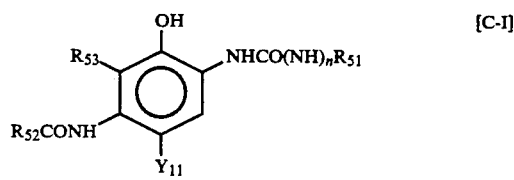

[C-I]

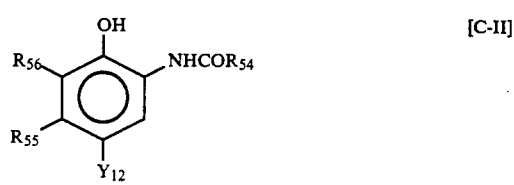

[C-II]

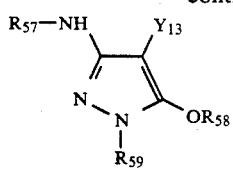 [M-I]

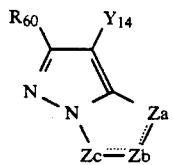 [M-II]

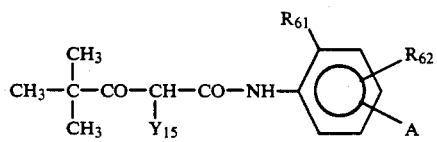 [Y]

In general formulae [C-I] and [C-II], $R_{51}$, $R_{52}$ and $R_{54}$ represent each a substituted or unsubstituted aliphatic, aromatic or heterocyclic group; $R_{53}$, $R_{55}$ and $R_{56}$ represent each hydrogen atom, a halogen atom, an aliphatic group, an aromatic group or an acylamino group; $R_{53}$ may be a non-metallic atomic group required for forming a nitrogen-containing 5-membered or 6-membered ring together with $R_{52}$; $Y_{11}$ and $Y_{12}$ represent each hydrogen atom or a group which is eliminated by the coupling reaction with the oxidants of developing agents; and n represents 0 or 1.

$R_{55}$ in general formula [C-II] is preferably an aliphatic group such as methyl group, ethyl group, propyl group, butyl group, pentadecyl group, t-butyl group, cyclohexyl group, cyclohexylmethyl group, phenylthiomethyl group, dodecyloxyphenylthiomethyl group, butaneamidomethyl group or methoxymethyl group.

Preferred examples of the cyan couplers represented by general formula [C-I] or [C-II] include the following compounds.

Preferably, $R_{51}$ in general formula [C-I] is an aryl group or a heterocyclic group. More preferably, $R_{51}$ is an aryl group substituted by one or more of a halogen atom, an alkyl group, an alkoxy group, an aryloxy group, an acylamino group, an acyl group, a carbamoyl group, a sulfonamido group, a sulfamoyl group, a sulfonyl group, a sulfamido group, an oxycarboxyl group and cyano group.

When $R_{53}$ and $R_{52}$ in general formula [C-I] are not combined together to form a ring, $R_{52}$ is preferably a substituted or unsubstituted alkyl or aryl group with a substituted aryloxy-substituted alkyl group being particularly preferred, and $R_{53}$ is preferably hydrogen atom.

In general formula [C-II], $R_{54}$ is preferably a substituted or unsubstituted alkyl or aryl group with a substituted aryloxy-substituted alkyl group being particularly preferred.

In general formula [C-II], $R_{55}$ is preferably an alkyl group having 2 to 15 carbon atoms and a methyl group having a substituent group having one or more carbon atoms. Preferred examples of the substituent group include an arylthio group, an alkylthio group, an acylamino group, an aryloxy group and an alkyloxy group.

More preferably, $R_{55}$ in general formula [C-II] is an alkyl group having 2 to 15 carbon atoms with an alkyl group having 2 to 4 carbon atoms being particularly preferred.

In general formula [C-II], $R_{56}$ is preferably carbon atom or halogen with chlorine or fluorine atom being particularly preferred.

In general formulae [C-I] and [C-II], $Y_{11}$ and $Y_{12}$ are preferably each hydrogen atom, a halogen atom, an alkoxy group, an aryloxy group, an acyloxy group or a sulfonamido group.

In general formula [M-I], $R_{57}$ and $R_{59}$ represent each an aryl group; $R_{58}$ represents hydrogen atom, an aliphatic or aromatic acyl group or an aliphatic or aromatic sulfonyl group; and $Y_{13}$ represents hydrogen atom or an eliminable group. The aryl group (preferably phenyl group) represented by $R_{57}$ and $R_{59}$ may be substituted. Examples of substituent groups are those described above in the definition of the substituent groups for $R_{51}$. When two or more substituent groups are attached, they may be the same or different groups. $R_{58}$ is preferably hydrogen atom or an aliphatic acyl or sulfonyl group with hydrogen atom being particularly preferred. Preferably, $Y_{13}$ is a group which is eliminated through sulfur, oxygen or nitrogen atom, and sulfur elimination type described in U.S. Pat. No. 4,351,897 and WO 88/04795 is particularly preferred.

In general formula [M-II], $R_{60}$ represents hydrogen atom or a substituent group; $Y_{14}$ represents hydrogen atom or an eliminable group with a halogen atom or an arylthio group being particularly preferred; Za, Zb and Zc represent each methine group, a substituted methine group or a group of =N— or —NH— and one of Za—Zb bond and Zb—Zc bond is a double bond and the other is a single bond. When Zb—Zc bond is a carbon-to-carbon double bond, the bond may form a moiety of an aromatic ring. When a dimer or a higher polymer is formed through $R_{60}$ or $Y_{14}$, the case where a dimer or a higher polymer is formed is included within the scope of the present invention. Further, when Za, Zb or Zc is a substituted methine group and a dimer or a higher polymer is formed through the substituted methine group, the case where a dimer or a higher polymer is formed is included within the scope of the present invention.

Among the pyrazoloazole couplers represented by general formula [M-II], imidazo[1,2-b]pyrazoles described in U.S. Pat. No. 4,500,630 are preferred from the viewpoints of less secondary yellow absorption of developed dyes and fastness to light, and pyrazolo[1,5-b][1,2,4]triazole described in U.S. Pat. No. 4,540,654 is particularly preferred.

In addition thereto, there are preferred pyrazolotriazole couplers wherein a branched alkyl group is directly attached to the 2-, 3- or 6-position of pyrazolotriazole ring as described in JP-A-61-65245; pyrazoloazole couplers having a sulfonamido group in the molecule as described in JP-A-61-65246; pyrazoloazole couplers having an alkoxyphenylsulfonamido ballast group as described in JP-A-61-147254; and pyrazolotriazole couplers having an alkoxy group or an aryloxy group at the 6-position thereof as described in EP-A-226849 and EP-A-294785.

In general formula [Y], $R_{61}$ represents a halogen atom, an alkoxy group, trifluoromethyl group or an aryl group; $R_{62}$ represents hydrogen atom, a halogen atom or an alkoxy group; A represents —NHCOR$_{63}$, —NHSO$_2$—R$_{63}$, —SO$_2$NHR$_{63}$, —COOR$_{63}$ or

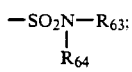

$R_{63}$ and $R_{64}$ represent each an alkyl group, an aryl group or an acyl group; and $Y_{15}$ represents an eliminable group. Examples of substituent groups for $R_{62}$, $R_{63}$ and $R_{64}$ are those described above in the definition of the substituent groups for $R_{51}$. The eliminable group $Y_{15}$ is preferably a type of a group which is eliminated through oxygen atom or nitrogen atom. Nitrogen atom elimination type is particularly preferred.

Examples of couplers represented by general formulae [C-I], [C-II], [M-I], [M-II] and [Y] include the following compounds.

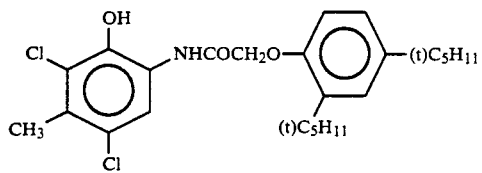
(C-1)

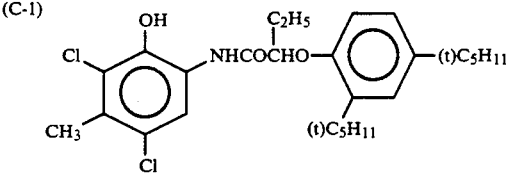
(C-2)

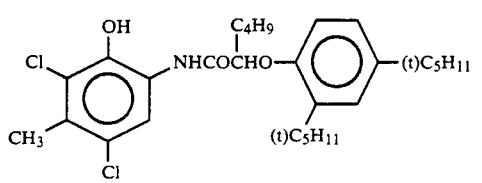
(C-3)

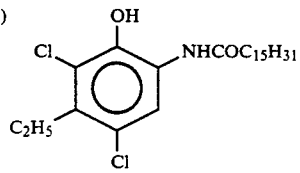
(C-4)

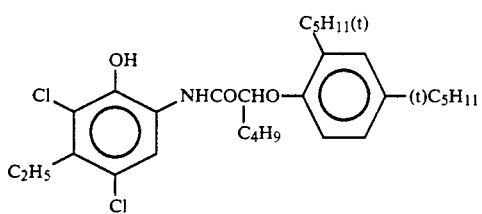
(C-5)

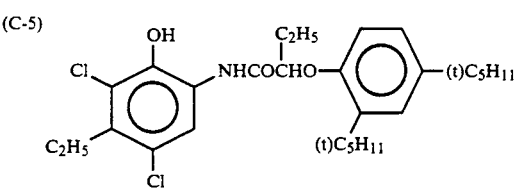
(C-6)

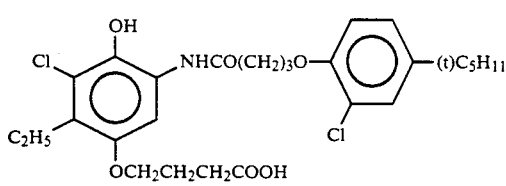
(C-7)

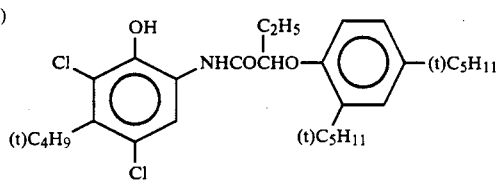
(C-8)

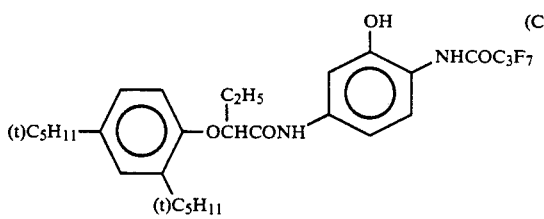
(C-9)

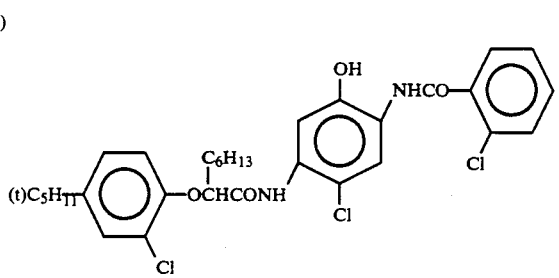
(C-10)

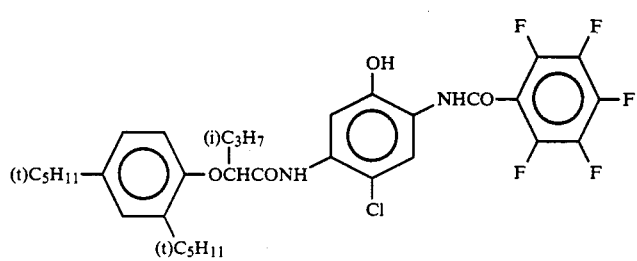
(C-11)

-continued
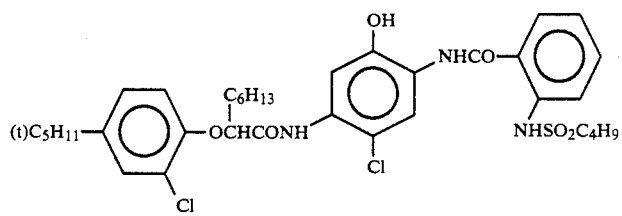 (C-12)
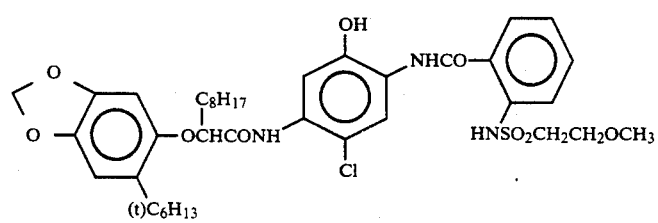 (C-13)
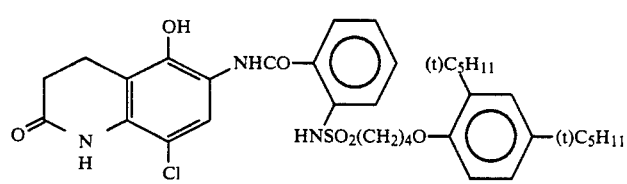 (C-14)
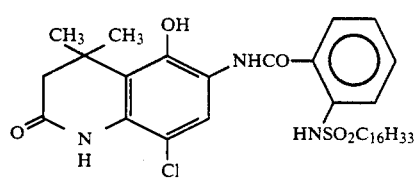 (C-15)
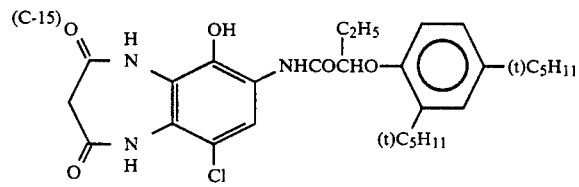 (C-16)
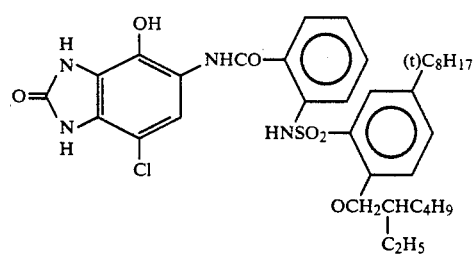 (C-17)
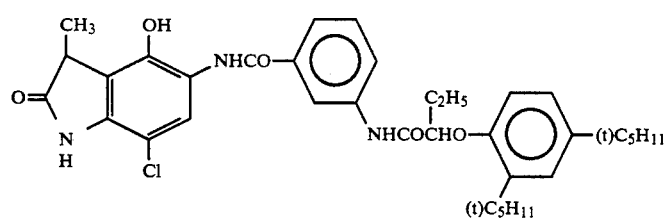 (C-18)
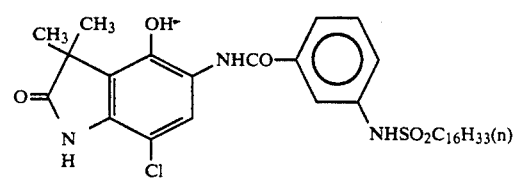 (C-19)

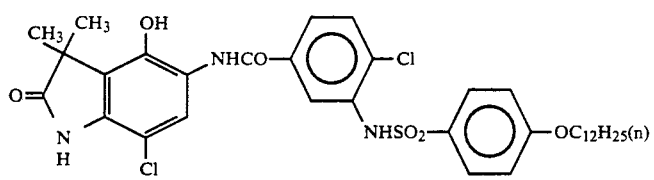
(C-20)
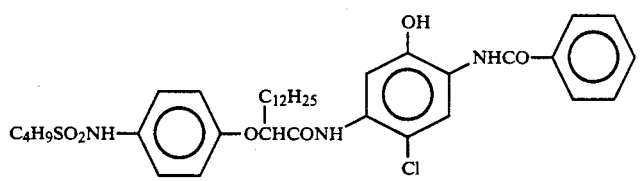
(C-21)
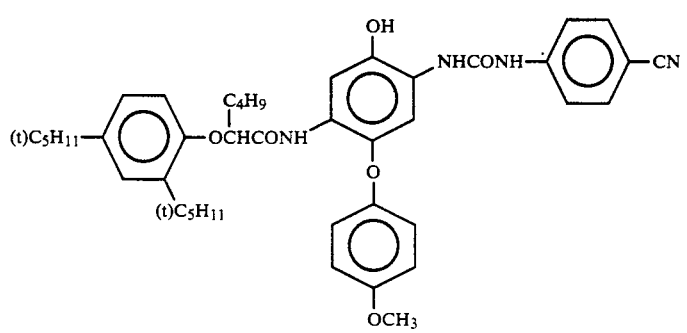
(C-22)
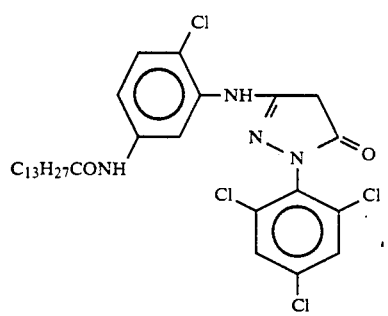
(M-1)
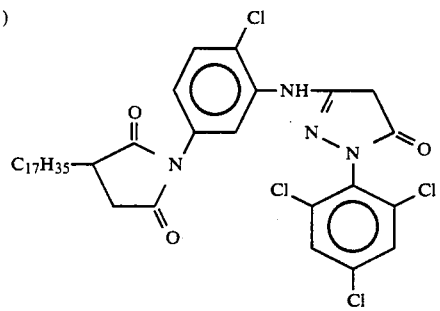
(M-2)
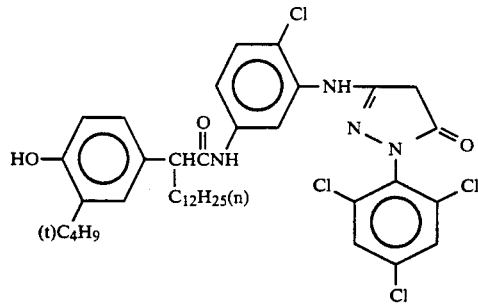
(M-3)
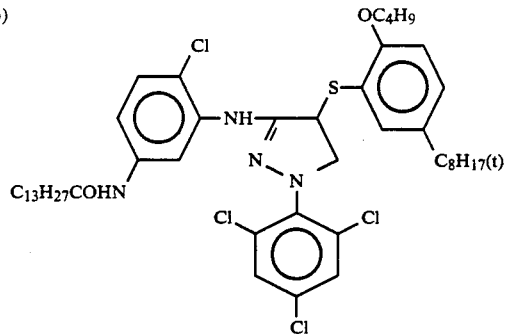
(M-4)
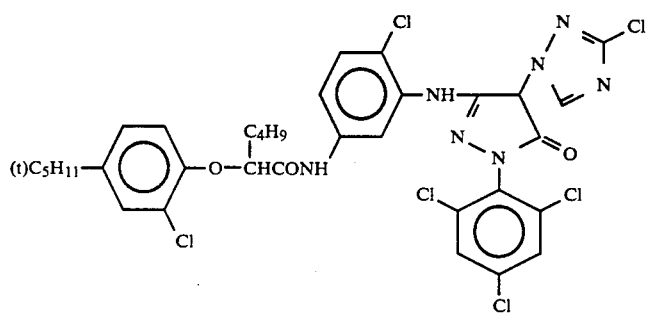
(M-5)

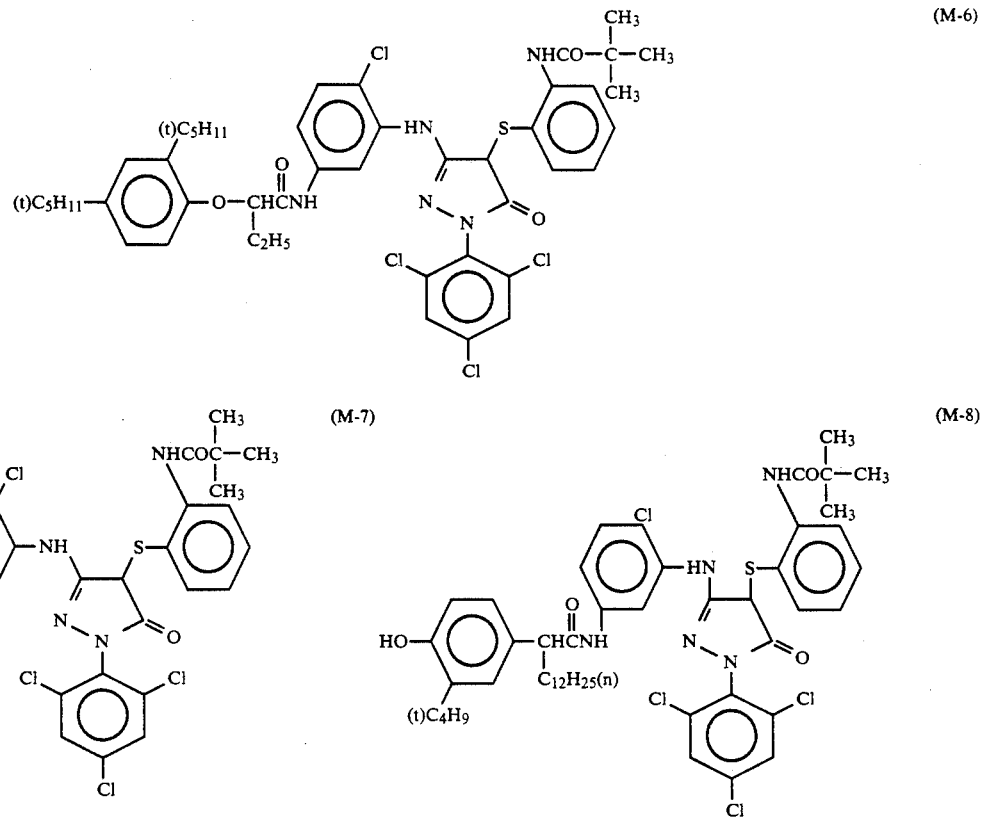
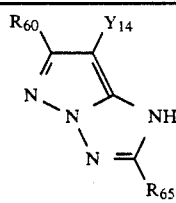
| Compound | $R_{60}$ | $R_{65}$ | $Y_{14}$ |
|---|---|---|---|
| M-9 | $CH_3-$ | ![structure with $-CHCH_2NHSO_2-$ (CH$_3$), $OC_8H_{17}$, $NHSO_2-$ phenyl with $OC_8H_{17}$ and $C_8H_{17}(t)$] | Cl |
| M-10 | " | ![structure with $-CHCH_2NHSO_2-$ (CH$_3$), phenyl with $OCH_2CH_2OC_6H_{13}(n)$ and $C_8H_{17}(t)$] | " |
| M-11 | $(CH_3)_3C-$ | ![structure with $-CHCH_2NHCOCHO-$ (CH$_3$, $C_2H_5$), phenyl with $C_5H_{11}(t)$ and $C_5H_{11}(t)$] | $-O-$⟨phenyl⟩$-CH_3$ |

-continued

| | | | |
|---|---|---|---|
| M-12 | 2-methoxyphenyl-O— | 3-methylphenyl-NHSO₂-[2-OC₈H₁₇, 5-C₈H₁₇(t)]phenyl- | —S-[2-OC₄H₉, 5-C₈H₁₇(t)]phenyl |
| M-13 | CH₃— | —CHCH₂NHSO₂-[2-OC₂H₄OC₂H₅, 5-NHSO₂-(2-OC₈H₁₇, 5-C₈H₁₇(t))phenyl]phenyl (with CH₃ branch) | Cl |
| M-14 | " | —CCH₂NHCOCHO-[2-C₅H₁₁(t), 4-C₅H₁₁(t)]phenyl with C₆H₁₃(n), C(CH₃)₂ | " |
| M-15 | CH₃— | —CHCH₂NHCOCHO-[2-C₅H₁₁(t), 4-C₅H₁₁(t)]phenyl with C₆H₁₃(n), CH₃ | Cl |
| M-16 | " | —CHCH₂NHCO-[2-OC₁₂H₂₅(n)]phenyl, CH₃ | " |
| M-17 | " | —CHCH₂NHCO-[2-OC₁₆H₃₃(n)]phenyl, CH₃ | " |
| M-18 | phenyl-OCH₂CH₂O— | —CH₂CH₂NHSO₂-[2-(4-OCH₃-phenoxy), 5-NHSO₂-(2-OC₈H₁₇, 5-C₈H₁₇(t))phenyl]phenyl | —S-[2-OC₄H₉, 5-C₈H₁₇(t)]phenyl |
| M-19 | CH₃CH₂O— | " | " |
| M-20 | [2-OC₈H₁₇, 5-C₈H₁₇(t)]phenyl-SO₂NH-[4-phenyl]-O(CH₂)₂O— | 3,4-dichlorophenyl | —S-[2-OC₄H₉, 5-C₈H₁₇(t)]phenyl |
| M-21 | 2-methoxyphenyl-O— | —CHCH₂NHSO₂-[2-OC₈H₁₇(n), 5-C₈H₁₇(t)]phenyl, CH₃ | Cl |

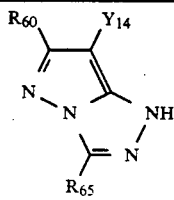

Com-

-continued

| pound | $R_{60}$ | $R_{65}$ | $Y_{14}$ |
|---|---|---|---|
| M-22 | $CH_3-$ | HO—⟨⟩—$SO_2$—⟨⟩—O$\underset{C_{10}H_{21}}{CH}$CONH—⟨⟩—$(CH_2)_3$ | Cl |
| M-23 | " | $\underset{(n)C_8H_{17}}{\overset{(n)C_6H_{13}}{CH}}CH_2SO_2(CH_2)_2$ | " |
| M-24 | $\underset{CH_3}{\overset{CH_3}{CH-}}$ | $\underset{C_8H_{17}(t)}{\overset{OC_4H_9}{⟨⟩}}SO_2(CH_2)_3$ | " |
| M-25 | $(CH-CH_2)_{\overline{50}}(CH_2-\underset{CONH-}{\overset{CH_3}{C}})_{\overline{50}}$ $COOCH_2CH_2OCH_3$ | $CH_3-\underset{CH_2NHSO_2CH_3}{CH-}$ | " |
| M-26 | ⟨⟩—O— | $(CH_2)_2NHSO_2$—⟨⟩$\underset{C_8H_{17}(t)}{\overset{OC_8H_{17}}{}}$ | Cl |
| M-27 | $CH_3-$ | $\underset{CH_3}{\overset{CH_3}{}}⟨\overset{CH_3}{}⟩NHCOCH$—⟨⟩—$SO_2$—⟨⟩—$OCH_2$—⟨⟩ $(n)C_{10}H_{21}$ | " |
| M-28 | $(CH_3)_3C-$ | $\underset{CH_3}{\overset{CH_3}{}}⟨\overset{CH_3}{}⟩NHCOCH$—O—⟨⟩—$C_5H_{11}(t)$, $C_5H_{11}(t)$ $C_4H_9(n)$ | " |
| M-29 | $\underset{OCH_3}{\overset{OCH_3}{⟨⟩}}$ | $(CH_2)_3O$—⟨⟩$\underset{C_5H_{11}(t)}{\overset{C_5H_{11}(t)}{}}$ | Cl |
| M-30 | $CH_3-$ | $-CH-\underset{C_2H_5}{\overset{(n)C_{18}H_{37}}{N}COCH_2CH_2COOH}$ | " |

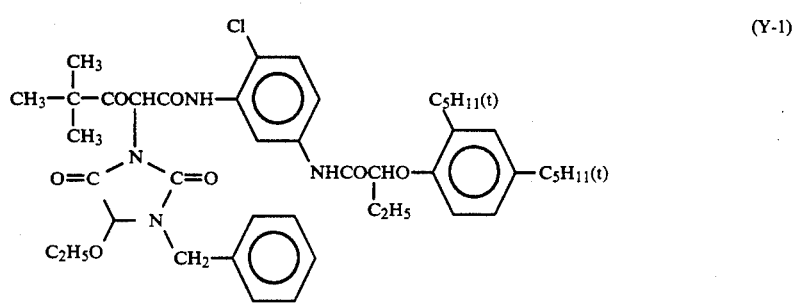

(Y-1)

-continued
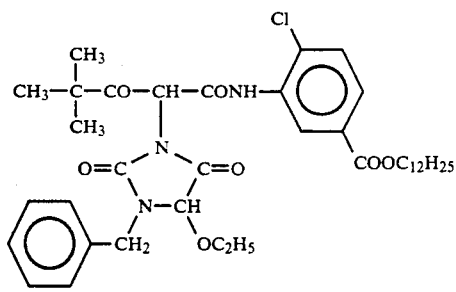
(Y-2)
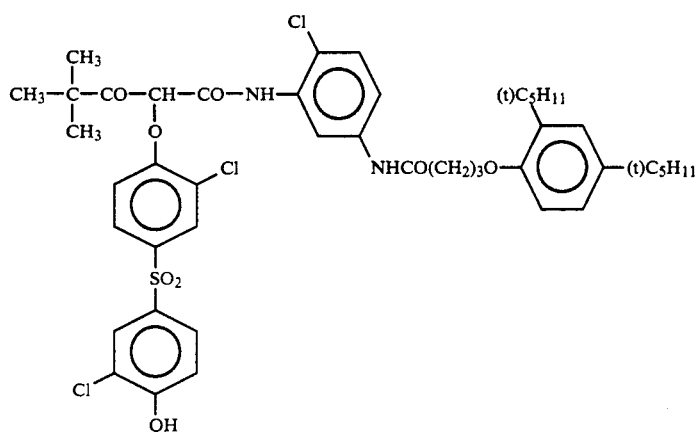
(Y-3)
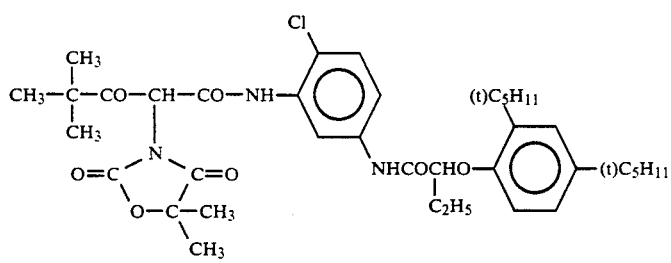
(Y-4)
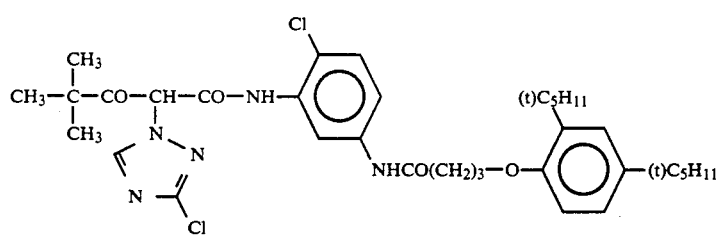
(Y-5)
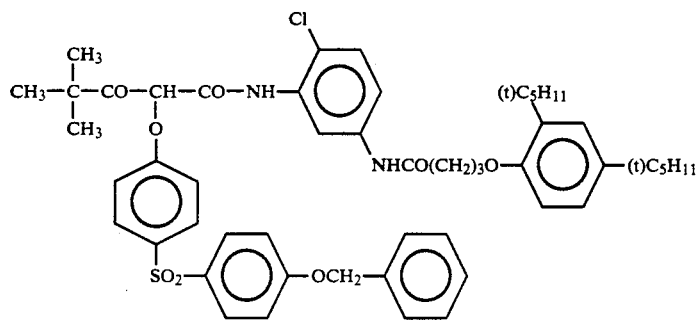
(Y-6)

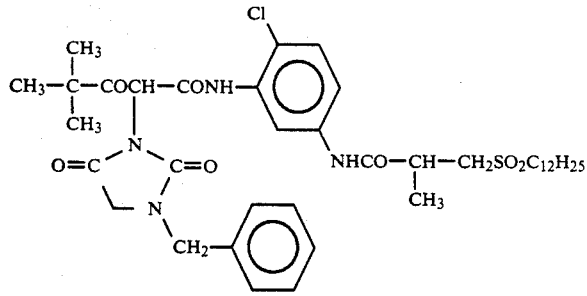 (Y-7)

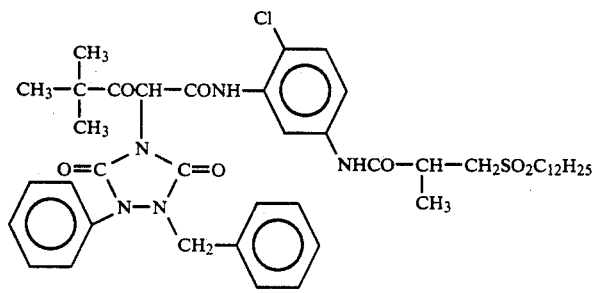 (Y-8)

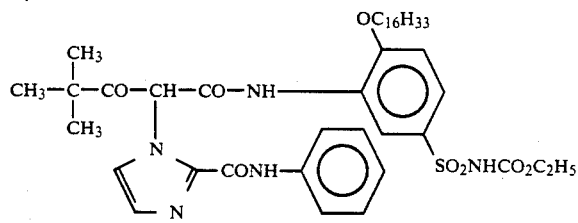 (Y-9)

The couplers represented by general formulae [C-I] to [Y] in an amount of 0.1 to 1.0 mol, preferably 0.1 to 0.5 mol per mol of silver halide are incorporated in silver halide emulsions which constitute light-sensitive layers.

In the present invention, the couplers can be added to the light-sensitive layers by known methods. Generally, the couplers can be added by conventional oil-in-water dispersion method known as oil protect method wherein the couplers are dissolved in a solvent and the resulting solution is emulsified and dispersed in an aqueous gelatin solution containing a surfactant. Alternatively, water or an aqueous gelatin solution is added to a coupler solution containing a surfactant, and an oil-in-water dispersion is formed by phase reversal. Alkali-soluble couplers can be dispersed by Fisher dispersion method. After low-boiling organic solvents are removed from the coupler dispersion by distillation, noodle washing, ultra-filtration, etc., the residue may be mixed with the emulsion.

It is preferred that water-insoluble high-molecular compounds and/or high-boiling organic solvents having a dielectric constant (25° C.) of 2 to 20 and a refractive index (25° C.) of 1.5 to 1.7 are used as dispersion medium for the couplers.

High-boiling organic solvents represented by the following general formulae [A] to [E] are preferred as said high-boiling organic solvents.

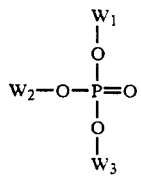 [A]

 [B]

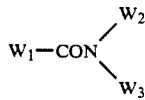 [C]

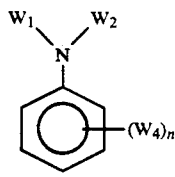 [D]

 [E]

In the above formulae, $W_1$, $W_2$ and $W_3$ are each a substituted or unsubstituted alkyl, cycloalkyl, alkenyl, aryl or heterocyclic group; $W_4$ is $W_1$, $OW_1$ or $SW_1$; and n is an integer of from 1 to 5. When n is 2 or greater, $W_4$ may be the same or different groups. In the formula [E], $W_1$ and $W_2$ may be combined together to form a condensed ring.

In addition to the above-described high-boiling organic solvents represented by general formulae [A] to

[E], compounds which have a melting point of not higher than 100° C. and a boiling point of not lower than 140° C. and are water-immiscible can be used as high-boiling organic solvents, so long as they are good solvents for the couplers. The high-boiling organic solvents have a melting point of preferably not higher than 80° C. and a boiling point of preferably not lower than 160° C., more preferably not lower than 170° C.

The details of these high-boiling organic solvents are described in the specification of JP-A-62-215272 (pages 137, right-hand lower column to page 144, right-hand upper column).

The couplers are impregnated with loadable latex polymer (e.g., described in U.S. Pat. No. 4,203,716) in the presence or absence of said high-boiling organic solvent, or dissolved in a water-insoluble, but organic solvent-soluble polymer and can be emulsified in an aqueous solution of hydrophilic colloid. Preferably, homopolymers or copolymers described in WO 88/00723 (pages 12 to 30) are used. Particularly, acrylamide polymers are preferred from the viewpoint of dye image stability, etc.

The light-sensitive materials prepared by the present invention may contain hydroquinone derivatives, aminophenol derivatives, gallic acid derivatives, ascorbic acid derivatives, etc. as color fogging inhibitors.

The light-sensitive materials of the present invention may contain various anti-fading agents. Examples of the organic anti-fading agents for cyan, magenta and/or yellow images include hydroquinones, 6-hydroxychromans, 5-hydroxycoumarans, spiro-chromans, hindered phenols such as bisphenols and p-alkoxyphenols, gallic acid derivatives, methylenedioxybenzenes, aminophenols, hindered amines and ethers or ester derivatives obtained by silylating or alkylating phenolic hydroxyl group of the above-described compounds. Further, metal complexes such as (bis-salicyl-aldoximato)nickel complex and (bis-N,N-dialkyldithiocarbamato)nickel, etc. can also be used.

Examples of the organic anti-fading agents includes hydroquinones described in U.S. Pat. Nos. 2,360,290, 2,418,613, 2,700,453, 2,701,197, 2,728,659, 2,732,300, 2,735,765, 3,982,944 and 4,430,425, U.K. Patent 1,363,921, U.S. Pat. Nos. 2,710,801, 2,816,028, etc.; 6-hydroxychromans, 5-hydroxycoumarans and spiro-chromans described in U.S. Pat. Nos. 3,432,300, 3,573,050, 3,574,627, 3,698,909 and 3,764,337, JP-A-52-152225, etc.; spiro-indanes described in U.S. Pat. No. 4,360,589; p-alkoxyphenols described in U.S. Pat. No. 2,735,765, U.K. Patent 2,066,975, JP-A-59-10539, JP-B-57-19765, etc.; hindered phenols described in U.S. Pat. Nos. 3,700,455 and 4,228,235, JP-A-52-72224, JP-B-52-6623, etc.; gallic acid derivatives, methylenedioxybenzenes and aminophenols described in U.S. Pat. Nos. 3,457,079 and 4,332,886, JP-B-56-21144, etc.; hindered amines described in U.S. Pat. Nos. 3,336,135 and 4,268,593, U.K. Patents 1,326,889, 1,354,313 and 1,410,846, JP-B-51- 1420, JP-A-58-114036, JP-A-59-53846, JP-A-59-78344, etc.; and metal complexes described in U.S. Pat. Nos. 4,050,938 and 4,241,155, U.K. Patent 2,027,731 (A), etc. These compounds are used in an amount of generally 5 to 100% by weight based on the amount of the corresponding coupler. These compounds are co-emulsified with the couplers and added to the emulsion layers. It is preferred that an ultraviolet light absorbing agent is introduced into a cyan color forming layer and both layers adjacent to the cyan color forming layer to prevent cyan color image from being deteriorated by heat and particularly light.

Examples of the ultraviolet light absorbing agents include aryl group-substituted benztriazole compounds described in U.S. Pat. No. 3,533,794; 4-thiazolidone compounds described in U.S. Pat. Nos. 3,314,794 and 3,352,681; benzophenone compounds described in JP-A-46-2784; cinnamic ester compounds described in U.S. Pat. Nos. 3,705,805 and 3,707,375; butadiene compounds described in U.S. Pat. No. 4,045,229; and benzoxidol compounds described in U.S. Pat. No. 3,700,455. If desired, ultraviolet absorbing couplers (e.g., α-naphthol cyan color forming couplers), ultraviolet light absorbing polymers, etc. may be used. These ultraviolet light absorbers may be incorporated in specific layers.

Among them, the aryl group-substituted benztriazole compounds are preferred.

It is preferred that the following compounds are used together with the couplers of the present invention, particularly pyrazoloazole couplers.

Namely, it is preferred that the couplers of the present invention are used in combination with a compound (F) and/or a compound (G), said compound (F) being chemically bonded to the aromatic amine developing agent left behind after color development to form a compound which is chemically inactive and substantially colorless and said compound (G) being chemically bonded to the oxidant of the aromatic amine developing agent left behind after color development to form a compound which is chemically inactive and substantially colorless. The compounds (F) and (G) are used either alone or in combination to thereby prevent stain from being formed by colored dye formed by the reaction of the couplers with the color development agents or the oxidants thereof left behind during storage after processing and to prevent other side effects from being caused.

Among the compounds (F), there are preferred compounds having a second-order reaction constant $k_2$ (80° C. in trioctyl phosphate) of 1.0 to $1 \times 10^{-5}$ l/mol·sec (in terms of the reaction of p-anisidine). The second-order reaction constant can be measured by the method described in JP-A-63-158545.

When $k_2$ is larger than the above upper limit, the compounds themselves become unstable and there is a possibility that the compounds are reacted with water or gelatin and decomposed, while when $k_2$ is smaller than the above lower limit, the reaction of the compounds with the aromatic amine developing agents left behind is retarded and there is a possibility that the side effects of the aromatic amine developing agents left behind cannot be prevented from being caused.

Among the compounds (F), there are more preferred compounds represented by the following general formula [FI] or [FII].

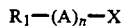   [FI]

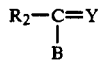   [FII]

In the above general formulae, $R_1$ and $R_2$ are each an aliphatic group, an aromatic group or a heterocyclic group; n is 0 or 1; A is a group which is reacted with the aromatic amine developing agent to form a chemical bond; X is a group which is eliminated by the reaction with the aromatic amine developing agent; B is hydrogen atom, an aliphatic group, an aromatic group, a heterocyclic group, an acyl group or a sulfonyl group; and Y is a group which accelerates the addition of the aromatic amine developing agent to the compound of general formula [FII]. $R_1$ and X or Y and $R_2$ or B may be combined together to form a ring structure.

Typical examples of methods for chemically bonding the aromatic amine developing agents left behind are substitution reaction and addition reaction.

Concrete examples of the compounds represented by general formulae [FI] and [FII] are preferably those described in JP-A-63-158545, JP-A-62-283338, Japanese Patent Application No. 62-158342 (corresponding to JP-A-64-2042), and EP-A-277589 and EP-A-298321.

Among the compounds (G) which are chemically bonded to the oxidants of the aromatic amine developing agents left behind after color development to form a compound which is chemically inactive and substantially colorless, compounds represented by the following general formula [GI] are more preferred.

$$R-Z \quad \text{[GI]}$$

In the above formula, R represents an aliphatic group, an aromatic group or a heterocyclic group; and Z represents nucleophilic group or a group which is decomposed in the light-sensitive material to release a nucleophilic group. Among the compounds of general formula [GI], there are preferred compounds where Z is a group having a Pearson's nucleophilic $^nCH_3I$ value [R. G. Pearson, et al., *J. Am. Chem. Soc.*, 90, 319 (1968)] of 5 or above or a group derived therefrom.

Preferred examples of the compounds represented by general formula [GI] are described in EP-A-255722, JP-A-62-143048, JP-A-62-229145, Japanese Patent Application Nos. 63-136724, 62-214681 and 62-158342 (corresponding to JP-A-1-230039, JP-A-1-57259 and JP-A-64-2042, respectively) and EP-A-277589, EP-A-298321, etc.

The details of the combinations of the compounds (G) with the compounds (F) are described in EP-A-277589.

The hydrophilic colloid layers of the light-sensitive materials of the present invention may contain ultraviolet light absorbing agents as described above.

The light-sensitive materials of the present invention may contain colloidal silver or dyes for purpose of preventing irradiation and halation, particularly for purpose of separating spectral sensitivity distribution of each light-sensitive layer and ensuring safety against safelight in the region of visible wavelength. Examples of the dyes include oxonol dyes, hemioxonol dyes, styryl dyes, merocyanine dyes, cyanine dyes and azo dyes. Among them, oxonol dyes, hemioxonol dyes and merocyanine dyes are preferred.

Decolorizable dyes described in JP-A-63-3250, JP-A-62-181381, JP-A-62-123454, JP-A-63-197947, etc. can be used as dyes for red to infrared region. Dyes described in JP-A-62-39682, JP-A-62-123192, JP-A-62-158779, JP-A-62-174741, etc. and dyes obtained by introducing a water-soluble group into said dyes so as to allow the dyes to flow into processing solutions during processing, can be used for back layer. In the present invention, the dyes for use in infrared region may be those which are colorless and substantially do not absorb light in the visible wavelength region.

When the dyes for infrared region according to the present invention are mixed with silver halide emulsions spectral-sensitized to red to infrared wavelength region, there are caused problems that desensitization and fogging are caused, and the dyes themselves are sometimes adsorbed by silver halide grains to thereby cause low-intensive broad spectral sensitization. Accordingly, it is preferred that the dyes are substantially incorporated in only colloid layers excluding light-sensitive layers. For this reason, it is preferred that the dyes in non-diffusing form are contained in the predetermined colored layer. For this purpose, a ballast group is firstly introduced into the dyes to make the dyes nondiffusing. However, residual color or stain is liable to be formed. Secondly, the anionic dyes of the present invention are used in combination with polymers providing cation site or the polymer latex providing cation site. Thirdly, dyes which are insoluble in water having a pH of not higher than 7 and decolorized and dissolved out during processing, are dispersed in the form of fine particles to use them. Namely, the dyes are dissolved in low-boiling organic solvents or solubilized by using surfactants and then dispersed in an aqueous solution of hydrophilic colloid such as gelatin. Preferably, the solid of said dye is kneaded with an aqueous solution of a surfactant to mechanically form fine particles in a mill, and fine particles are dispersed in an aqueous solution of hydrophilic colloid such as gelatin.

Gelatin is preferred as a binder or protective colloid for the emulsion layers of the light-sensitive materials of the present invention. In addition thereto, other hydrophilic colloid alone or in combination with gelatin can be used.

Any of lime-processed gelatin and acid-processed gelatin can be used. The preparation of gelatin is described in more detail in Arthur, Weiss, *The Macromolecular Chemistry of Gelatin* (Academic Press 1964).

The light-sensitive material of the present invention comprises a support having thereon a yellow coupler-containing light-sensitive layer (YL), a magenta coupler-containing light-sensitive layer (ML), a cyan coupler-containing light-sensitive layer (CL), a protective layer (PL), an interlayer (IL) and optionally a colored layer which is decolorized during development, particularly an antihalation layer (AH). YL, ML and CL have spectral sensitivity suited to at least three kinds of light fluxes having different dominant wavelengths, respectively. YL, ML and CL are different in dominant sensitivity wavelength by at least 30 nm, preferably 50 to 100 nm from one another. There is a difference in sensitivity by 0.8 logE (quantity of light) between dominant sensitivity wavelength of one light-sensitive layer and dominant sensitivity wavelength of other light-sensitive layer. Preferably, there is a difference in sensitivity by at least 1.0 therebetween. Preferably, at least one layer of each light-sensitive layers has sensitivity in the region of wavelength longer than 670 nm. More preferably, at least more one layer has sensitivity in the region of longer wavelength than 750 nm.

For example, light-sensitive layers can be arbitrarily constituted as shown in the following Table. In Table, R represents that light-sensitive layer is red-sensitized; and IR-1 and IR-2 represent that light-sensitive layers are spectral-sensitized to different infrared wavelength regions, respectively.

| | | (1) | (2) | (3) | (4) | (5) | (6) | (7) | (8) | (9) |
|---|---|---|---|---|---|---|---|---|---|---|
| Protective Layer | | PL | PL | PL | PL | PL | PL | PL | PL | PL |
| Light-sensitive Layer | Unit | YL = R | YL = IR-2 | YL = R | ML = R | CL = R | CL = R | CL = IR-2 | ML = IR-2 | ML = R |
| | | ML = IR-1 | ML = IR-1 | CL = IR-1 | YL = IR-1 | YL = IR-1 | ML = IR-1 | ML = IR-1 | CL = IR-1 | CL = IR-1 |
| | | CL = IR-2 | CL = R | ML = IR-2 | CL = IR-2 | ML = IR-2 | YL = IR-2 | YL = R | YL = R | YL = IR-2 |
| | | (AH) | (AH) | (AH) | (AH) | (AH) | (AH) | (AH) | (AH) | (AH) |
| Support | | | | | | | | | | |

In the present invention, light-sensitive layers having spectral sensitivity in the region of longer wavelength than 670 nm can be imagewise exposed by laser beam. Accordingly, spectral sensitivity distribution is in the wavelength region of dominant sensitivity wavelength ±25 nm, preferably dominant sensitivity wavelength ±15 nm. In the region of longer wavelength than 670 nm, particularly infrared wavelength, however, the spectral sensitivity of the present invention is apt to be relatively broad. Accordingly, the spectral sensitivity distribution of the light-sensitive layer should be corrected by using dyes, preferably by fixing dyes to a specific layer. For this purpose, the dyes in a nondiffusing state are incorporated in the colloid layer so that the dyes can be decolorized during the course of development. First method therefor is the use of a dispersion of fine particles of solid dye which is substantially insoluble in water having a pH of 7 and is not soluble in water having a pH of not lower than 7. Second method is the use of an acid dye together with a polymer or polymer latex capable of providing cation site. Dyes represented general formulae [VI] and [VII] described in JP-A-63-197947 are useful for the first and second methods. Particularly, dyes having carboxyl group are useful for the first method.

Any of transparent films conventionally used for photographic materials, such as cellulose nitrate film and polyethylene terephthalate film and reflection type support can be used as supports in the present invention. For the purpose of the present invention, the reflection type support is preferable.

The term "reflection type support" as used herein refers to supports which enhance reflection properties to make a dye image formed on the silver halide emulsion layer clear. Examples of the reflection type support include supports coated with a hydrophobic resin containing a light reflecting material such as titanium oxide, zinc oxide, calcium carbonate or calcium sulfate dispersed therein and supports composed of a hydrophobic resin containing a light reflecting material dispersed therein, said light reflecting material being used to increase reflectance in the wavelength region of visible light.

Typical examples of the supports include baryta paper, polyethylene coated paper, polypropylene synthetic paper, transparent supports coated with a reflecting layer or containing a reflection material. Examples of the transparent supports include glass sheet, polyester films such as polyethylene terephthalate, cellulose triacetate or cellulose nitrate film, polyamide films, polycarbonate films, polystyrene films and vinyl chloride resins. These supports can be properly chosen according to the purpose of use.

It is preferred that as the reflecting material, a white pigment is thoroughly kneaded in the presence of a surfactant or the surfaces of pigment particles are treated with a dihydric to tetrahydric alcohol.

The occupied area ratio (%) of fine particles of white pigment per unit area can be determined by dividing the observed area into adjoining unit areas (each unit area: 6 μm×6 μm) and measuring the occupied area ratio (%) (Ri) of the fine particles projected on the unit area. A coefficient of variation of the occupied area ratio (%) can be determined from a ratio (S/$\overline{R}$) of standard deviation S of Ri to the mean value ($\overline{R}$) of Ri. The number (n) of divided unit areas is preferably not smaller than 6. Accordingly, a coefficient of variation S/$\overline{R}$ can be determined by the following formula.

$$\sqrt{\frac{\sum_{i=1}^{n}(R_i - \overline{R})^2}{n-1}} \bigg/ \frac{\sum_{i=1}^{n} R_i}{n}$$

In the present invention, a coefficient of variation of the occupied area ratio (%) of the fine particles of the pigment is preferably not higher than 0.15, particularly preferably not higher than 0.12.

As the light-reflecting material, there can be used thin films of metals such as aluminum or alloys thereof and metals having specular reflecting properties or a diffuse reflection surface of the second kind as described in JP-A-63-118154, JP-A-63-24247, JP-A-63-24251 to JP-A-63-24253, JP-A-63-24255, etc.

It is preferred that the supports of the present invention are lightweight and thin and have nerve, because they are used as hard copy after the formation of image. Further, the supports are preferably composed of inexpensive materials. As the reflective supports, polyethylene-coated paper, synthetic paper, etc. of 10 to 250 μm, preferably 30 to 180 μm in thickness is preferred.

The photographic materials of the present invention can be applied to color negative films for photographing (general-purpose, movie, etc.), reversal color films (slide, movie, etc.), color photographic paper, color positive films (movie, etc.), direct color positive films, reversal color photographic paper, color light-sensitive materials for heat development, color photographic materials for photomechanical process (lith films, scanner films, etc.), color X-ray photographic materials (direct and indirect medical use, industrial use, etc.), color diffusion transfer photographic materials (DTR), etc.

The present invention is now illustrated in greater detail by reference to the following examples which, however, are not to be construed as limiting the invention in any way.

EXAMPLE 1

The Preparation of Compound (1)

This is described in sequence from the raw material compounds indicated below.

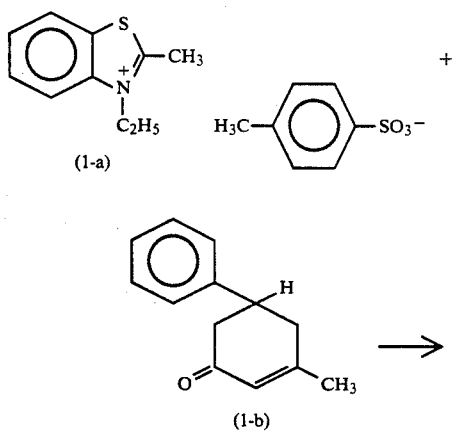

(1-a)

(1-b)

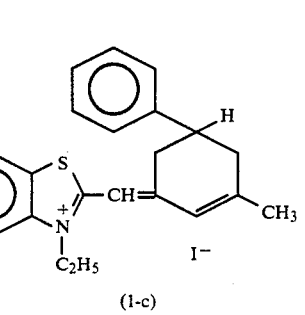

(1-c)

A mixture of 5.9 grams (16.9 mM) of (1-a) with 6.8 grams (33.8 mM) of (1-b) was heated for 14 hours at an external temperature of 150° C. with agitation. Next, a solution of 5.1 grams of NaI in 50 ml of H₂O was added to the reaction mixture, 50 ml of chloroform was added and the mixture was agitated. The chloroform layer was recovered by extraction and, after drying with Na₂SO₄, the solvent was removed by distillation and the material was refined using silica gel chromatography (eluent, methanol/chloroform=1/5).

Recovery: (1-c) 0.9 gram
Yield: 11%

(b)

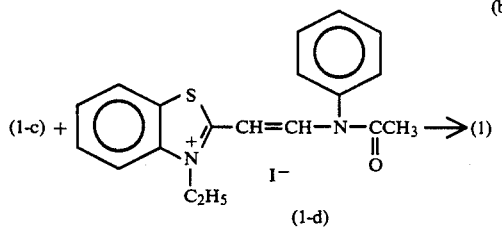

(1-d)

A mixture of 0.9 gram of (1-c), 0.53 gram (1.2 mM) of (1-d), 10 ml of acetonitrile and 0.36 ml (2.6 mM) of triethylamine was heated for 20 minutes under reflux. The reaction solvent was then removed by distillation and the material was refined using silica gel chromatography (eluent, ethanol/chloroform=1/5).

Recovery: (1) 0.05 gram
Yield: 4.5%
185°–190° C. (dec)
$\lambda_{max}^{MeOH}$: 765 nm ($\epsilon = 1.87 \times 10^5$)

EXAMPLE 2

The Preparation of Compound (8)

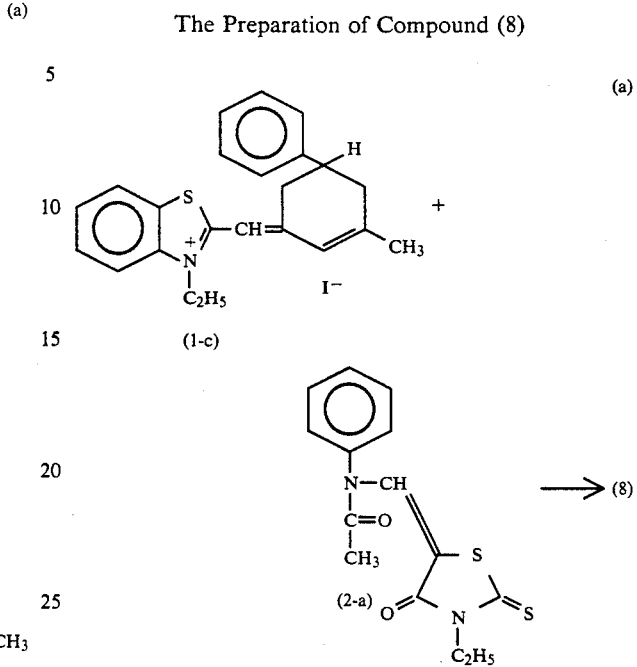

A mixture of 0.9 gram of (1-c), 1 gram of (2-a), 10 ml of acetonitrile and 0.36 ml of triethylamine was heated under reflux for 20 minutes. After removing the reaction solvent by distillation, the material was refined using silica gel chromatography (eluent, methanol/chloroform=¼).

Recovery: (8) 0.1 gram
Yield: 10%
$\lambda_{max}^{MeOH}$: 743 nm ($\epsilon = 5.10 \times 10^4$)

EXAMPLE 3

The Preparation of Compound (12)

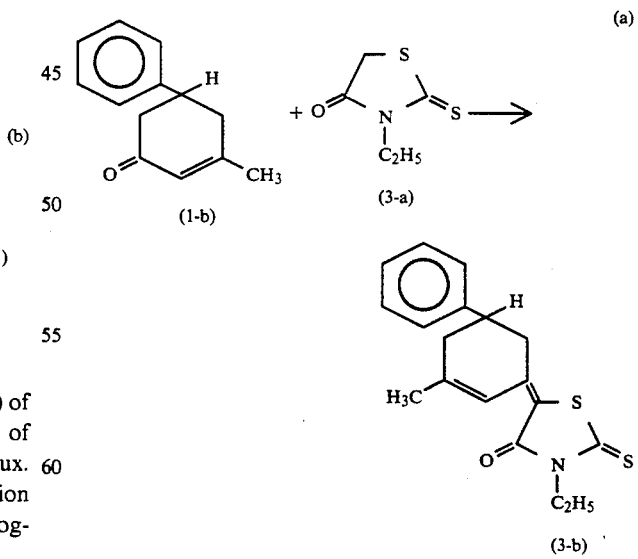

With reference to the method disclosed in U.S. Pat. No. 2,856,404, a mixture of 57.7 grams (0.31M) of (1-b), 50 grams (0.31M) of (3-a) and 25.1 grams (0.30M) of piperidine was heated at an external temperature of 140°

C. for 4 hours with stirring. The reaction mixture was refined using silica gel chromatography (eluent, ethyl acetate/hexane=½) and the crystals obtained were recrystallized from methanol Recovery: 22.5 grams
Yield: 22%
$\lambda_{max}^{MeOH}$: 647 nm ($\epsilon=6.45\times10^4$)

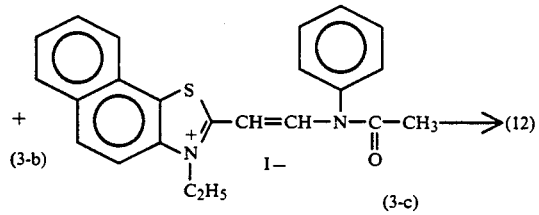

A mixture of 2 grams of (3-b), 3.1 grams of (3-c), 25 ml of acetonitrile and 2.54 ml of triethylamine was heated under reflux for 20 minutes. After removing the reaction solvent by distillation, the material was refined using silica gel chromatography (eluent, methanol/chloroform=¼).

Recovery: 0.5 gram
Yield 14.5%

EXAMPLE 4

The Preparation of Compound (6)

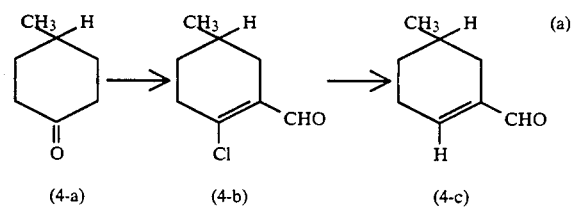

Reference was made to the method disclosed in Chem. Pharm. Bull, 20(2), 309–313 (1972).

POCl$_3$ (103.4 grams, 0.67 M) was drip fed into 61.1 grams of dimethylformamide with ice cooling and stirring. (Drip feeding time 50 minutes) Then, 47.3 grams (0.42M) of (4-a) was added dropwise in such a way that the internal temperature was held below 10° C. Then the mixture was stirred for 2 hours at room temperature. Ice was added to the reaction mixture and the mixture was neutralized using NaHCO$_3$. After extraction with ether and drying over Na$_2$SO$_4$, the solvent was removed under reduced pressure and the mixture was distilled under reduced pressure.

Recovery: (4-b) 110° C./10 mmHg, 42.1 grams
Yield: 63%

After heating 42 grams (0.26M) of (4-b), 156 grams (2.4M) of zinc, 21 ml of H$_2$O and 580 ml of EtOH for 3 hours under reflux, the reaction mixture was filtered hot using Celite. The filtrate was distilled to some extent under reduced pressure and then H$_2$O and ether were added and the mixture was extracted. The ether layer was dried using Na$_2$SO$_4$ and then the solvent was removed under reduced pressure and the mixture was distilled under reduced pressure.

Recovery: (4-c) 80° C./9 mmHg 12.4 grams
Yield: 38%

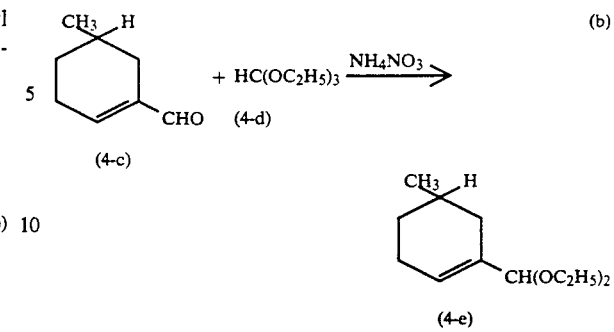

A hot solution of 0.25 gram of NH$_4$NO$_3$ in 9 ml of ethanol was added to 6 grams (0.048M) of (4-c) and 8.2 grams (0.055M) of (4-d) and the mixture was left to stand at room temperature for 2 days. Next 16 ml of an aqueous solution containing 6 drops of piperidine was added to the reaction mixture and the mixture was extracted with ether. The ether layer was washed with water and dried with Na$_2$SO$_4$ and, after removing the solvent under reduced pressure, the mixture was distilled under reduced pressure.

Recovery: (4-e) 103° C./9 mmHg 6.8 grams
Yield: 71%

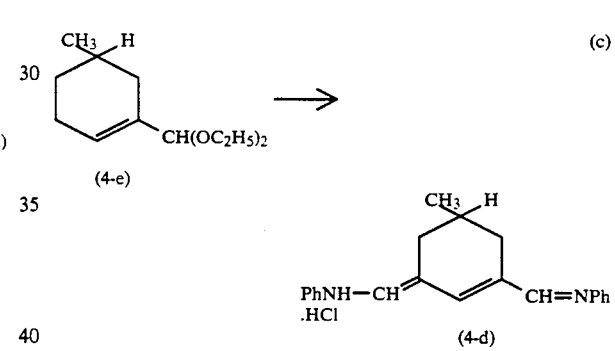

POCl$_3$ (21.7 grams, 0.141M) was dripped with ice cooling into 15.5 grams of dimethylformamide. (Drip feeding time 10 minutes) After stirring the mixture for 30 minutes at room temperature, solution of 14 grams (0.007M) of (4-e) in 220 ml of dichloromethane was added dropwise with ice cooling. (Drip feeding time 1 hour) After stirring the mixture for 2 hours at room temperature, a solution of 65.7 grams (0.7M) of aniline in 115 ml of ethanol was added dropwise. (Drip feeding time 30 minutes) After removing the dichloromethane by distillation at normal pressure, the reaction mixture was drip fed into 350 ml of 6N HCl with ice cooling. The crystals which precipitated out were recovered by suction filtration and washed thoroughly with H$_2$O. After drying, the crystals were washed by boiling for 1 hour with 500 ml of chloroform.

Recovery: (4-d) 13.06 grams
Yield 55%

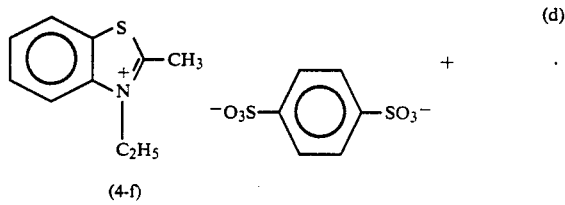

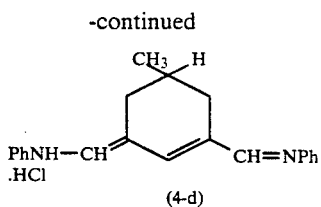

(4-d)

A mixture of 2.1 grams (5.9 mM) of (4-f), 1 grams (3 mM) of (4-d), 1.8 grams (12 mM) of NaI, 50 ml of methanol and 1.8 ml (13 mM) of triethylamine was stirred for 2 hours at room temperature. The crystals which precipitated out were recovered by suction filtration and washed with water and with methanol. The crystals obtained were completely dissolved in a mixture of ethanol and chloroform, filtered naturally and the filtrate was concentrated to a certain extent by distillation under reduced pressure. The crystals which precipitated out were isolated by suction filtration. This procedure was then repeated once more.

Recovery: (16) 0.84 gram
Yield: 48%
250°–260° C. (dec)
$\lambda_{max}^{MeOH}$: 766 nm=2.82×10$^5$)

EXAMPLE 5

The Preparation of Compound (17)

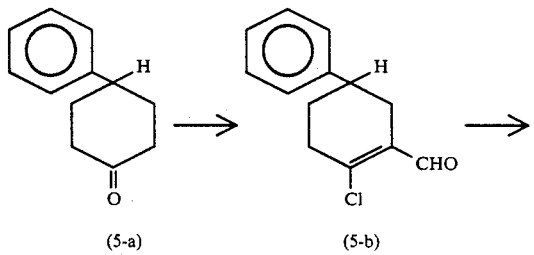

Reference was made to the method disclosed in Chem. Pharm. Bull. 20(2), 309–313 (1972).

POCl$_3$ (34.5 grams, 0.225M) was drip fed into 20.6 grams of dimethylformamide with stirring and ice cooling. (Drip feeding time 30 minutes) Next, a mixture of 24.5 grams (0.141M) of (5-a) in 70 ml of dimethylformamide was added dropwise in such a way as to maintain the internal temperature below 25° C. After stirring for 2 hours at room temperature, the mixture was added to ice and neutralized with NaHCO$_3$. After extraction with ether, the extract was dried with Na$_2$SO$_4$ and the solvent was removed under reduced pressure.

Recovery: (5-b) Oil 29.9 grams (crude)

A mixture of 29.9 grams of (5-b), 58 grams (0.89 M) of zinc, 8 ml of H$_2$O, and 210 ml of ethanol was heated under reflux for 4 hours. The reaction mixture was then filtered using Celite and the filtrate was distilled to a certain extent under reduced pressure. H$_2$O and ether were added, the mixture was extracted and the ether layer was dried with Na$_2$SO$_4$. After removing the solvent under reduced pressure the mixture was refined using silica gel chromatography (eluent ethyl acetate/hexane=¼).

Recovery: (5-c) Oil 8 grams
Yield: 31% from (5-a)

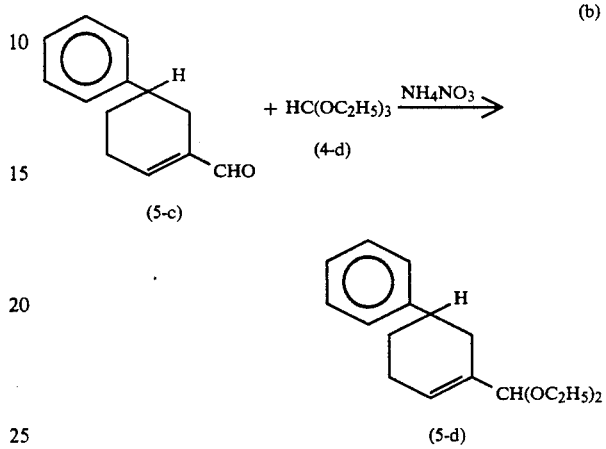

A hot solution of 0.224 gram of NH$_4$NO$_3$ in 7 ml ethanol was added to 8.02 grams (43 mM) of (5-c) and 7.3 grams (49.mM) of (4-b) and the mixture was left to stand at room temperature for 2 days.

A solution of 5 drops of pyridine in 15 ml of H$_2$O was added and, after ether extraction, the ether layer was washed with water and dried with Na$_2$SO$_4$ and then the solvent was removed under reduced pressure.

Recovery: (5-d) Oil 11.5 grams (crude)

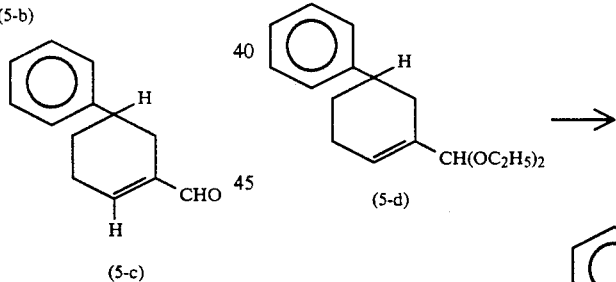

POCl$_3$ (9.5 grams, 62 mM) was drip fed into 6.8 grams of dimethylformamide with ice cooling. (Drip feeding time 10 minutes) After stirring at room temperature for 30 minutes, a solution of 8.1 grams (31 mM) of (5-d) in dichloromethane was added dropwise. (Drip feeding time approximately 1 hour). After stirring for 2 hours at room temperature, a solution of 29 grams of aniline in 50 ml ethanol was added dropwise. The dichloromethane was distilled off under reduced pressure and the mixture was drip fed into 154 ml of 6N HCl with ice cooling. The crystals which precipitated out were thoroughly washed and dried. The crystals thus obtained were washed with 200 ml of boiling chloroform for 30 minutes.

Recovery: (5-e) 7 grams
Yield: 41%

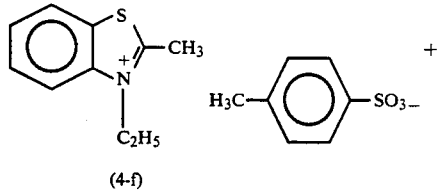

(4-f)

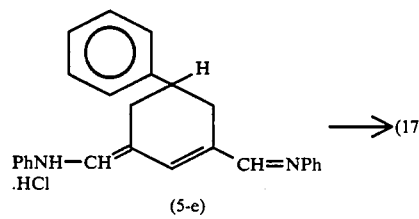

(5-e)

⟶ (17)

A mixture of 1.74 grams (5 mM) of (4-f), 1 gram (2.5 mM) of (5-e), 1.5 grams (10 mM) of NaI, 40 ml of methanol and 1.5 ml (11 mM) of triethylamine was stirred for 1 hour at room temperature. The crystals which precipitated out were recovered by suction filtration and washed with water. The crystals obtained were dissolved in a mixed solvent of methanol and chloroform and filtered naturally, the filtrate was concentrated to a certain extent under reduced pressure and the crystals which precipitated out were recovered by suction filtration. This procedure was repeated once more.

Recovery: (17) 0.66 gram
Yield: 40% mp 193°–196° C.
$\lambda_{max}^{MeOH}$: 765 nm ($\epsilon = 2.76 \times 10^5$)

EXAMPLE 6

The Preparation of Compound (25)

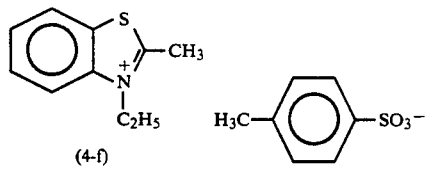

(4-f)

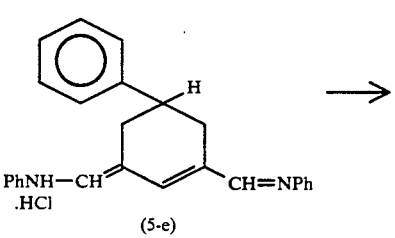

(5-e)

⟶

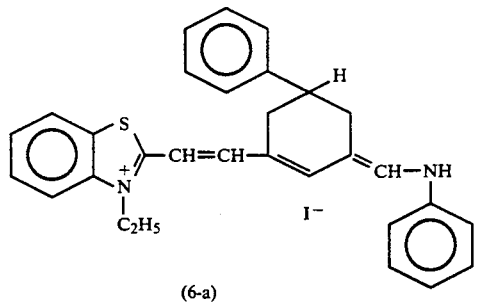

(6-a)

A mixture of 1.74 grams (5 mM) of (4-f), 2 grams (5 mM) of (5-e), 10 ml of ethanol, 2 grams of NaI and 0.41 gram (5 mM) of sodium acetate was heated with stirring for 20 minutes at an external temperature of 90° C. After ice cooling, the crystals which precipitated out were isolated by suction filtration.

Recovery: (6-a) 0.63 gram
Yield: 22%

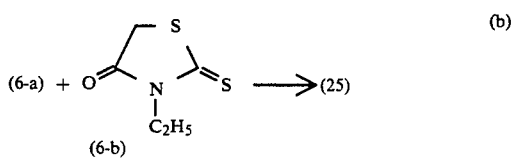

⟶ (25)

A mixture of 0.63 gram (1.1 mM) of (6-a), 0.18 gram (1.1 mM) of (6-b), 5 ml of methanol and 0.5 ml of triethylamine was stirred for 2 hours at room temperature. The crystals which precipitated out were recovered by suction filtration and dissolved completely in a mixed solution of methanol and chloroform and, after natural filtration, the filtrate was distilled to a certain extent under reduced pressure. The crystals which precipitated out were recovered by filtration.

Recovery: (25) 0.09 gram
Yield: 15%
$\lambda_{max}^{MeOH}$: 658 nm ($\epsilon = 5.85 \times 10^4$)

EXAMPLE 7

A tabular silver iodobromide emulsion which had been gold/sulfur sensitized was prepared in accordance with the method described in Example 1 of JP-A-60-131533 (average diameter of the silver iodobromide grains 0.82 μm, average diameter/thickness ratio 11.2, emulsion pAg 8.2, pH 6.5). The compounds indicated in Table 1 were added to this emulsion at 40° C. and then 1,3-bis-vinylsulfonyl-2-propane was added as a gelatin hardening agent and the emulsions were coated onto a cellulose triacetate film base. A protective layer whose the principal component was gelatin which contained surfactant and the above mentioned gelatin hardening agent was coated simultaneously over the emulsion layer.

The coated samples were divided into three parts and one was sealed in an oxygen impermeable bag having been purged with argon gas and stored at −30° C. Another was stored for 3 days under conditions of 80% RH, 50° C. and the last part was stored for 7 days at room temperature under an oxygen partial pressure of 10 atmospheres. These samples were then exposed sensitometrically in a tungsten sensitometer (color temperature 2854° K., ultraviolet absorbing filter fitted)

through a sharp cut filter which transmitted light of wavelength longer than 720 nm. The exposed samples were developed for 7 minutes at 20° C. in the developer indicated below, then they were bleached, water washed and dried and then the densities were measured. The sensitivity was taken to be the reciprocal of the exposure required to provide a density of fog+0.2. The results obtained were as shown in Table 1, where the relative sensitivities of the sample which had been stored under conditions of 85% RH, 50° C. and the sample which had been stored under an oxygen partial pressure of 10 atmospheres are shown as relative values obtained by taking the sensitivity of the sample which had been stored at −30° C. to be 100.

| Developer Composition | |
|---|---|
| Water | 700 ml |
| Metol | 3.1 grams |
| Anhydrous sodium sulfite | 45 grams |
| Hydroquinone | 12 grams |
| Sodium carbonate (mono-hydrate) | 79 grams |
| Potassium bromide | 1.9 grams |
| Water to make up to | 1 liter |

It appears from Table 1 that the present invention provides great stability even under severe conditions. The sensitizing dyes for infrared purposes, as in the present invention, are very unstable and commercial infrared silver halide light-sensitive materials must be stored at a low temperature in a refrigerator, etc. Thus, an increase in stability is desirable and attempts have been made to increase the stability by combinations with a variety of other compounds, but in the present invention the stability of the sensitizing dyes themselves is increased and this is of very great significance.

EXAMPLE 8

A cubic silver bromide emulsion was prepared in accordance with the method described in Example 1 of JP-A-1-223441. The silver bromide grains of the emulsion so prepared were monodisperse grains of average edge length of 0.74 μm (variation coefficient 0.106), and the pH and pAg values were adjusted to 6.3 and 8.5 respectively at 40° C. and the emulsion was ripened at 55° C. with the addition of chloroauric acid and sodium thiosulfate and gold/sulfur sensitization was achieved.

Next, the compounds indicated in Table 2 were added to the emulsion at 40° C., 2,4-dichloro-6-hydroxy-1,3,5-triazine sodium salt, was added as a gelatin hardening agent and the emulsions were coated together with a protective layer in the same way as described in Example 7.

The coated samples so obtained were divided into three parts and stored in exactly the same way as in Example 7 and then they were exposed and developed and the densities were measured in the same way as before. The results obtained were as shown in Table 2 where the relative sensitivities of the sample stored for 3 days under conditions of 80% RH, 50° C. and sample stored for 7 days under an oxygen partial pressure of 10 atmospheres are shown as relative values obtained by taking the sensitivity in the case of the corresponding sample stored at −30° C. to be 100, and in the case of the samples stored at −30° C. the relative sensitivities are those obtained taking the sensitivity for sample 8-1 to be 100.

It is also clear from the results shown in Table 2 that the present invention provides excellent storage stability.

TABLE 1

| Sample No. | Compound Added and Amount Added × 10⁻⁵ mol/mol Ag | Stored at −30° C. in Argon Gas Relative Sensitivity (Standard) | Fog | Stored for 3 Days at 80% RH, 50° C. Relative Sensitivity | Fog | Stored for 7 Days Under an Oxygen Partial Pressures of 10 Atmospheres Relative Sensitivity | |
|---|---|---|---|---|---|---|---|
| 7-1 | (i) 1.1 | 100 | 0.03 | 72 | 0.05 | 51 | Comparative Example |
| 7-2 | (o) 1.1 | 100 | 0.03 | 76 | 0.04 | 49 | Comparative Example |
| 7-3 | (1) 1.1 | 100 | 0.03 | 87 | 0.04 | 78 | This Invention |
| 7-4 | (s) 1.0 | 100 | 0.04 | 71 | 0.05 | 58 | Comparative Example |
| 7-5 | (8) 1.0 | 100 | 0.03 | 91 | 0.04 | 81 | This Invention |
| 7-6 | (u) 1.0 | 100 | 0.03 | 65 | 0.04 | 48 | Comparative Example |
| 7-7 | (13) 1.0 | 100 | 0.03 | 89 | 0.04 | 76 | This Invention |

TABLE 2

| Sample No. | Compound Added and Amount Added × 10⁻⁵ mol/mol · Aq | Stored at −30° C. in Argon in Sealed Bag Relative Sensitivity | Fog | Relative Sensitivity Stored 3 Days 80% RH, 50° C. | Stored 7 Days Under Oxygen Part. Pres. of 10 atm. | |
|---|---|---|---|---|---|---|
| 8-1 | (a-1) 1.0 | 100 (std) | 0.04 | 49 | 43 | Comp. Ex. |
| 8-2 | (20) 1.0 | 117 | 0.04 | 60 | 66 | Invention |
| 8-3 | (20) 1.0, (VI-6) 24 | 437 | 0.03 | 71 | 68 | Invention |
| 8-4 | (a-2) 0.4 | 48 | 0.06 | 39 | 29 | Comp. Ex. |
| 8-5 | (21) 0.4 | 51 | 0.05 | 62 | 59 | Invention |

TABLE 2-continued

| | | Stored at −30° C. in Argon in Sealed Bag | | Relative Sensitivity | | |
|---|---|---|---|---|---|---|
| Sample No. | Compound Added and Amount Added × $10^{-5}$ mol/mol · Aq | Relative Sensitivity | Fog | Stored 3 Days 80% RH, 50° C. | Stored 7 Days Under Oxygen Part. Pres. of 10 atm. | |
| 8-6 | (21) 0.4, (VI-1) 35 | 105 | 0.03 | 83 | 78 | Invention |

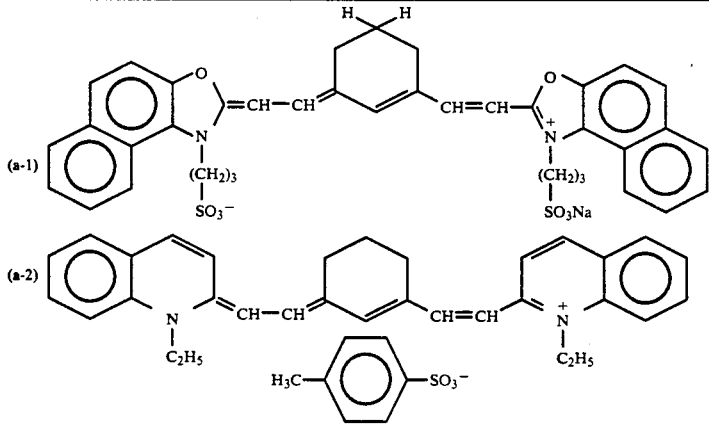

EXAMPLE 9

Sodium chloride (3.3 grams was added to a 3% aqueous solution of lime-processed gelatin and 3.2 ml of a 1% aqueous solution of N,N′-dimethylimidazolin-2-thione was added. An aqueous solution which contained 0.2 mol of silver nitrate and an aqueous solution which contained 0.2 mol of sodium chloride and 15 μg of rhodium trichloride were added to, and mixed with, this aqueous solution at 56° C. while agitating the mixture vigorously. Next, an aqueous solution which contained 0.780 mol of silver nitrate and an aqueous solution which contained 0.780 mol of sodium chloride and 4.2 ml of potassium ferrocyanide were added to, and mixed with, the mixture at 56° C. while agitating the mixture vigorously. Five minutes after the addition of the aqueous silver nitrate solution and the aqueous alkali halide solution had been completed, an aqueous solution containing 0.020 mol of silver nitrate and an aqueous solution containing 0.015 mol of potassium bromide, 0.005 mol of sodium chloride and 0.8 mg of potassium salt of hexachloroiridium(IV) acid were added to, and mixed with, the mixture at 40° C. while agitating the mixture vigorously. Subsequently, the emulsion was desalted and washed with water. Moreover, 90.0 grams of lime-processed gelatin was added, triethylthiourea was added and the emulsion was subjected to optimal chemical sensitization.

The form of the grains, the grain size and the grain size distribution of the silver chlorobromide (A) so obtained were obtained from electron micrographs. These silver halide grains were all cubic grains, the grain size was 0.52 μm and the variation coefficient was 0.08. The grain size was represented by the average value of the diameters of the circles which had the same area as the projected areas of the grains, and the grain size distribution was represented by the value obtained by dividing the standard deviation of the grain size by the average grain size.

Next, the halogen composition of the emulsion grains was determined by measuring the X-ray diffraction from the silver halide crystals. The diffraction angle from the (200) plane was measured in detail using a monochromatic CuKα line as the X-ray source. The diffraction line from a crystal of which the halogen composition is uniform gives a single peak whereas the diffraction line from a crystal which has a local phase which has a different composition gave a complex peak corresponding to the compositions. It was possible to determine the halogen composition of the silver halide from which the crystals were made by calculating the lattice constants from the measured diffraction angles of the peaks. The results of the measurements made with the silver chlorobromide emulsion (A) provided in addition to the main peak for 100% silver chloride a broad diffraction pattern centered on 70% silver chloride (30% silver bromide) and extending to the 60% silver chloride (40% silver bromide) side.

Sample Preparation

A multi-layer color printing paper of which the layer structure is indicated below was prepared on a paper support which had been laminated on both sides with polyethylene. The coating liquids were prepared in the way described below.

Preparation of the First Layer Coating Liquid

Ethyl acetate (27.2 ml) and 8.2 grams of solvent (Solv-1) were added to 19.1 grams of yellow coupler (ExY), 4.4 grams of dye image stabilizer (Cpd-1) and 1.4 grams of dye image stabilizer (Cpd-7) and a solution was obtained. This solution was emulsified and dispersed in 185 ml of a 10% aqueous gelatin solution which contained 8 ml of 10% sodium dodecylbenzenesulfonate. On the other hand, an emulsion was prepared by adding the red sensitizing dye (Dye-1) indicated below to the silver chlorobromide emulsion (A). The aforementioned emulsified dispersion was mixed with this emulsion to provide the first layer coating liquid of which the composition is indicated below.

The second to the seventh layer coating liquids were prepared in the same way as the first layer coating liquid. 2,4-Dichloro-6-hydroxy-1,3,5-triazine sodium salt was used as a gelatin hardening agent in each layer.

The spectrally sensitizing dyes used for each layer were as indicated below.

(First Layer: Red Sensitive Yellow Color Forming Layer)

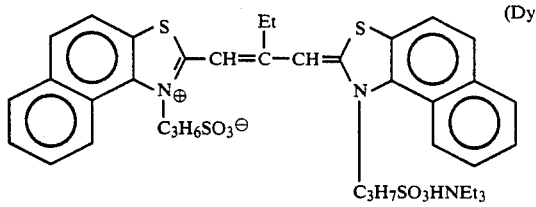

(Dye-1)

(Fifth Layer: Infrared Sensitive Cyan Color Forming Layer)

The compounds shown in Table 3 were added in amounts of $0.5 \times 10^{-5}$ mol per mol of silver halide.

Compound (IV-1) was added in an amount of $1.8 \times 10^{-3}$ mol per mol of silver halide when (Dye-2) and the compounds shown in Table 3 were used.

Furthermore, $8.0 \times 10^{-4}$ mol per mol of silver halide of 1-(5-methylureidophenyl)-5-mercaptotetrazole was added to the yellow color forming emulsion layer, the magenta color forming emulsion layer and the cyan color forming emulsion layer.

The dyes indicated below were added to the emulsion layers for anti-irradiation purposes.

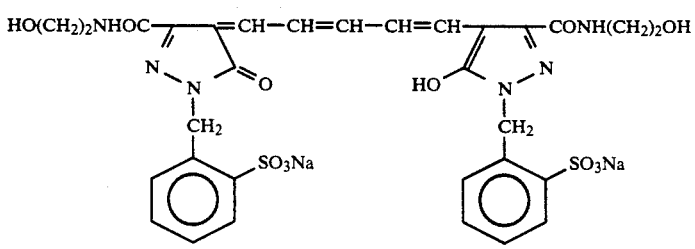

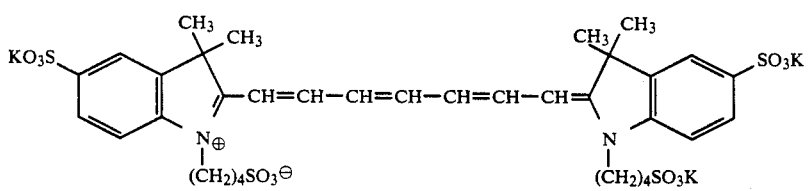

and

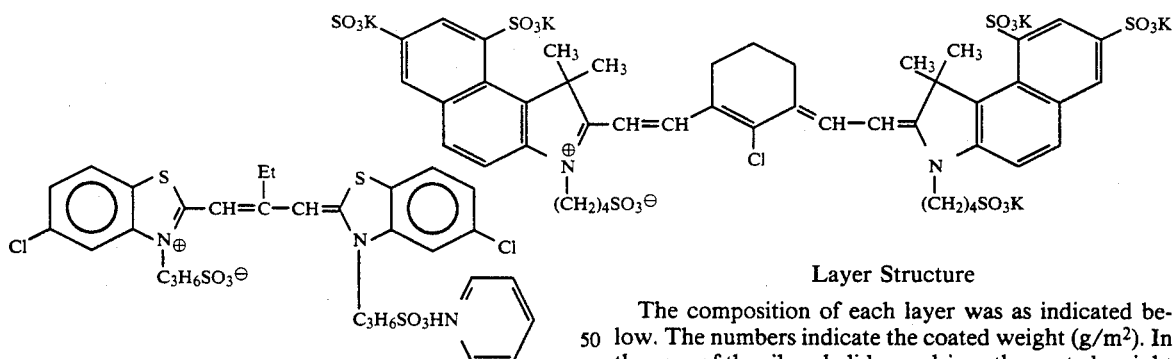

($1.0 \times 10^{-4}$ mol and $1 \times 10^{-4}$ mol per mol of silver halide)

Third Layer: Infrared Sensitive Magenta Color Forming Layer)

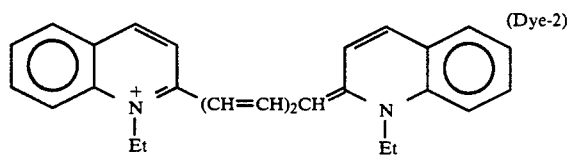

(Dye-2)

($4.5 \times 10^{-5}$ mol per mol of silver halide)

Layer Structure

The composition of each layer was as indicated below. The numbers indicate the coated weight (g/m²). In the case of the silver halide emulsions the coated weight is shown after calculation as the amount of silver.

Support

Polyethylene laminated paper [White pigment (TiO₂) and bluish dye (ultramarine) were included in the polyethylene on the first layer side]

First Layer (Red Sensitive Yellow Color Forming Layer)

| | |
|---|---|
| The aforementioned silver chlorobromide emulsion (A) | 0.30 |

| | |
|---|---|
| Gelatin | 1.86 |
| Yellow coupler (ExY) | 0.82 |
| Dye image stabilizer (Cpd-1) | 0.19 |
| Solvent (Solv-1) | 0.35 |
| Dye image stabilizer (Cpd-7) | 0.06 |
| Second Layer (Color Mixing Inhibitor Layer) | |
| Gelatin | 0.99 |
| Color mixing inhibitor (Cpd-5) | 0.08 |
| Solvent (Solv-1) | 0.16 |
| Solvent (Solv-4) | 0.08 |
| Third Layer (Infrared Sensitive Magenta Color Forming Layer) | |
| Silver chlorobromide emulsion (A) | 0.12 |
| Gelatin | 1.24 |
| Magenta coupler (ExM) | 0.20 |
| Dye image stabilizer (Cpd-2) | 0.03 |
| Dye image stabilizer (Cpd-3) | 0.15 |
| Dye image stabilizer (Cpd-4) | 0.02 |
| Dye image stabilizer (Cpd-9) | 0.02 |
| Solvent (Solv-2) | 0.40 |
| Fourth Layer (Ultraviolet Light Absorbing Layer) | |
| Gelatin | 1.58 |
| Ultraviolet light absorber (UV-1) | 0.47 |
| Color mixing inhibitor (Cpd-5) | 0.05 |
| Solvent (Solv-5) | 0.24 |
| Fifth Layer (Infrared Sensitive Cyan Color Forming Layer) | |
| Silver chlorobromide emulsion (A) | 0.23 |
| Gelatin | 1.34 |
| Cyan coupler (ExC) | 0.32 |
| Dye image stabilizer (Cpd-6) | 0.17 |
| Dye image stabilizer (Cpd-7) | 0.40 |
| Dye image stabilizer (Cpd-8) | 0.04 |
| Solvent (Solv-6) | 0.15 |
| Sixth Layer (Ultraviolet Light Absorbing Layer) | |
| Gelatin | 0.53 |
| Ultraviolet light absorber (UV-1) | 0.16 |
| Color mixing inhibitor (Cpd-5) | 0.02 |
| Solvent (Solv-5) | 0.08 |
| Seventh Layer (Protective Layer) | |
| Gelatin | 1.33 |
| Acrylic modified copolymer of poly(vinyl alcohol) (17% modification) | 0.17 |
| Liquid paraffin | 0.03 |

(ExY) Yellow Coupler
A 1:1 (mol ratio) mixture of:

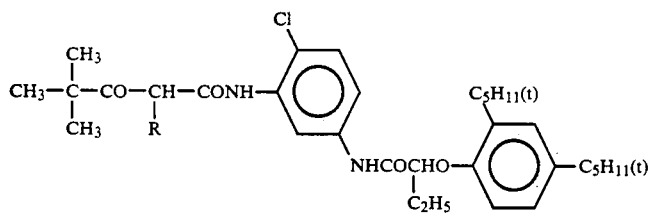

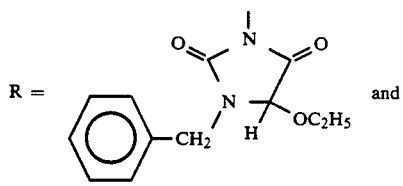

and

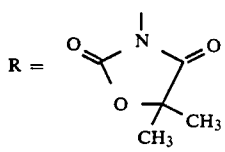

(ExM) Magenta Coupler
A 1:1 (mol ratio) mixture of:

-continued
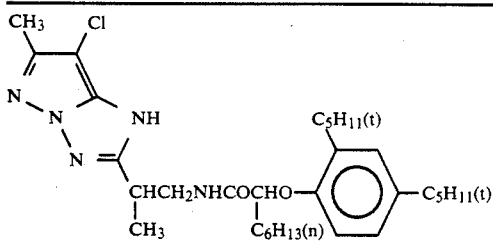
and
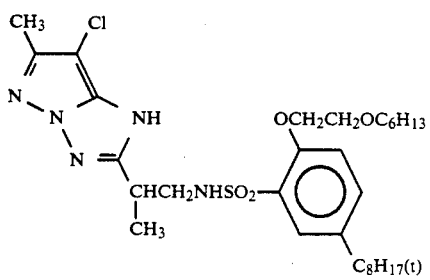
(ExC) Cyan Coupler
A 2:4:4 by weight mixture of:
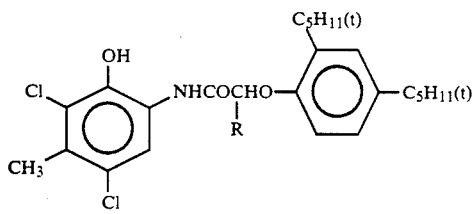
R = C₂H₅ and C₄H₉
and
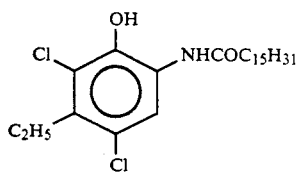
(Cpd-1) Dye Image Stabilizer
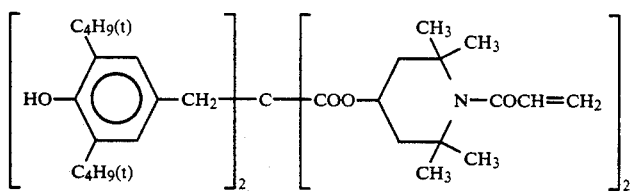
(Cpd-2) Dye Image Stabilizer
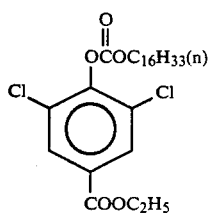
(Cpd-3) Dye Image Stabilizer

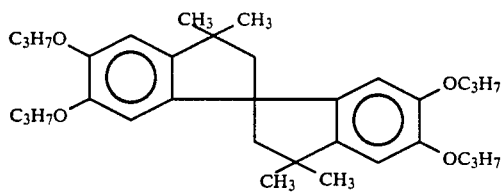
(Cpd-4) Dye Image Stabilizer
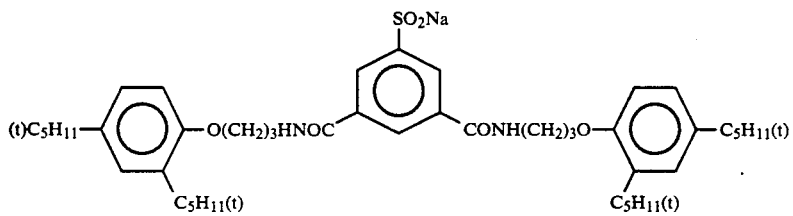
(Cpd-5) Color Mixing Inhibitor
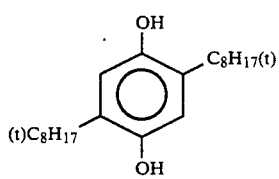
(Cpd-6) Dye Image Stabilizer
A 2:4:4 (by weight) mixture of:
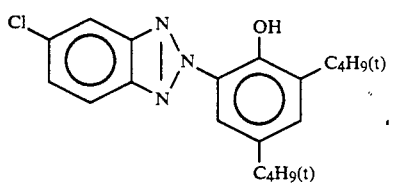
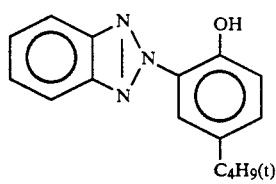
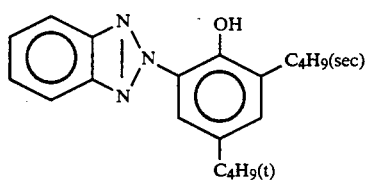
(Cpd-7) Dye Image Stabilizer
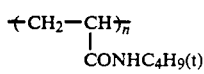
(Average molecular weight 60,000)
(Cpd-8) Dye Image Stabilizer -continued
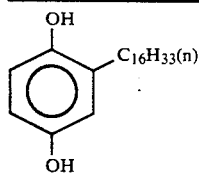
(Cpd-9) Dye Image Stabilizer
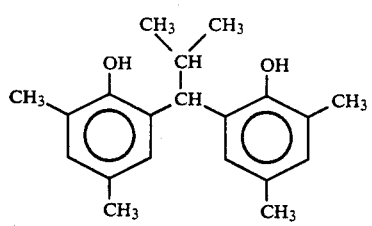
(UV-1) Ultraviolet Light Absorber
A 4:2:4 (by weight) mixture of:
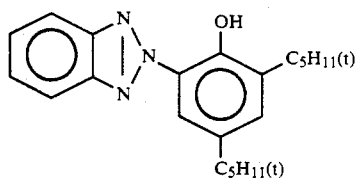
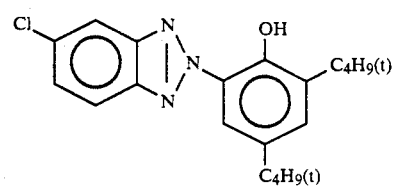
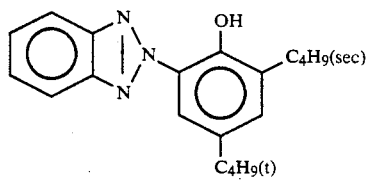
(Solv-1) Solvent
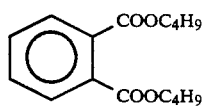
(Solv-2)
A 2:1 (by volume) mixture of
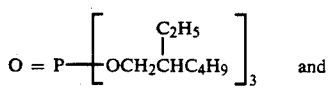 and
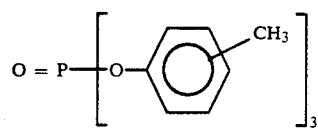
(Solv-4) Solvent

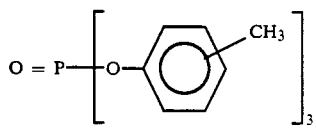

(Solv-5) Solvent

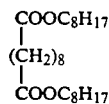

(Solv-6) Solvent

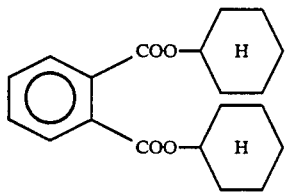

Next, each coated sample was divided into three parts and, after being stored in exactly the same way as in Example 7, these samples were exposed using a device in which scanning exposures could be made successively on the color printing paper which was being moved in a direction at right angles to the scanning direction using laser light and a rotating polyhedron with an AlGaInP semiconductor laser (oscillating wavelength about 670 nm), a GaAlAs semiconductor laser (oscillating wavelength about 750 nm) and a GaAlAs semiconductor laser (oscillating wavelength about 810 nm) for each laser light beam. The exposure was controlled electrically by controlling the exposure time of the semiconductor lasers and the amounts of light emitted.

The exposed samples were subjected to continuous processing (in a running test) using a paper processor until the replenishment of the color developer in the processing operation indicated below had reached twice the tank capacity.

| Processing Operation | Temperature | Time | Replenishment Rate* | Tank Capacity |
|---|---|---|---|---|
| Color Development | 35° C. | 45 seconds | 161 ml | 17 liters |
| Bleaching-fixing | 30–35° C. | 45 seconds | 215 ml | 17 liters |
| Rinse (1) | 30–35° C. | 20 seconds | — | 10 liters |
| Rinse (2) | 30–35° C. | 20 seconds | — | 10 liters |
| Rinse (3) | 30–35° C. | 20 seconds | 350 ml | 10 liters |
| Drying | 70–80° C. | 60 seconds | | |

*Replenishment rate per square meter of light-sensitive material
(A three tank countercurrent rinse system from rinse (3) to rinse (1))

The composition of each processing bath was as indicated below.

| | Tank Solution | Replenisher |
|---|---|---|
| Color Development Bath | | |
| Water | 800 ml | 800 ml |
| Ethylenediamine-N,N,N,N-tetramethylenephosphonic acid | 1.5 gram | 2.0 grams |
| Potassium bromide | 0.015 gram | — |
| Triethanolamine | 8.0 grams | 12.0 grams |
| Sodium chloride | 1.4 grams | — |
| Potassium carbonate | 25 grams | 25 grams |
| N-Ethyl-N-(β-methanesulfonamido-ethyl)-3-methyl-4-aminoaniline-sulfate | 5.0 grams | 7.0 grams |
| N,N-Bis(carboxymethyl)hydrazine | 5.5 grams | 7.0 grams |
| Brightening agent (Whitex 4B, Sumitomo-Chemicals) | 1.0 gram | 2.0 grams |
| Water to make | 1000 ml | 1000 ml |
| pH (25° C.) | 10.05 | 10.45 |
| Bleaching-fixing Bath (Tank Solution = Replenisher) | | |
| Water | | 400 ml |
| Ammonium thiosulfate (700 g/l) | | 100 ml |
| Sodium sulfite | | 17 grams |
| Ammonium ethylenediaminetetra-acetato ferrate | | 55 grams |
| Disodium ethylenediamine-tetraacetate | | 5 grams |
| Ammonium bromide | | 40 grams |
| Water to make | | 1000 ml |
| pH (25° C.) | | 6.0 |
| Rinse Bath (Tank Solution = Replenisher) | | |
| Ion exchanged water (Calcium and magnesium both not more than 3 ppm) | | |

The processed samples were subjected to cyan, magenta and yellow density measurements. The reciprocal of the exposure required to form a density of fog+0.5 was obtained for the sensitivity and the sensitivities were compared by means of relative values.

Only the relative sensitivities and fog levels for the cyan forming layer to which compounds concerned with the present invention had been added are shown in Table 3, and the relative sensitivities of the samples which had been stored at −30° C. in the same way as in Example 8 were obtained by taking the sensitivity for sample 9-1 to be 100, and the relative sensitivities of the samples which had been stored under conditions of 80% RH, 50° C. and under an oxygen partial pressure of 10 atmospheres are relative values obtained on taking the sensitivity of the corresponding sample which had been stored at −30° C. to be 100.

Thus, even when silver halide light-sensitive materials which have a multi-layer structure are subjected to a high luminance, short time exposure using laser light after storage under severe conditions, the present invention provides infrared light-sensitive materials with which the loss of sensitivity is very small and which can be handled easily and which have a stable performance.

dium thiosulfate, and one third of the compound (VI-1) was added after 5 minutes and the remainder was added after 40 minutes.

The samples obtained in this way were divided into two parts and one part of each sample was sealed in an oxygen impermeable bag having been purged with argon gas and stored for 1 year at $-30°$ C. The other part of each sample was stored naturally for 1 year

TABLE 3

| Sample No. | Compound Added | Stored at $-30°$ C. in Argon Gas | | Stored for 3 Days at 80% RH, 50° C. | | Stored for 7 Days Under an Oxygen Partial Pressure of 10 Atmospheres |
|---|---|---|---|---|---|---|
| | | Relative Sensitivity | Fog | Relative Sensitivity | Fog | Relative Sensitivity |
| 9-1 | (a-3) | 100 (standard) | 0.02 | 68 | 0.04 | 63 |
| 9-2 | (2) | 110 | 0.02 | 87 | 0.02 | 85 |
| 9-3 | (a-4) | 117 | 0.02 | 74 | 0.03 | 69 |
| 9-4 | (19) | 138 | 0.02 | 93 | 0.02 | 91 |
| 9-5 | (a-5) | 83 | 0.02 | 60 | 0.04 | 56 |
| 9-6 | (25) | 93 | 0.02 | 79 | 0.02 | 76 |

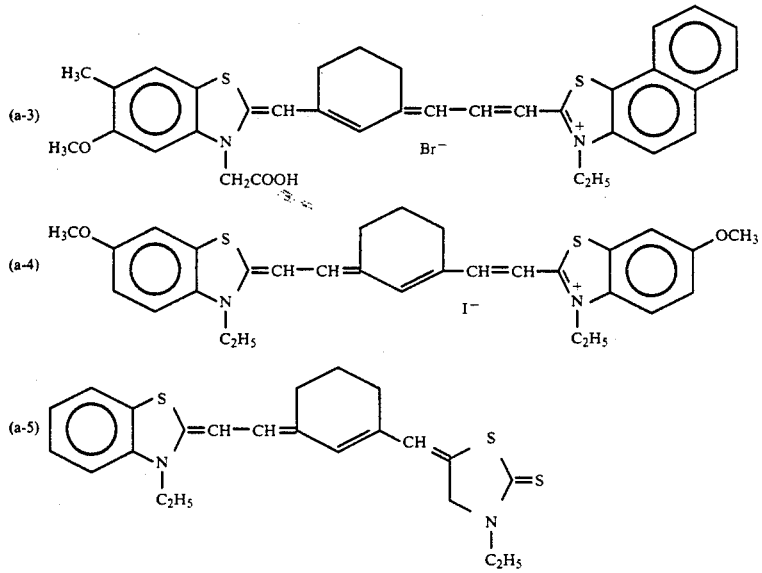

EXAMPLE 10

A silver chloride emulsion which had been optimally sulfur sensitized using sodium thiosulfate was prepared in accordance with the method described in Example 1 of JP-A-63-239449. The emulsion so prepared was a monodisperse cubic silver chloride emulsion of pH 6.3, pAg 7.3, and the side length of the silver chloride grains was 0.47 μm and the variation coefficient was 0.096.

The compounds shown in Table 4 were added to this emulsion and the coated samples shown in Table 4 were prepared by combining these emulsions with the same coupler emulsified dispersion as the magenta coupler emulsified dispersion which contained the magenta coupler etc. for the third layer, the magenta color forming layer, described in Example 9. A paper support which had been laminated on both sides with polyethylene was used for the support. The coated weights were silver: 0.5 g m², coupler: 0.65 g/m² and gelatin: 2.1 g/m2, and a protective layer comprised of 1.0 g/m² of gelatin was established over this layer. Furthermore, 2,4-dichloro-6-hydroxy-1,3,6-triazine sodium salt was used as a gelatin hardening agent.

Moreover, with sample 10-4 in Table 4, the compound (16) was added 2 minutes before adding the sodium thiosulfate, and one third of the compound (VI-1) was added after 5 minutes and the remainder was added after 40 minutes.

indoors with adequate shielding from infrared light in a ventilated container.

Next, the samples were exposed sensitometrically in the same way as described in Example 7 through a sharp cut filter which transmitted light of wavelength longer than 720 nm, color developed in the way described below and subjected to magenta density measurements. The reciprocal of the exposure required to provide a density of fog+0.5 was taken for the sensitivity and the sensitivities of the samples were compared.

In Table 4, the relative sensitivities shown for the samples which had been stored at $-30°$ C. are relative values obtained by taking the sensitivity for sample 10-1 to be 100, and the relative sensitivities shown for the other samples which had been stored naturally for 1 year are relative values obtained by taking the sensitivity of the corresponding sample which had been stored at $-30°$ C. to be 100.

It is clear from Table 4 that, even with a pure silver chloride emulsion which is readily affected by external factors, the present invention provided infrared sensitive silver halide light-sensitive materials with which the loss of sensitivity on long time storage was slight and which could be subjected to rapid processing, and the present invention provides a useful technique.

TABLE 4

| Sample No. | Compound Added and Amount Added × $10^{-5}$ mol/mol · Aq | Stored at $-30°$ C. in Argon in Sealed Bag Rel. Sensitivity | Fog | Natural Storage for 1 year Rel. Sensitivity | Fog | |
|---|---|---|---|---|---|---|
| 10-1 | (y) 0.8 | 100 (Std.) | 0.08 | 34 | 0.10 | Comp. Ex. |
| 10-2 | (16) 0.8 | 105 | 0.07 | 62 | 0.08 | Invention |
| 10-3 | (16) 0.8 (VI-6) 40 | 437 | 0.06 | 65 | 0.07 | Invention |
| 10-4 | (16) 0.8 (IV-1) 120 | 209 | 0.10 | 79 | 0.16 | Invention |
| 10-5 | (16) 0.8 (IV-1) 120 | 240 | 0.05 | 76 | 0.07 | Invention |
| 10-6 | (16) 0.4 (VI-6) 40 (IV-1) 120 | 575 | 0.04 | 83 | 0.05 | Invention |
| 10-7 | (16) 0.8 (VII-1) 40 | 425 | 0.06 | 64 | 0.07 | Invention |
| 10-8 | (16) 0.4 (VII-1) 40 (IV-1) 120 | 570 | 0.04 | 80 | 0.05 | Invention |
| 10-9 | (a-6) 0.5 | 72 | 0.07 | 29 | 0.11 | Comp. Ex. |
| 10-10 | (7) 0.5 | 78 | 0.07 | 58 | 0.09 | Invention |
| 10-11 | (7) 0.5 (V-6) 30 | 186 | 0.07 | 56 | 0.08 | Invention |
| 10-12 | (7) 0.5 (IV-1) 120 | 182 | 0.05 | 72 | 0.08 | Invention |
| 10-13 | (7) 0.5 (IV-1) 120 (V-6) 30 | 295 | 0.04 | 78 | 0.05 | Invention |

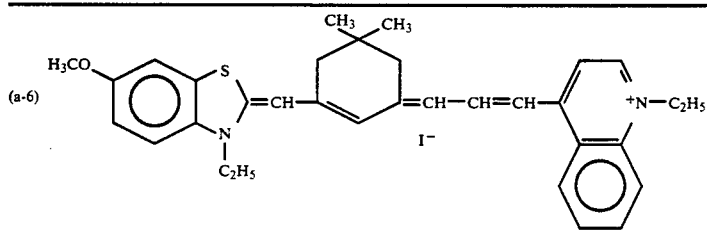

(a-6)

| Processing Operation | Temperature | Time | Replenishment Rate* | Tank Capacity |
|---|---|---|---|---|
| Color Development | 35° C. | 20 seconds | 60 ml | 2 liters |
| Bleaching-fixing | 30–35° C. | 20 seconds | 60 ml | 2 liters |
| Rinse (1) | 30–35° C. | 10 seconds | — | 1 liter |
| Rinse (2) | 30–35° C. | 10 seconds | — | 1 liter |
| Rinse (3) | 30–35° C. | 10 seconds | 120 ml | 1 liter |
| Drying | 70–80° C. | 20 seconds | | |

*Replenishment rate per square meter of light-sensitive material
(A three tank countercurrent rinse system from rinse (3) to rinse (1))

The composition of each processing bath was as indicated below.

| | Tank Solution | Replenisher |
|---|---|---|
| Color Development Bath | | |
| Water | 800 ml | 800 ml |
| Ethylenediamine-N,N,N,N-tetramethylenephosphonic acid | 1.5 gram | 2.0 grams |
| Potassium bromide | 0.015 gram | — |
| Triethanolamine | 8.0 grams | 12.0 grams |
| Sodium chloride | 4.9 grams | — |
| Potassium carbonate | 25 grams | 37 grams |
| 4-Amino-3-methyl-N-ethyl-N-(3-hydroxypropyl)aniline-2-p-toluenesulfonic acid | 12.8 grams | 19.8 grams |
| N,N-Bis(carboxymethyl)hydrazine | 5.5 grams | 7.0 grams |
| Brightening agent (Whitex 4B, Sumitomo Chemicals) | 1.0 gram | 2.0 grams |
| Water to make | 1000 ml | 1000 ml |
| pH (25° C.) | 10.05 | 10.45 |
| Bleaching-fixing Bath (Tank Solution = Replenisher) | | |
| Water | 400 ml | |
| Ammonium thiosulfate (700 g/l) | 100 ml | |
| Sodium sulfite | 17 grams | |
| Ammonium ethylenediaminetetra-acetato ferrate | 55 grams | |
| Disodium ethylenediamine-tetraacetate | 5 grams | |
| Ammonium bromide | 40 grams | |
| Water to make | 1000 ml | |

-continued

| | Tank Solution | Replenisher |
|---|---|---|
| pH (25° C.) | | 6.0 |

Rinse Bath (Tank Solution = Replenisher)

Ion exchanged water (Calcium and magnesium both not more than 3 ppm)

While the invention has been described in detail and with reference to specific embodiments thereof, it will be apparent to one skilled in the art that various changes and modifications can be made therein without departing from the spirit and scope thereof.

What is claimed is:

1. A silver halide emulsion which contains at least one of the methine compounds represented by general formula [Ia], [Ib] or [Ic] or general formula [IIa] or [IIb],

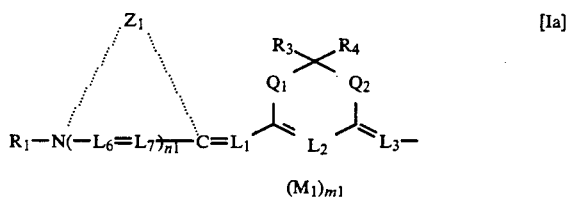

-continued

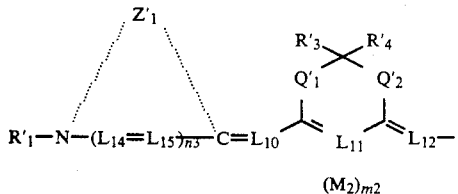

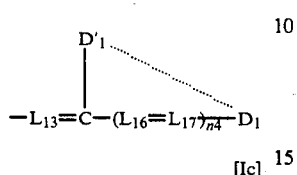

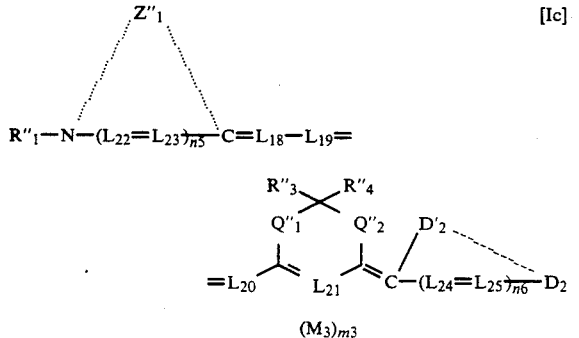

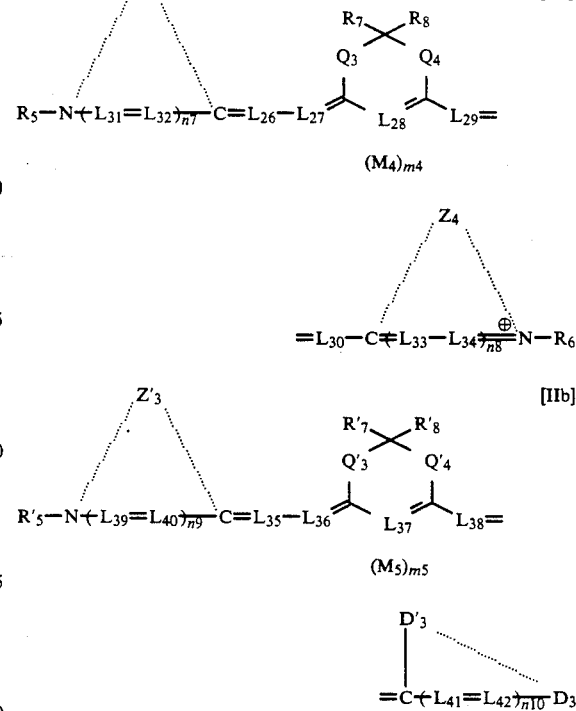

wherein
$Z_1$ and $Z_2$ represent atomic groups which are required to form a five or six membered nitrogen containing heterocyclic ring;
$R_1$ and $R_2$ represent alkyl groups;
$L_1$, $L_2$, $L_3$, $L_4$, $L_5$, $L_6$, $L_7$, $L_8$ and $L_9$ represent methine groups or substituted methine groups, which may be linked with other methine groups or auxochromes to form rings;
$n_1$ and $n_2$ represent 0 or 1;
$M_1$ represents a charge neutralizing counter ion;
$m_1$ is zero or a number greater than zero required to neutralize the charge on the molecule;
$Q_1$ and $Q_2$ represent methylene groups or substituted methylene groups;
$R_3$ and $R_4$ represent hydrogen atoms or monovalent organic residual groups, with the proviso that at least one of $R_3$ and $R_4$ represents an aryl group or a heterocyclic group;
$Z'_1$ is the same as $Z_1$ and $Z_2$;
$D_1$ and $D'_1$ represent atomic groups which are required to form non-cyclic or cyclic acidic nuclei;
$R'_1$ is the same as $R_1$ and $R_2$;
$L_{10}$, $L_{11}$, $L_{12}$, $L_{13}$, $L_{14}$, $L_{15}$, $L_{16}$ and $L_{17}$ are the same as $L_1$, $L_2$, $L_3$, $L_4$, $L_5$, $L_6$, $L_7$, $L_8$ and $L_9$;
$n_3$ and $n_4$ represent 0 or 1;
$M_2$ and $m_2$ are the same as $M_1$ and $m_1$ respectively
$Q'_1$ and $Q'_2$ are the same as $Q_1$ and $Q_2$;
$R'_3$ and $R'_4$ are the same as $R_3$ and $R_4$;
$Z''_1$ is the same as $Z_1$ and $Z_2$;
$D_2$ and $D'_2$ are the same as $D_1$ and $D'_1$;
$R''_1$ is the same as $R_1$ and $R_2$;
$L_{18}$, $L_{19}$, $L_{20}$, $L_{21}$, $L_{22}$, $L_{23}$, $L_{24}$ and $L_{25}$ are the same as $L_1$, $L_2$, $L_3$, $L_4$, $L_5$, $L_6$, $L_7$, $L_8$ and $L_9$;
$n_5$ and $n_6$ represent 0 or 1;
$M_3$ and $m_3$ are the same as $M_1$ and $m_1$ respectively;
$Q''_1$ and $Q''_2$ are the same as $Q_1$ and $Q_2$; and
$R''_3$ and $R''_4$ are the same as $R_3$ and $R_4$;

wherein
$Z_3$ and $Z_4$ represent atomic groups which are required to form a five or six membered nitrogen containing heterocyclic ring;
$R_5$ and $R_6$ represent alkyl groups;
$L_{26}$, $L_{27}$, $L_{28}$, $L_{29}$, $L_{30}$, $L_{31}$, $L_{32}$, $L_{33}$ and $L_{34}$ represent methine groups or substituted methine groups, which may be linked with other methine groups or auxochromes to form rings;
$n_7$ and $n_8$ represent 0 or 1;
$M_4$ represents a charge neutralizing counter ion;
$m_4$ is zero or a number greater than zero required to neutralize the charge on the molecule;
$Q_3$ and $Q_4$ represent methylene groups or substituted methylene groups;
$R_7$ and $R_8$ represent hydrogen atoms or monovalent organic residual groups, with the proviso that at least one of $R_7$ and $R_8$ represents an alkyl group, an aryl group or a heterocyclic group;
$Z'_3$ is the same as $Z_3$ and $Z_4$;
$D_3$ and $D'_3$ represent atomic groups which are required to form non-cyclic or cyclic acidic nuclei;
$R'_5$ is the same as $R_5$ and $R_6$;
$L_{35}$, $L_{36}$, $L_{37}$, $L_{38}$, $L_{39}$, $L_{40}$, $L_{41}$ and $L_{42}$ are the same as $L_{26}$, $L_{27}$, $L_{28}$, $L_{29}$, $L_{30}$, $L_{31}$, $L_{32}$, $L_{33}$ and $L_{34}$;
$n_9$ and $n_{10}$ represent 0 or 1;
$M_5$ and $m_5$ are the same as $M_4$ and $m_4$;
$Q'_3$ and $Q'_4$ are the same as $Q_3$ and $Q_4$; and
$R'_7$ and $R'_8$ are the same as $R_7$ and $R_8$.

2. A silver halide emulsion as claimed in claim 1, which contains at least one of the compounds represented by the following general formula [IV], [V], [VI] or [VII]:

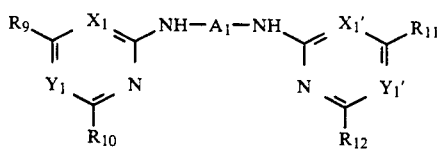
[IV]

wherein $A_1$ represents a bivalent aromatic residue; $R_9$, $R_{10}$, $R_{11}$ and $R_{12}$ represent each a hydrogen atom, a hydroxyl group, an alkyl group, an alkoxy group, an aryloxy group, a halogen atom, a heterocyclic nucleus, a heterocyclic thio group, an arylthio group, an amino group, an alkylamino group, an arylamino group, an aralkylamino group, an aryl group or a mercapto group, each of which may optionally have one or more substituent groups, with the proviso that at least one of $A_1$, $R_9$, $R_{10}$, $R_{11}$, and $R_{12}$ is a group having sulfo group; and $X_1$, $Y_1$, $X_1'$, and $Y_1'$ represent each $-CH=$ or $-N=$ and at least one of $X_1$ and $Y_1$ and at least one of $X_1'$ and $Y_1'$ are $-N=$;

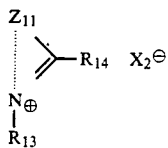
[V]

wherein $Z_{11}$ represents a non-metallic atomic group required for forming a 5-membered or 6-membered nitrogen containing heterocyclic ring, which ring may be condensed with a benzene ring or a naphthalene ring; $R_{13}$ represents a hydrogen atom, an alkyl group or an alkenyl group; $R_{14}$ represents a hydrogen atom or a lower alkyl group, and $Z_2^\ominus$ represents an acid anion;

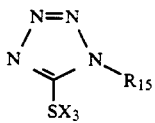
[VI]

wherein $R_{15}$ represents an alkyl group, an alkenyl group or an aryl group; and $X_3$ represents a hydrogen atom, an alkali metal atom, an ammonium group, or a precursor;

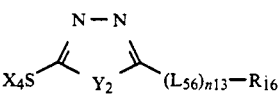
[VII]

wherein $Y_2$ represents an oxygen atom, a sulfur atom, $=NH$ or $=N-(L_{57})_{n14}-R_{17}$; and $L_{56}$ and $L_{57}$ represent each a bivalent bonding group; and $R_{16}$ and $R_{17}$ represent each a hydrogen atom, an alkyl group, an alkenyl group or an aryl group; $X_4$ represents a hydrogen atom, an alkali metal atom, an ammonium group or a precursor; and $n_{13}$ and $n_{14}$ represent each 0 or 1.

3. A silver halide emulsion as in claim 1, wherein the methine compound is included in the silver halide photographic emulsion in an amount of $5\times10^{-7}$ to $5\times10^{-3}$ mol per mol of silver halide.

4. A silver halide emulsion as in claim 3, wherein the methine compound is included in silver halide photographic emulsion in an amount of $1\times10^{-6}$ to $1\times10^{-3}$ mol of silver halide.

5. A silver halide emulsion as in claim 2, wherein the methine compound is included in the silver halide photographic emulsion in an amount of $5\times10^{-7}$ to $5\times10^{-3}$ mol per mol of silver halide.

6. A silver halide emulsion as in claim 5, wherein the methine compound is included in silver halide photographic emulsion in an amount of $1\times10^{-6}$ to $1\times10^{-3}$ mol per mol of silver halide.

7. A silver halide emulsion as in claim 2, wherein the compound represented by general formula [IV] is used in an amount of 0.01 to 5 g per mol of silver halide.

8. A silver halide emulsion as in claim 2, wherein the compound represented by general formula [IV] is used in a ratio by weight of the compound to the methine compound of from 1/1 to 100/1.

9. A silver halide emulsion as in claim 2, wherein the compound represented by general formula [V] is used in an amount of 0.01 to 5 g per mol of silver halide.

10. A silver halide emulsion as in claim 2, wherein the methine compounds represented by general formula [Ia], [Ib], [Ic], [IIa] or [IIb] and the compound represented by general formula [V] are used in a ratio by weight of the methine compound to the compound [V] of from 1/1 to 1/300.

11. A silver halide emulsion as in claim 2, wherein the compounds represented by general formula [VI] or [VII] are used in an amount of $1\times10^{-5}$ to $5\times10^{-2}$ mol per mol of silver halide.

* * * * *